July 1, 1941.   J. W. CHALMERS   2,247,871
PACKING OF CIGARETTES OR OTHER ARTICLES
Filed July 31, 1939   36 Sheets-Sheet 1

Inventor
J. W. Chalmers
By Watson, Cole, Grindle & Watson
Attys

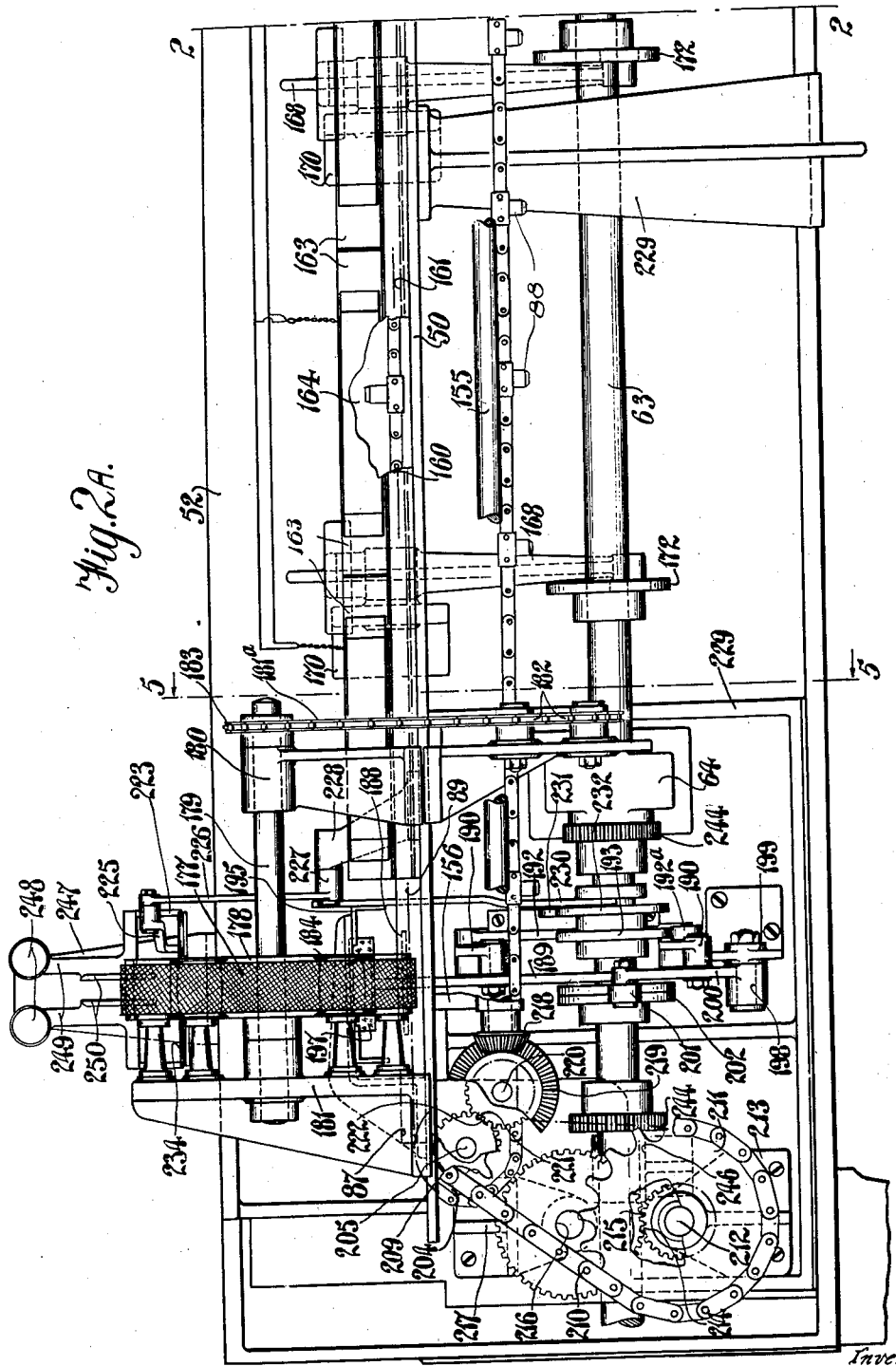

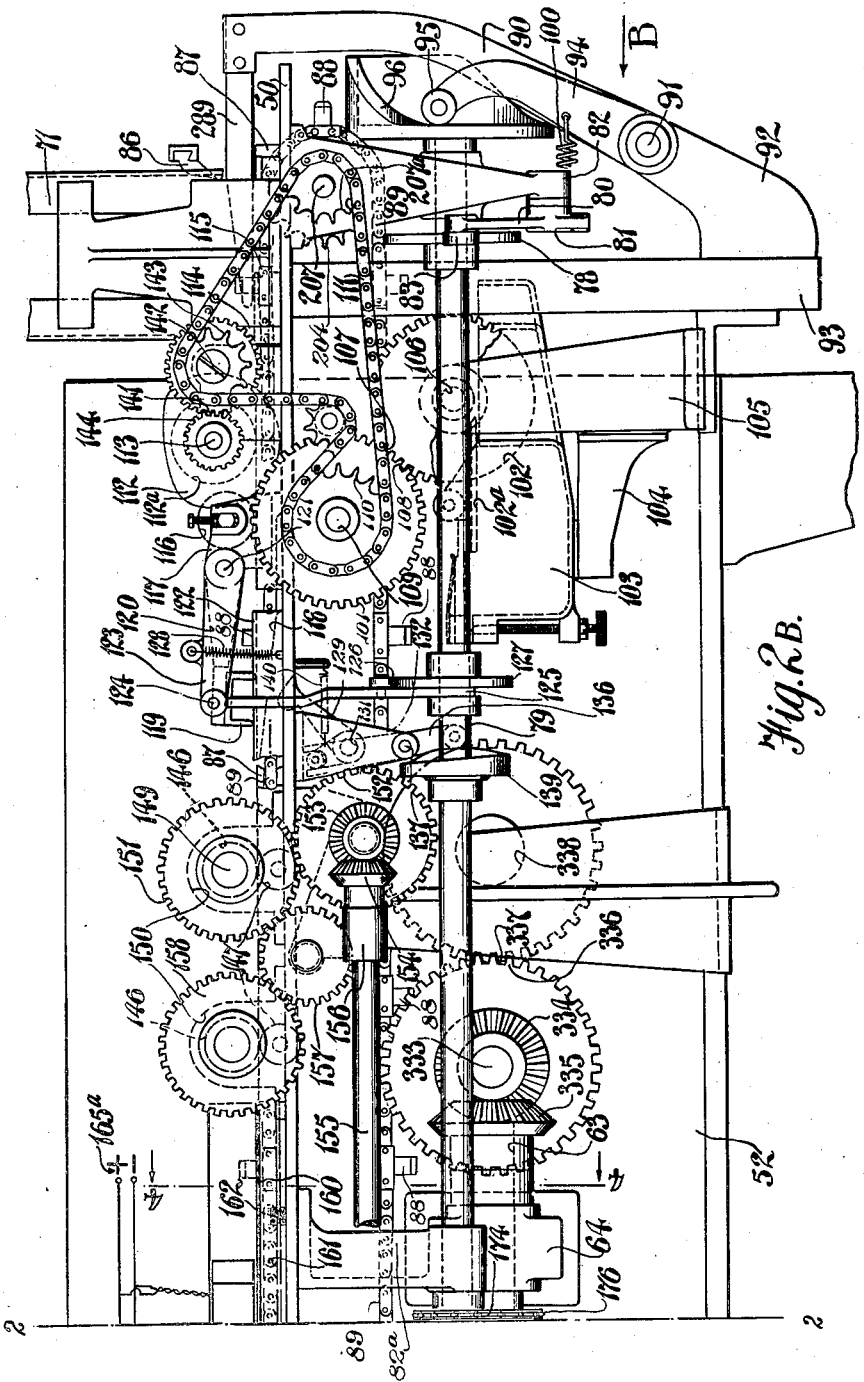

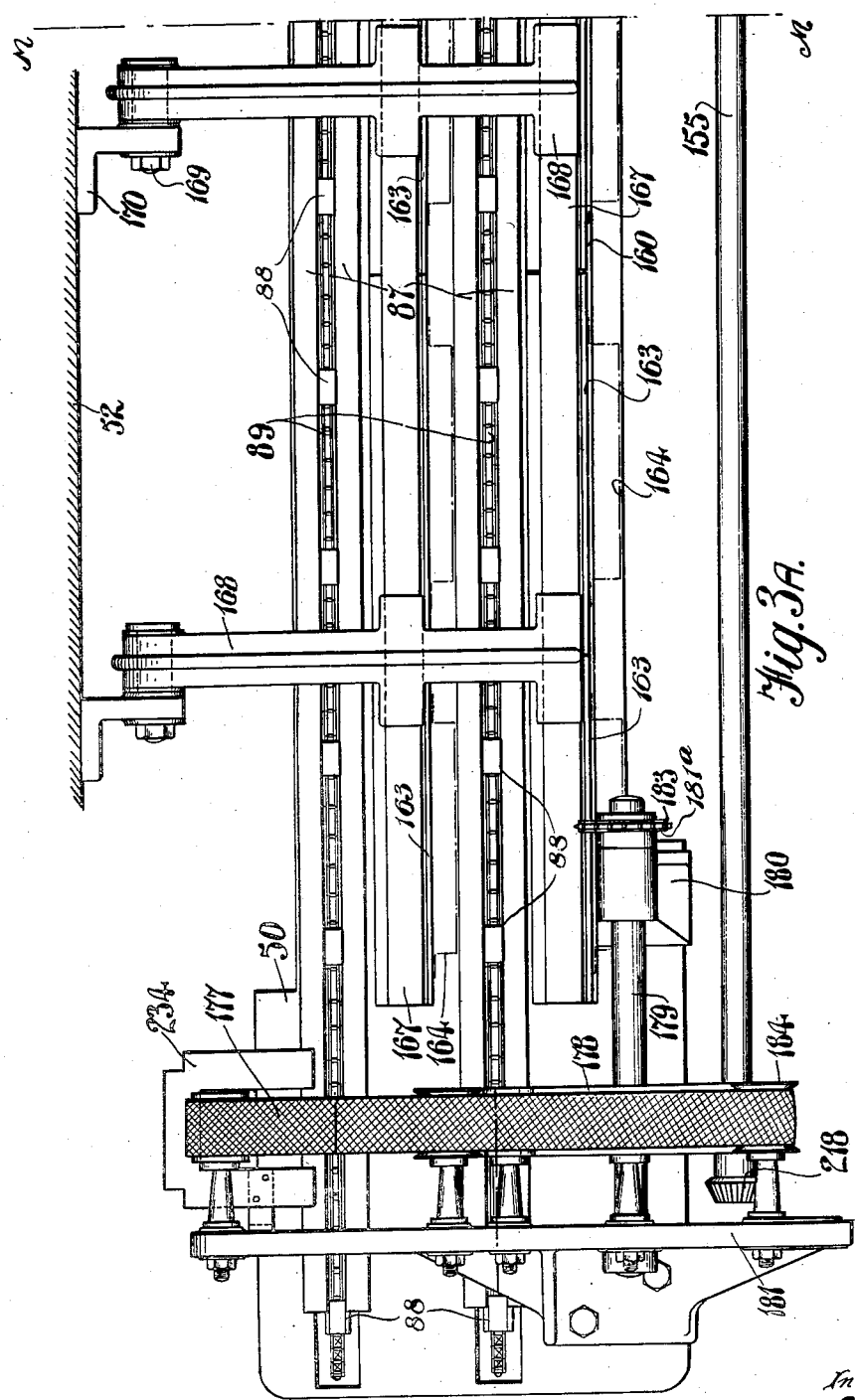

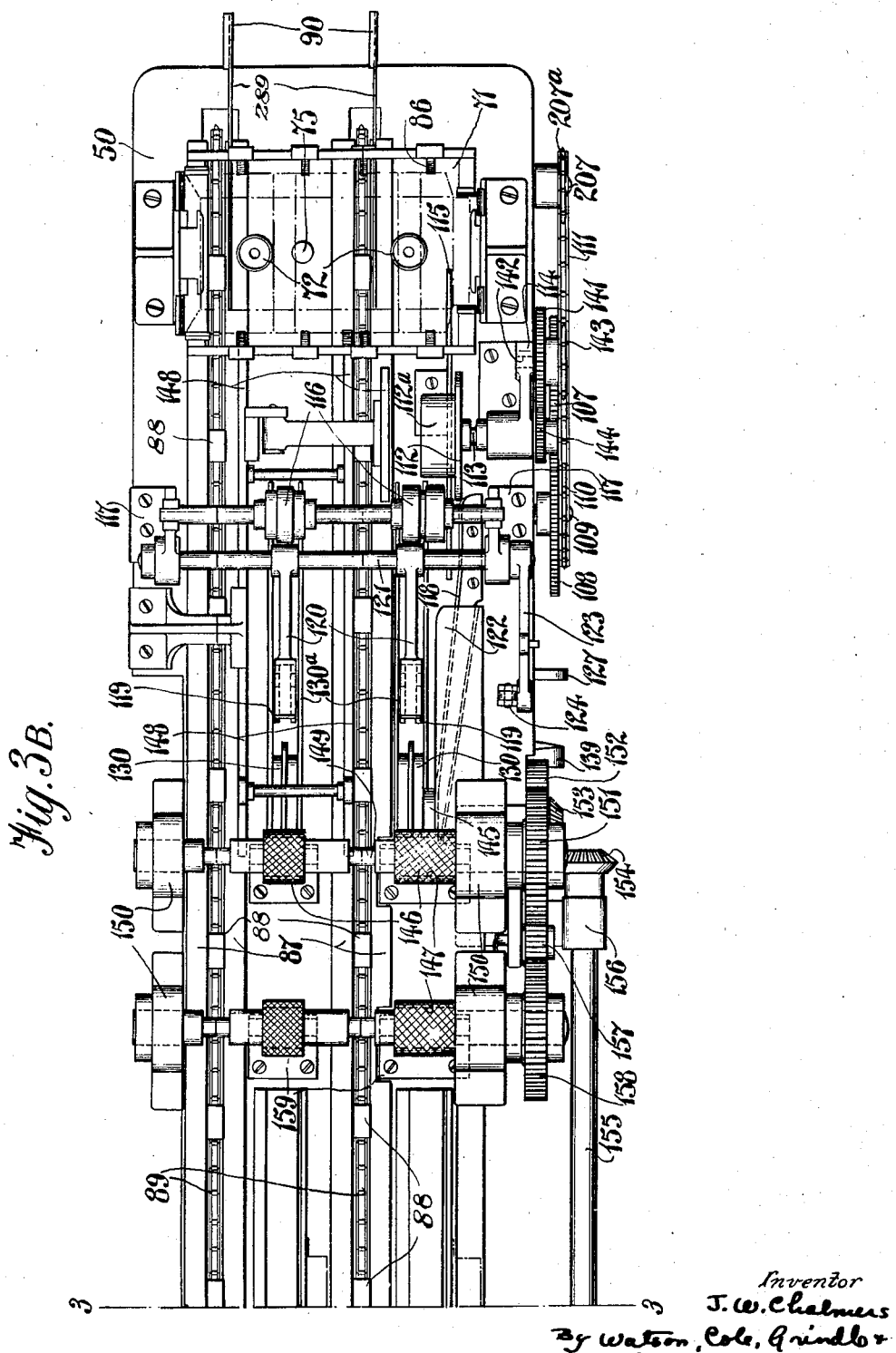

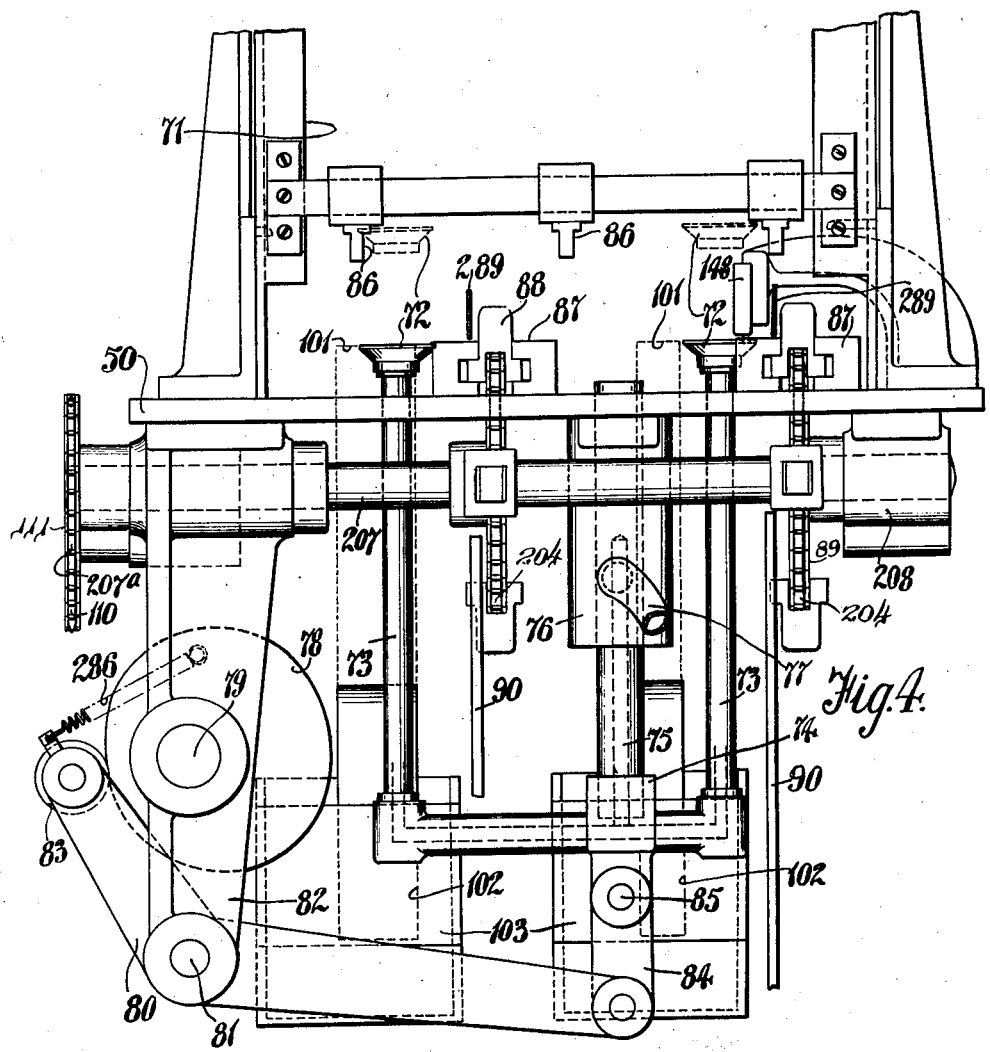

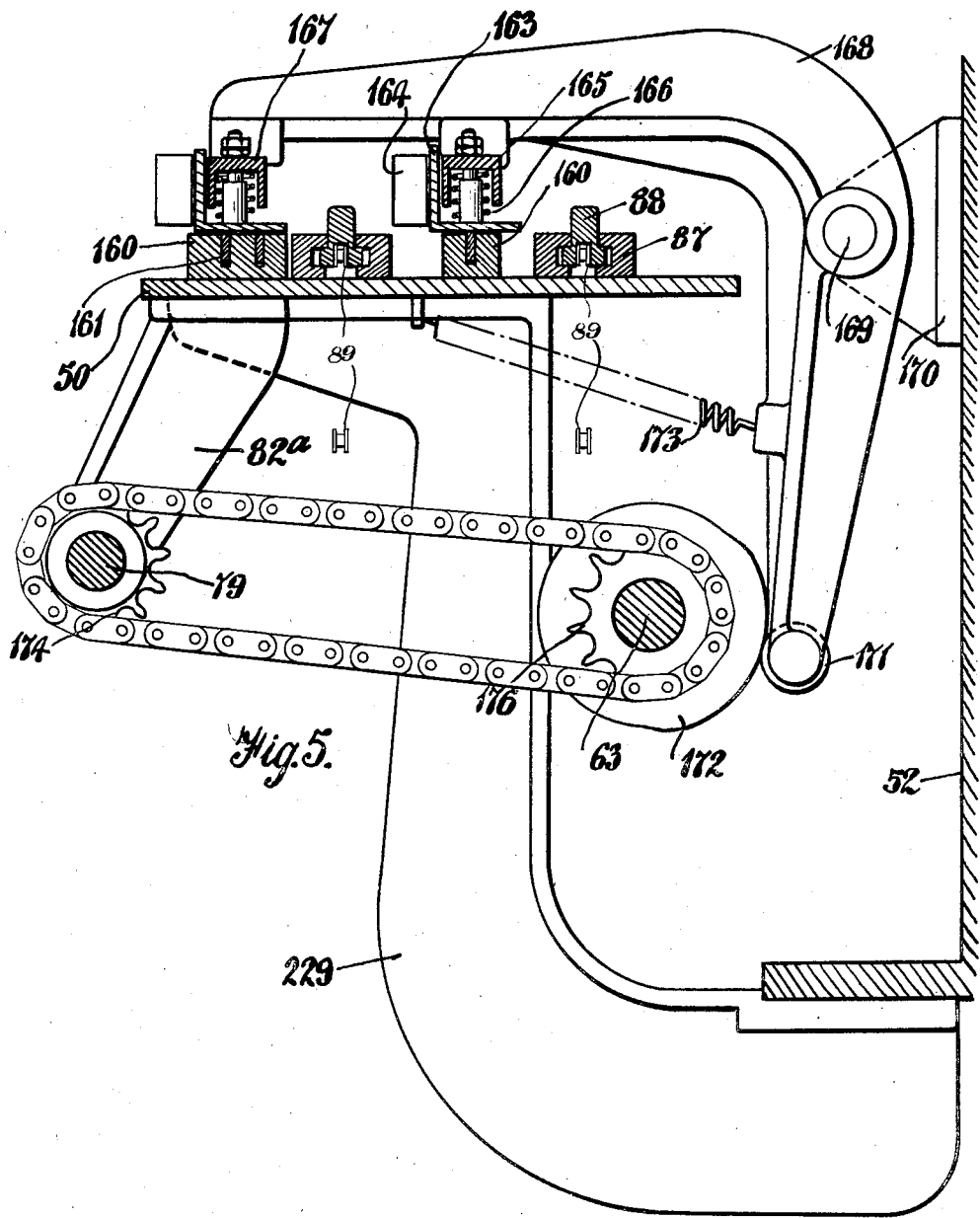

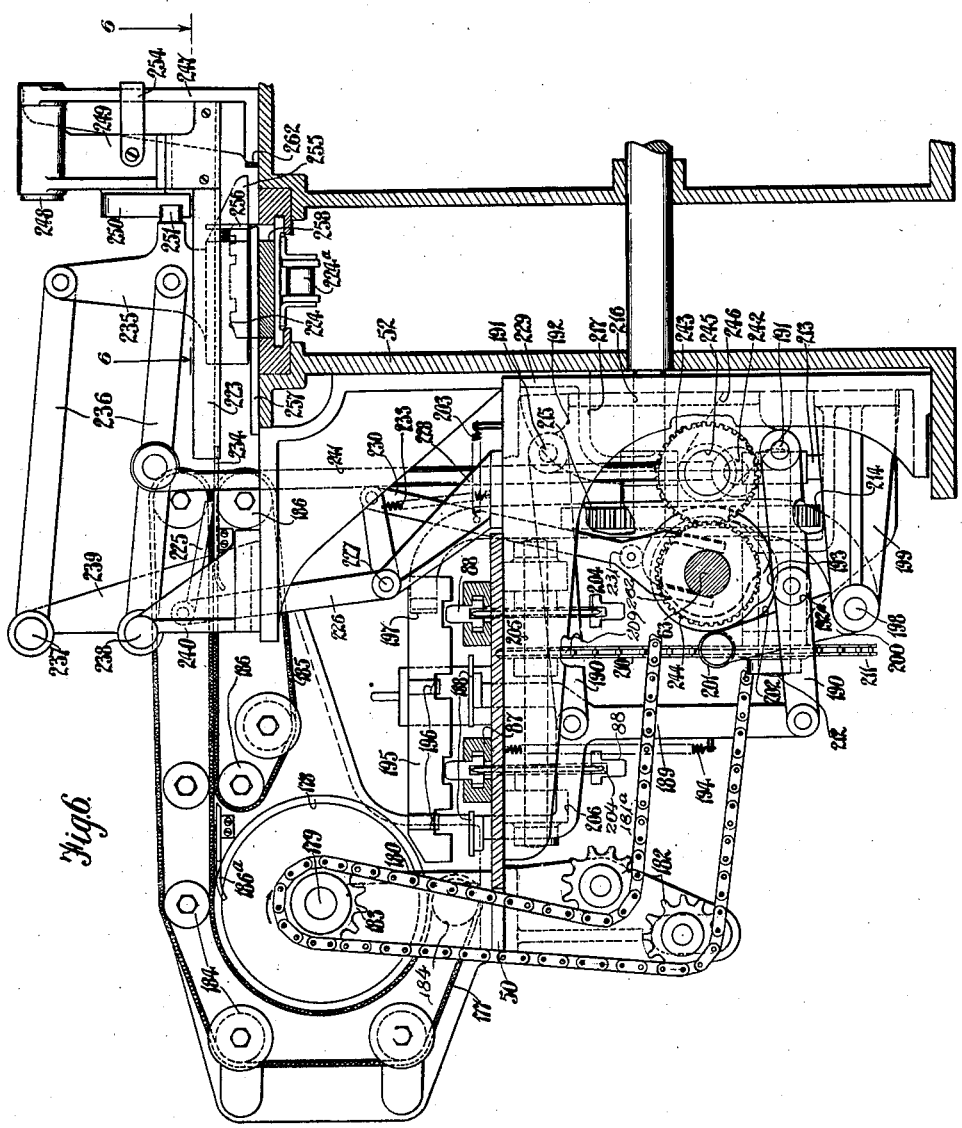

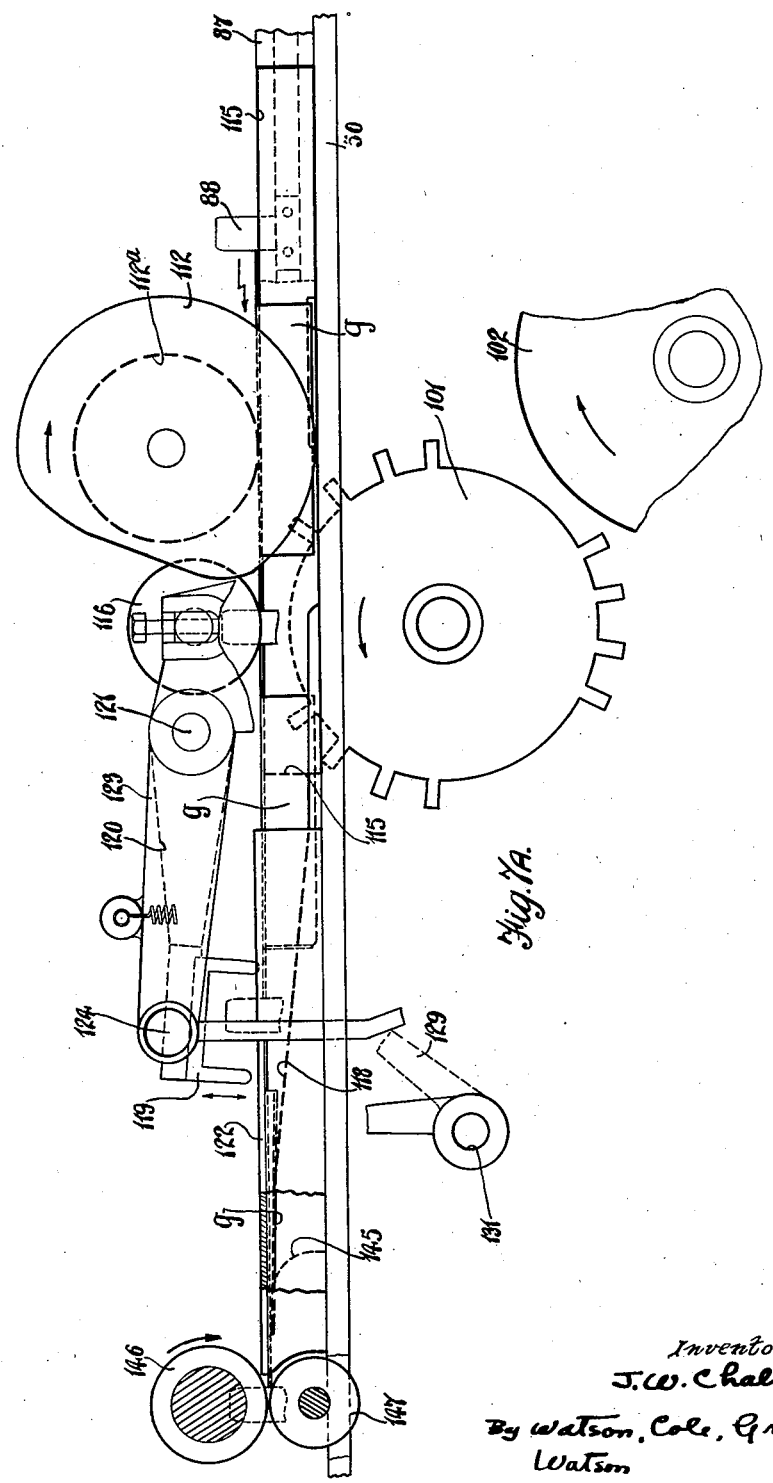

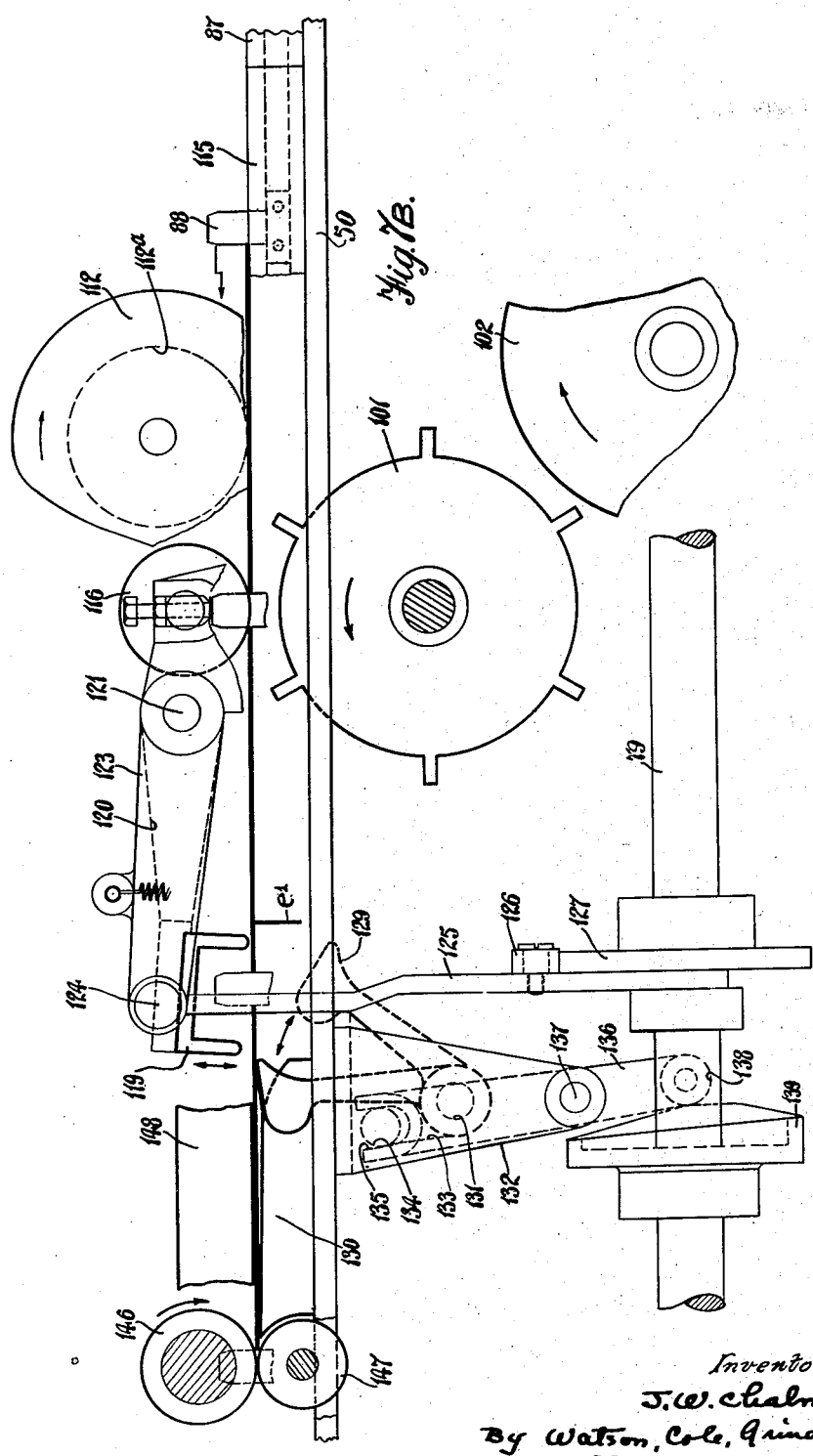

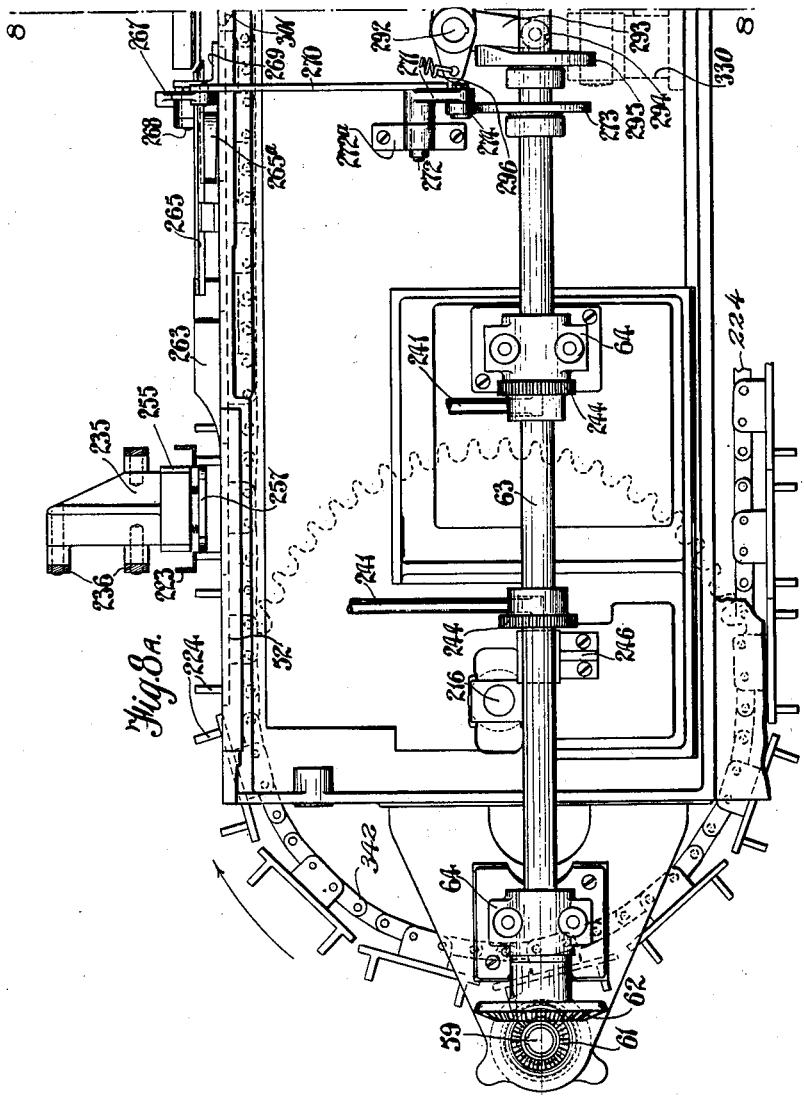

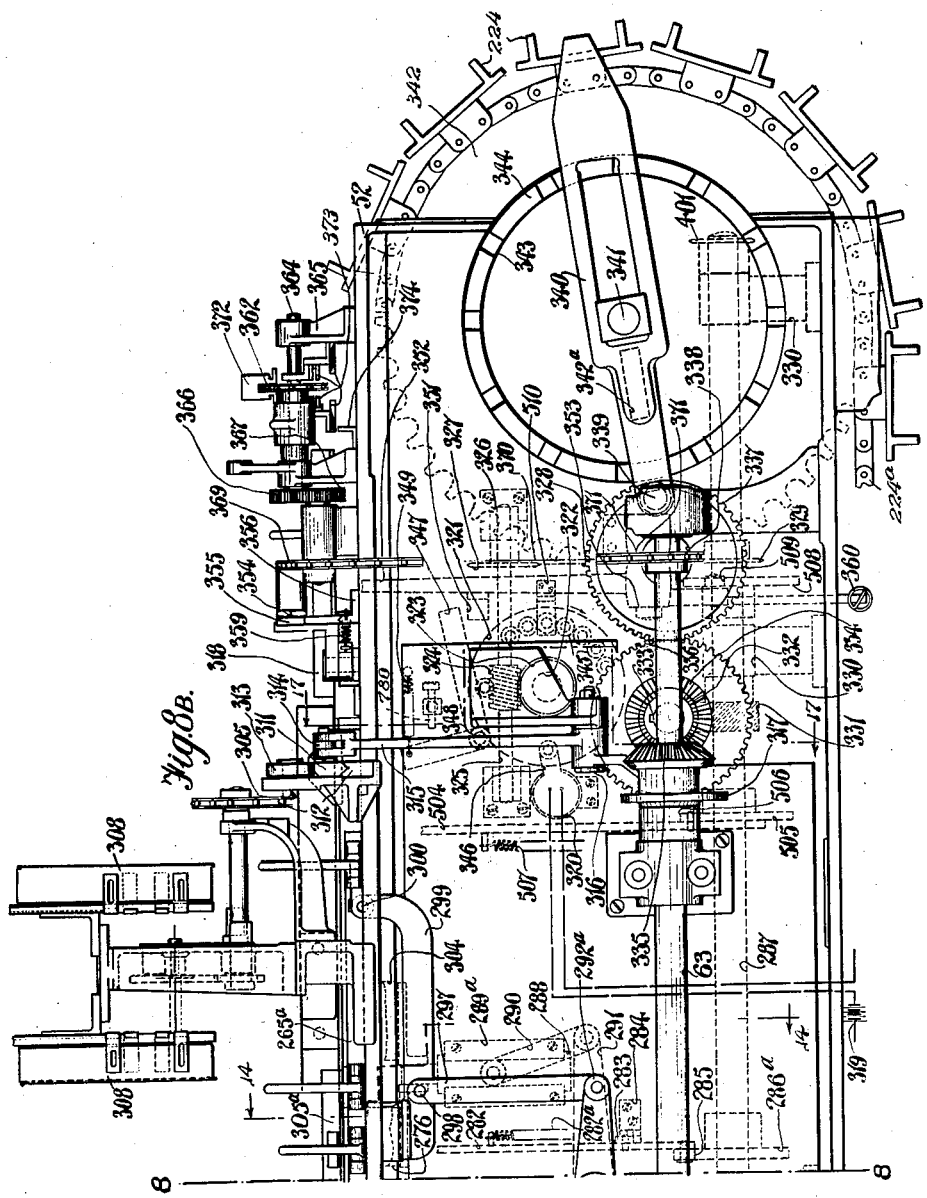

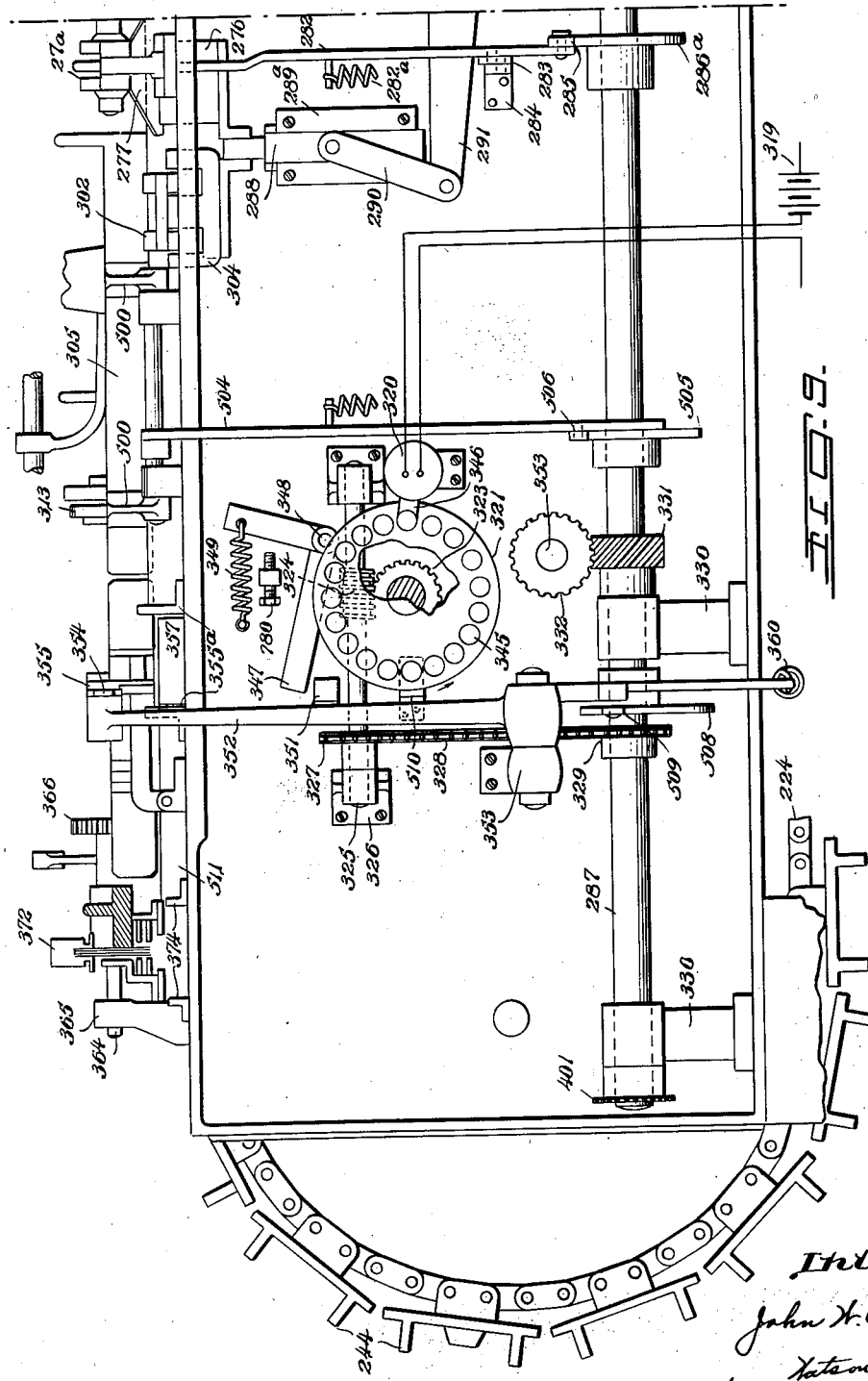

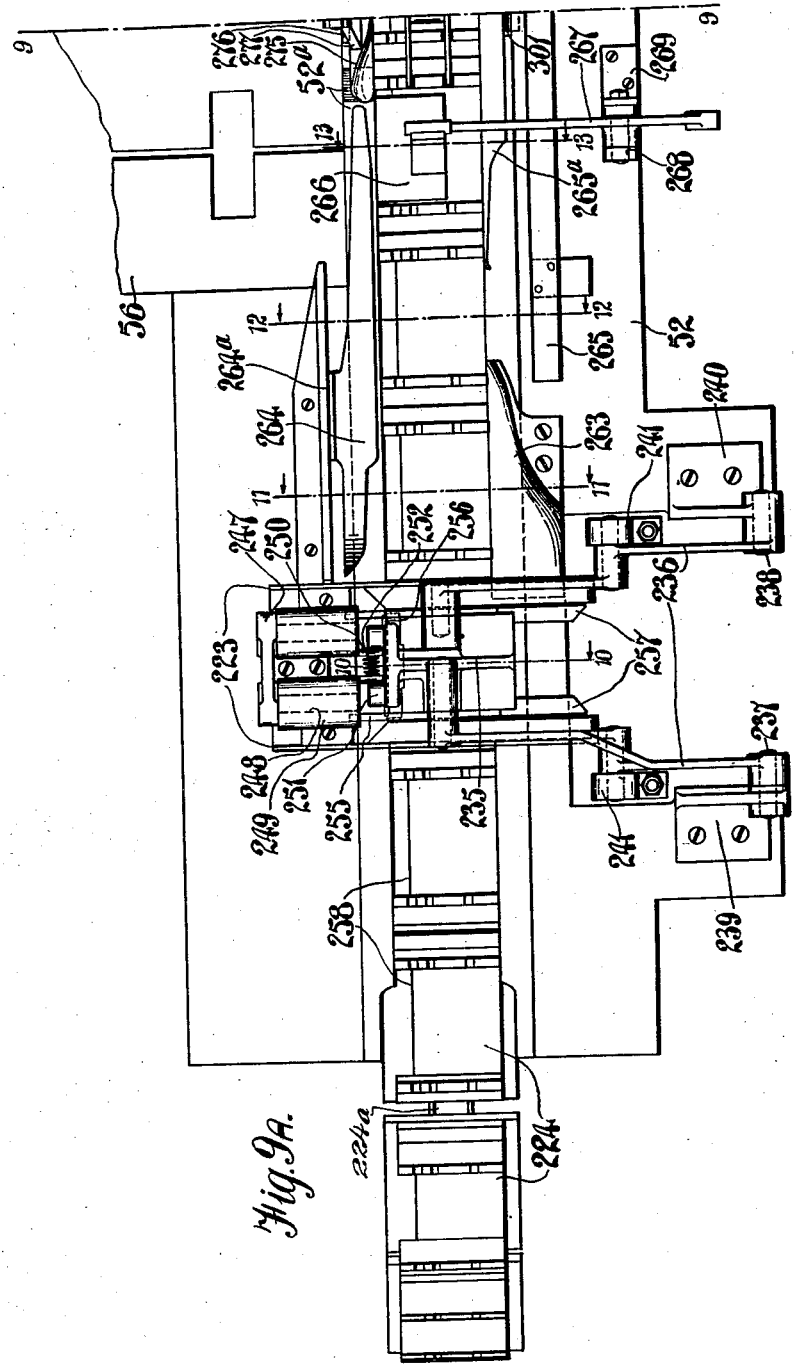

July 1, 1941. J. W. CHALMERS 2,247,871
PACKING OF CIGARETTES OR OTHER ARTICLES
Filed July 31, 1939 36 Sheets-Sheet 16
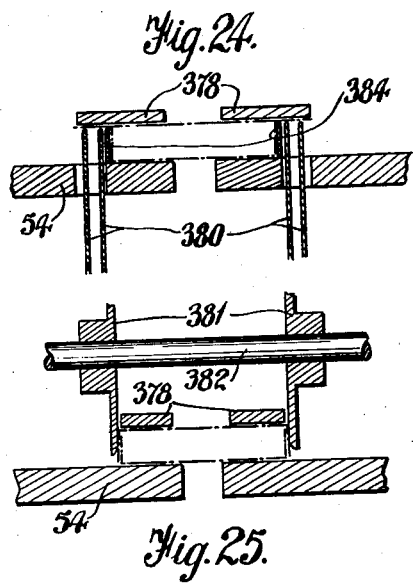
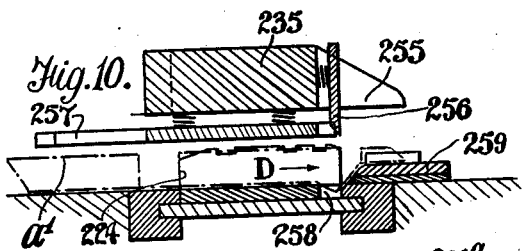
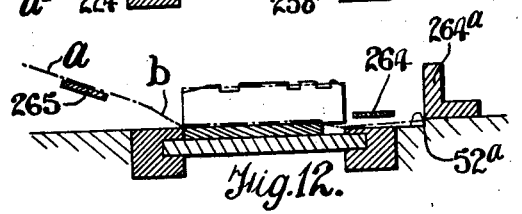
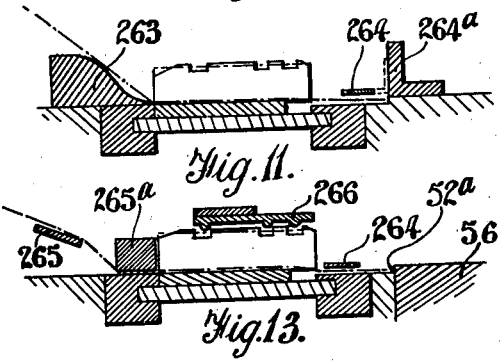
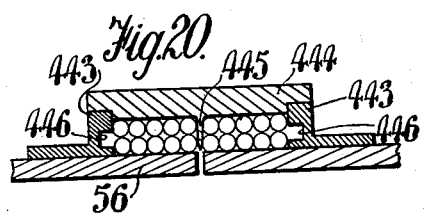
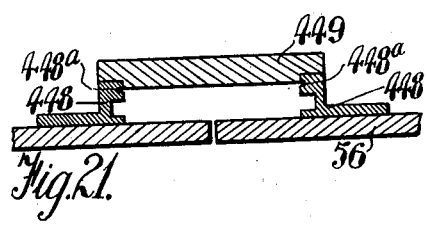
Inventor
J. W. Chalmers
By Watson, Cole, Grindle & Watson
ATTYS

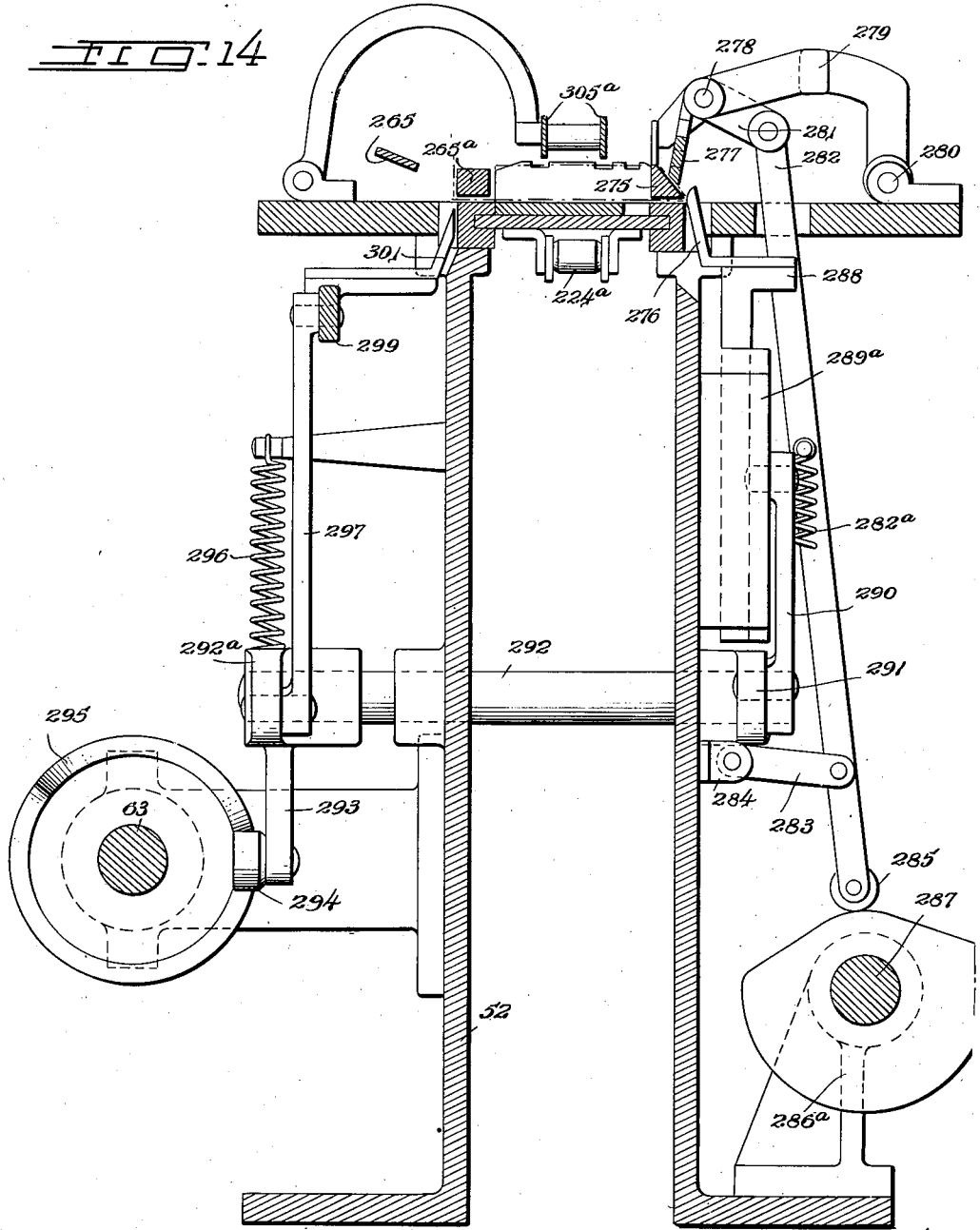

July 1, 1941.　　　J. W. CHALMERS　　　2,247,871
PACKING OF CIGARETTES OR OTHER ARTICLES
Filed July 31, 1939　　　36 Sheets-Sheet 18
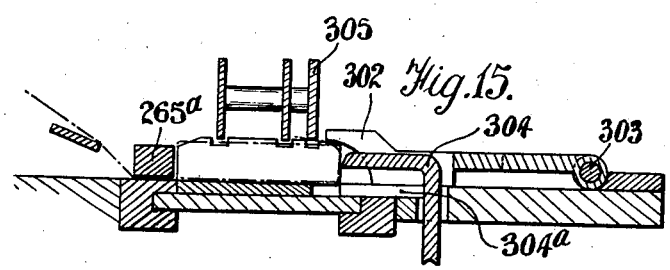
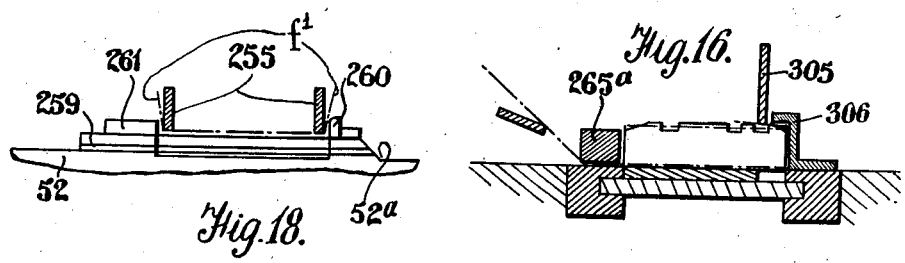

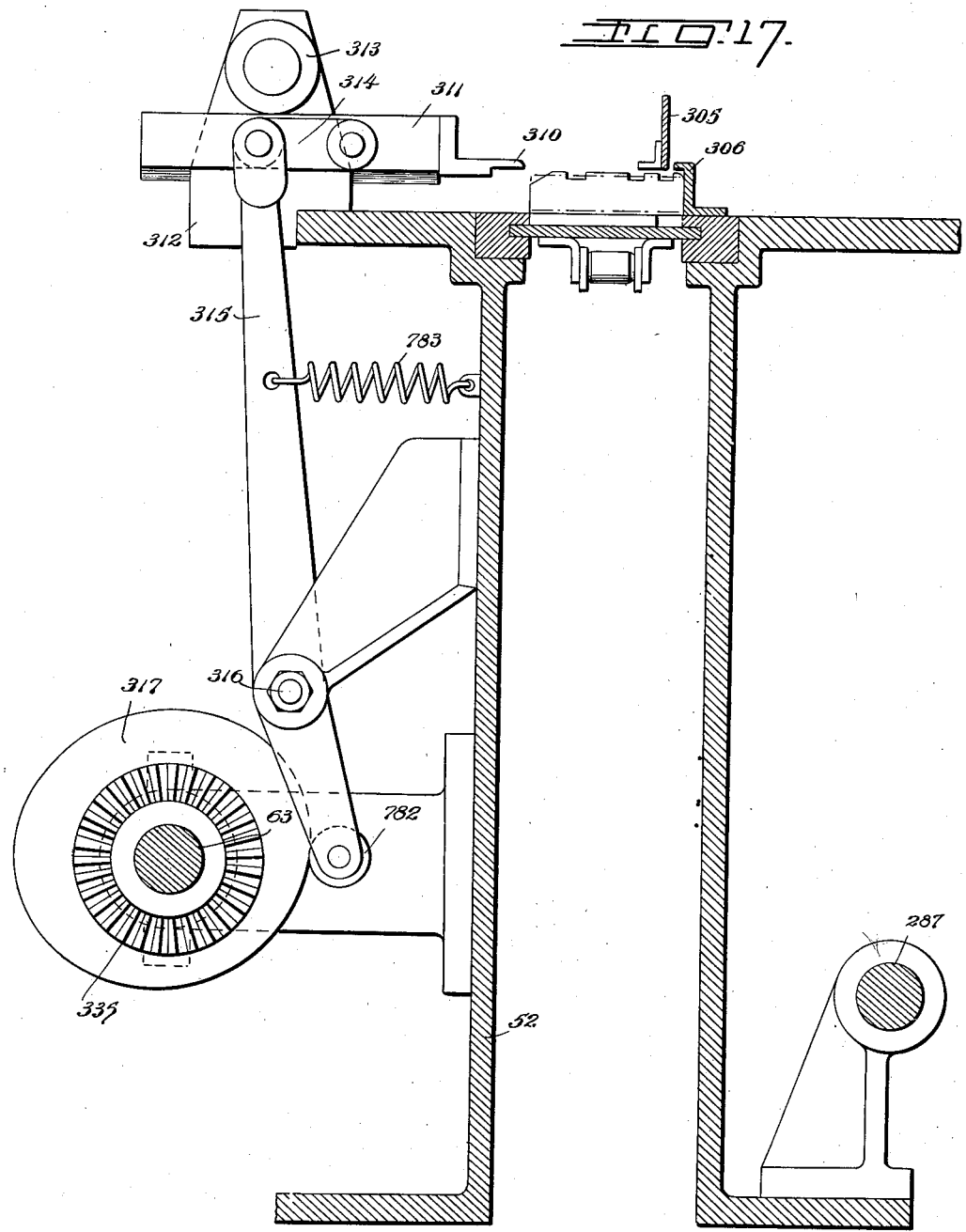

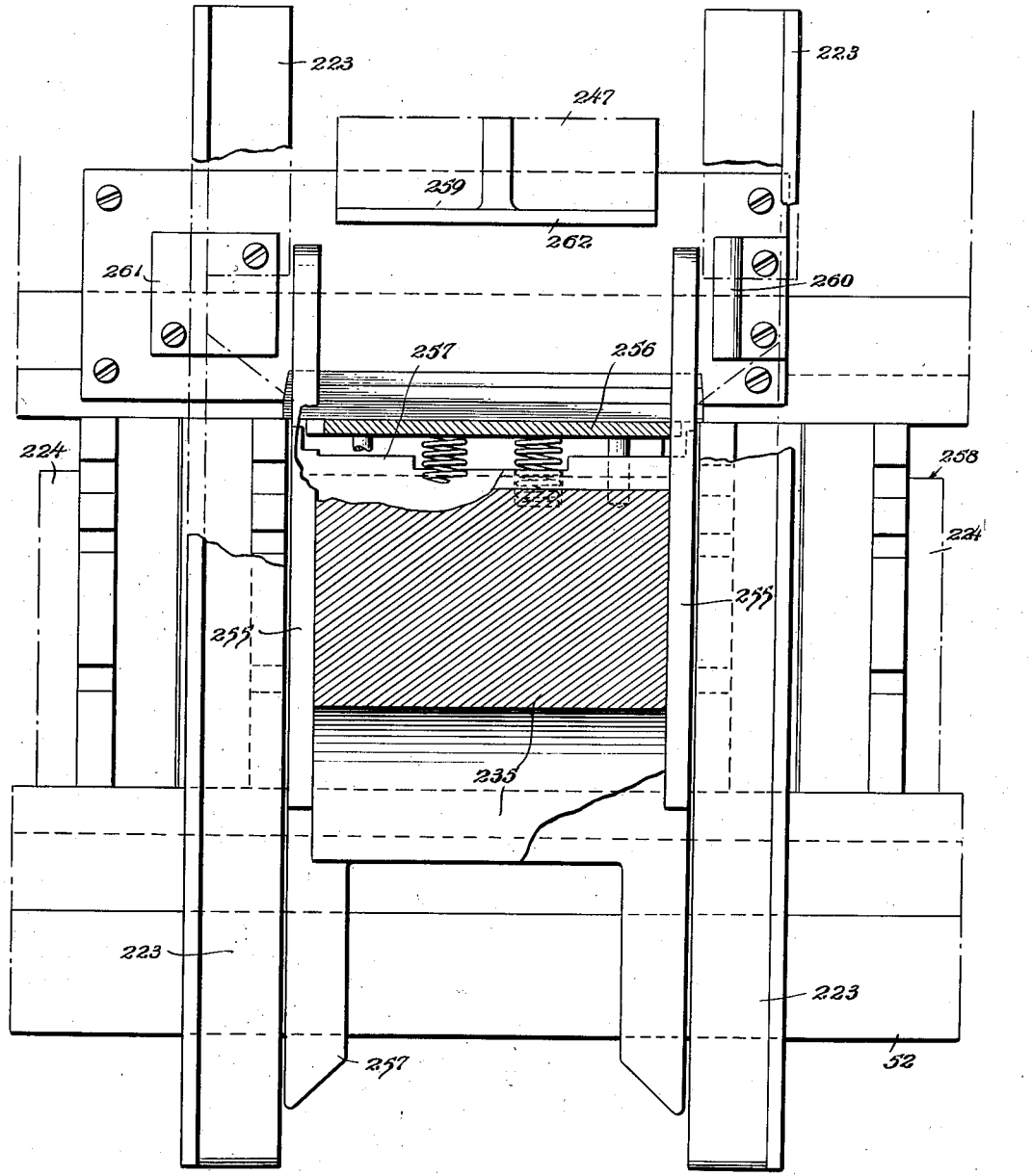

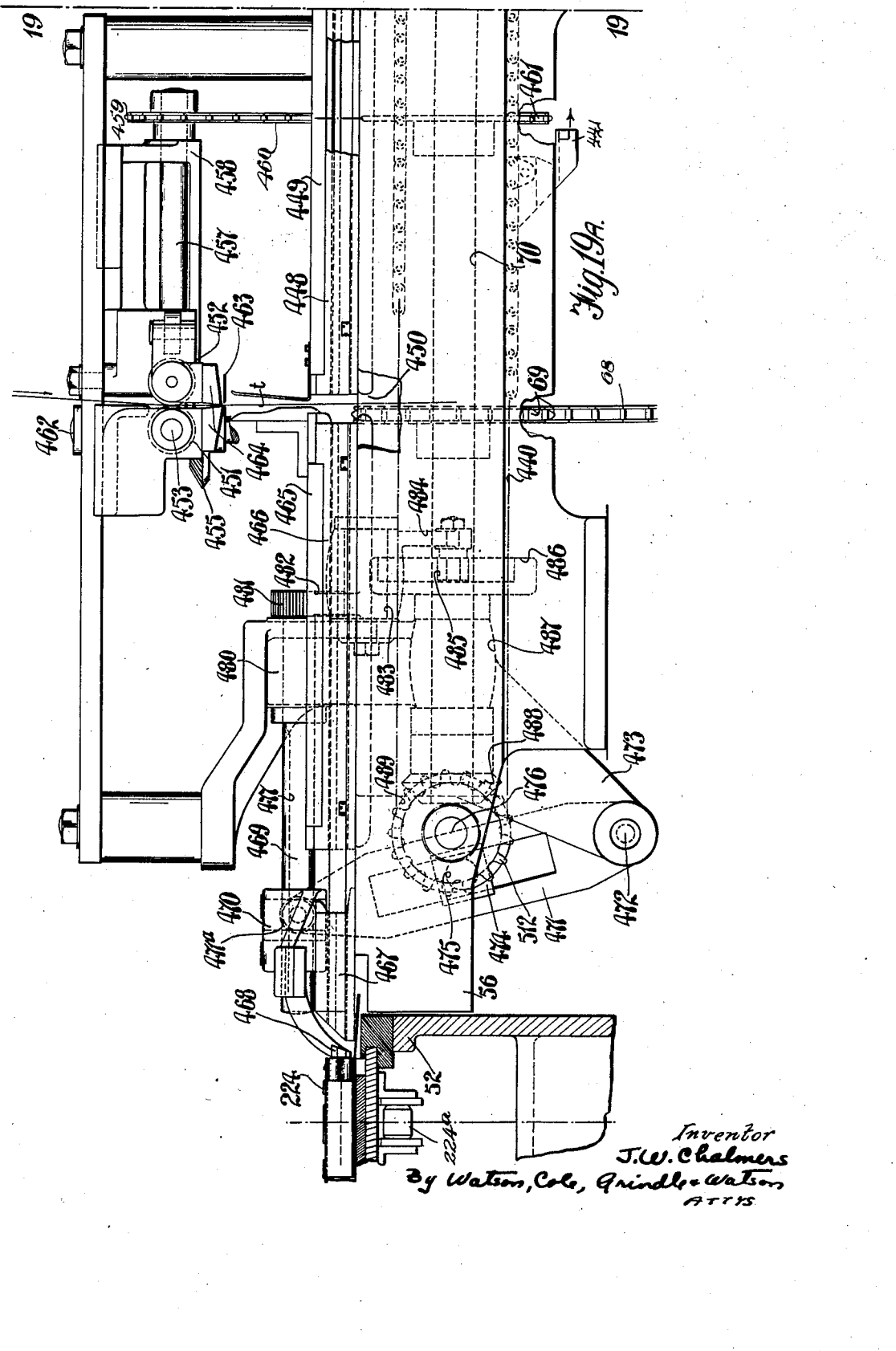

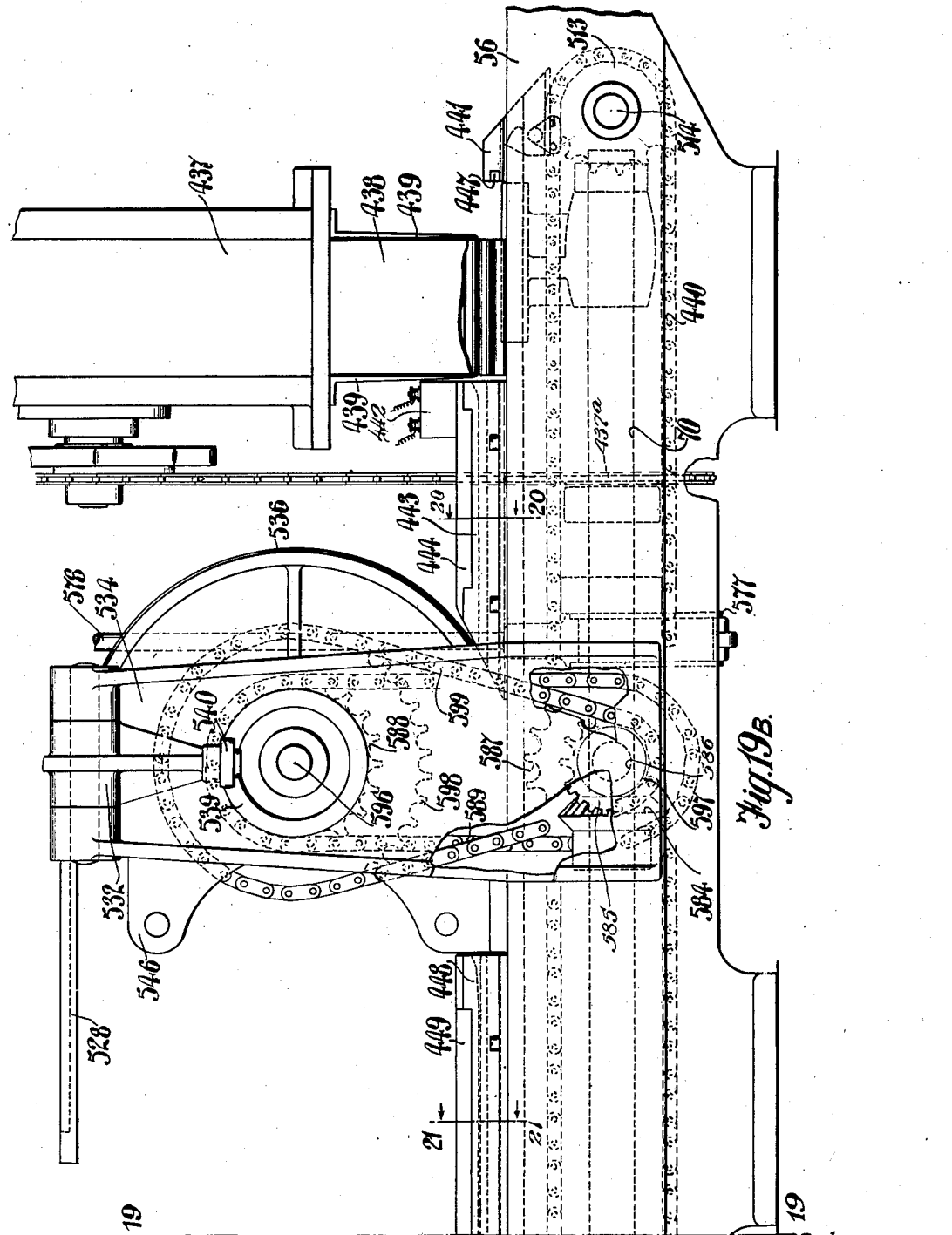

July 1, 1941.   J. W. CHALMERS   2,247,871
PACKING OF CIGARETTES OR OTHER ARTICLES
Filed July 31, 1939   36 Sheets-Sheet 23
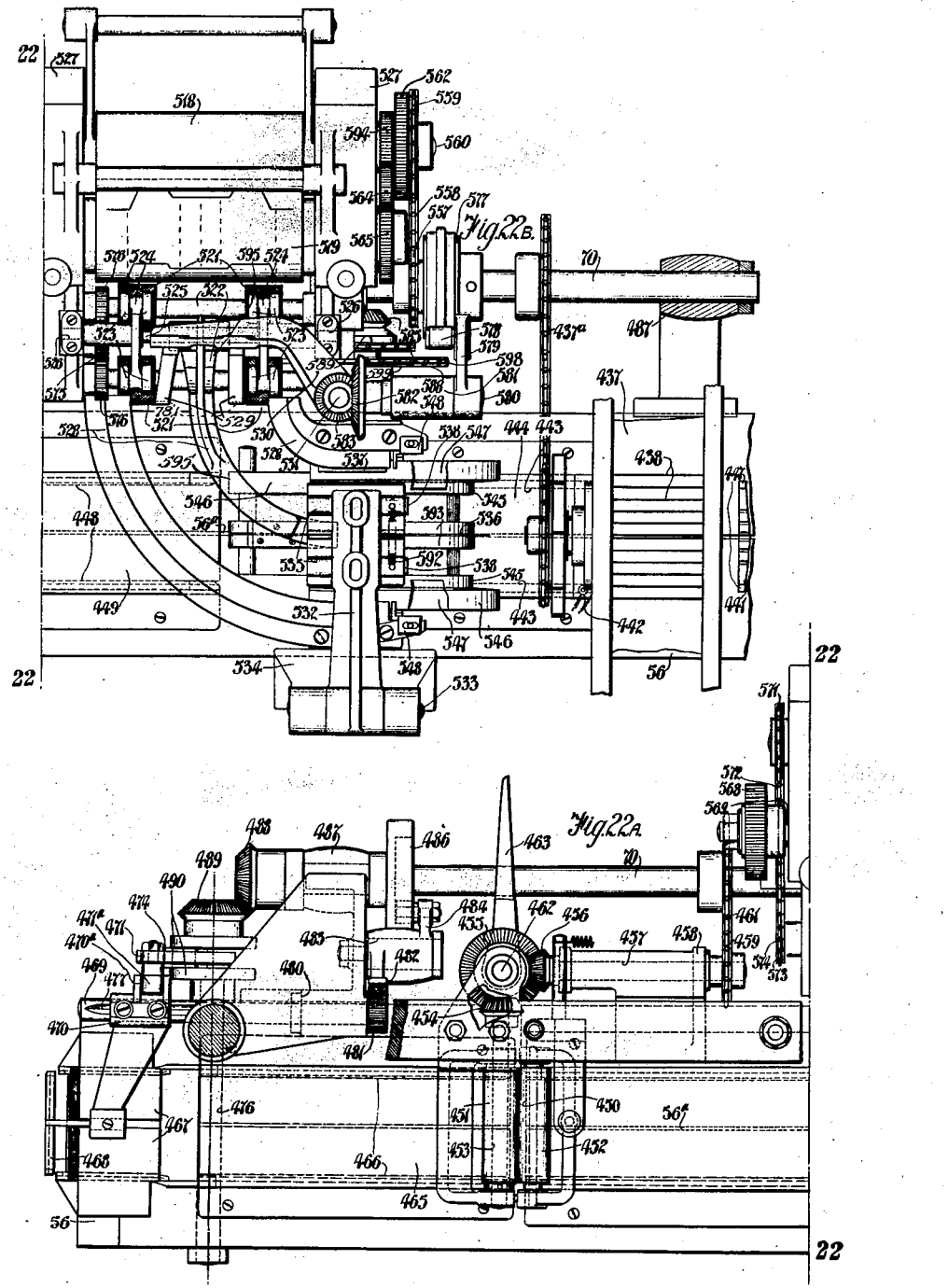

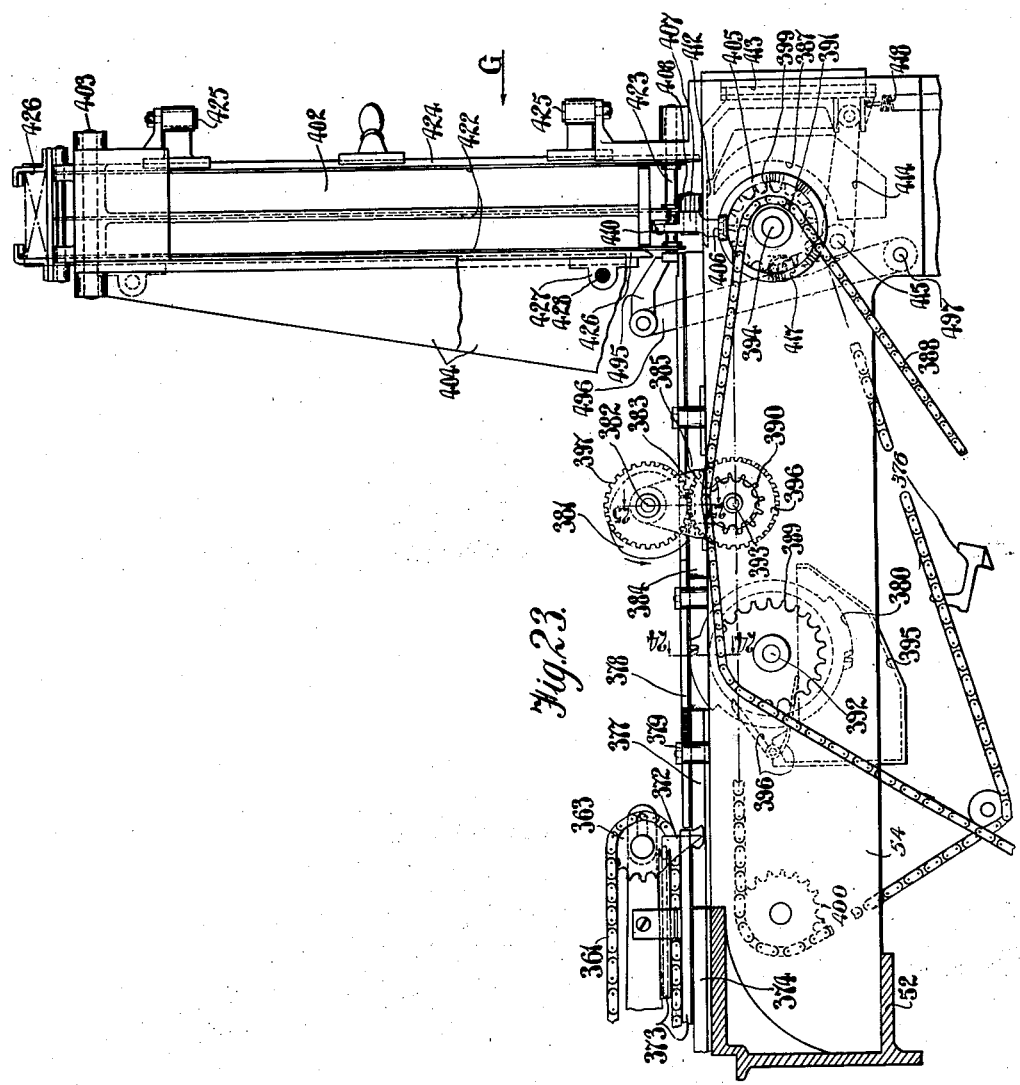

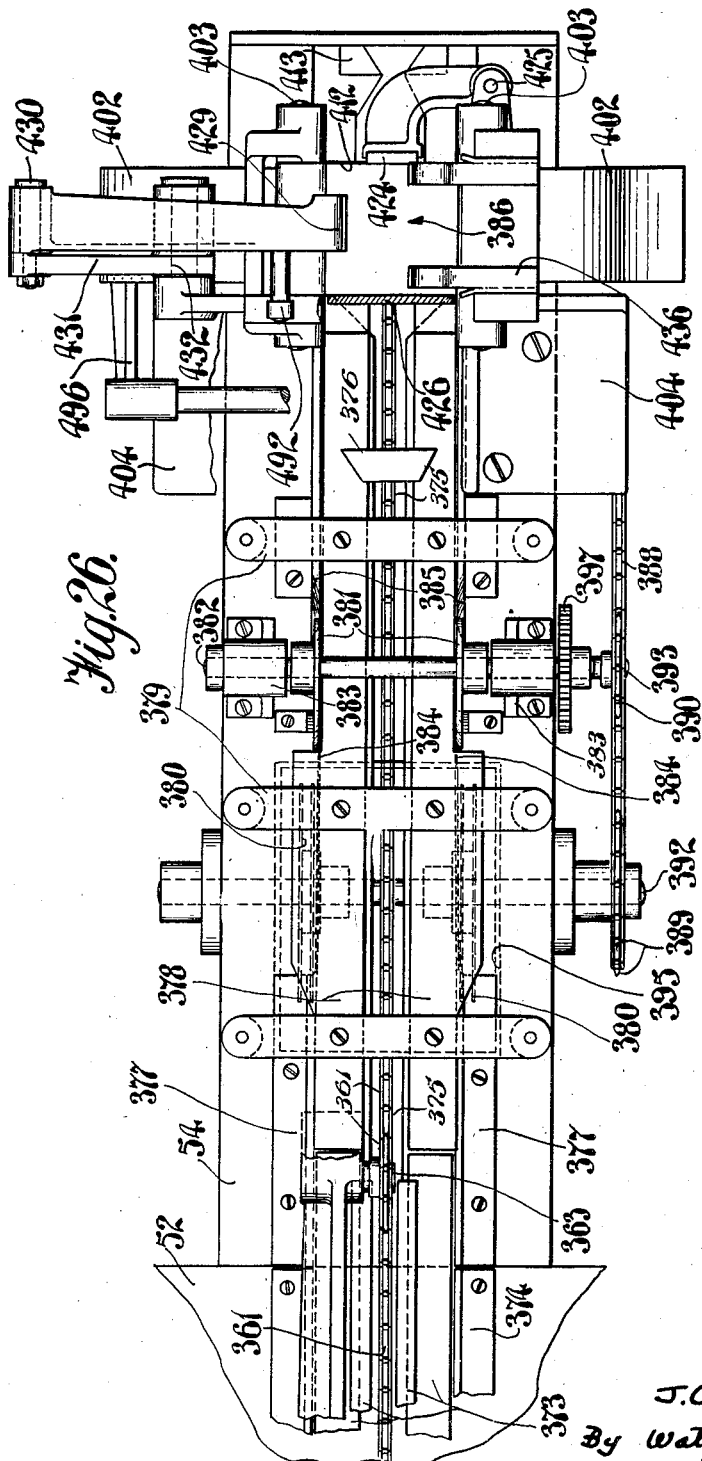

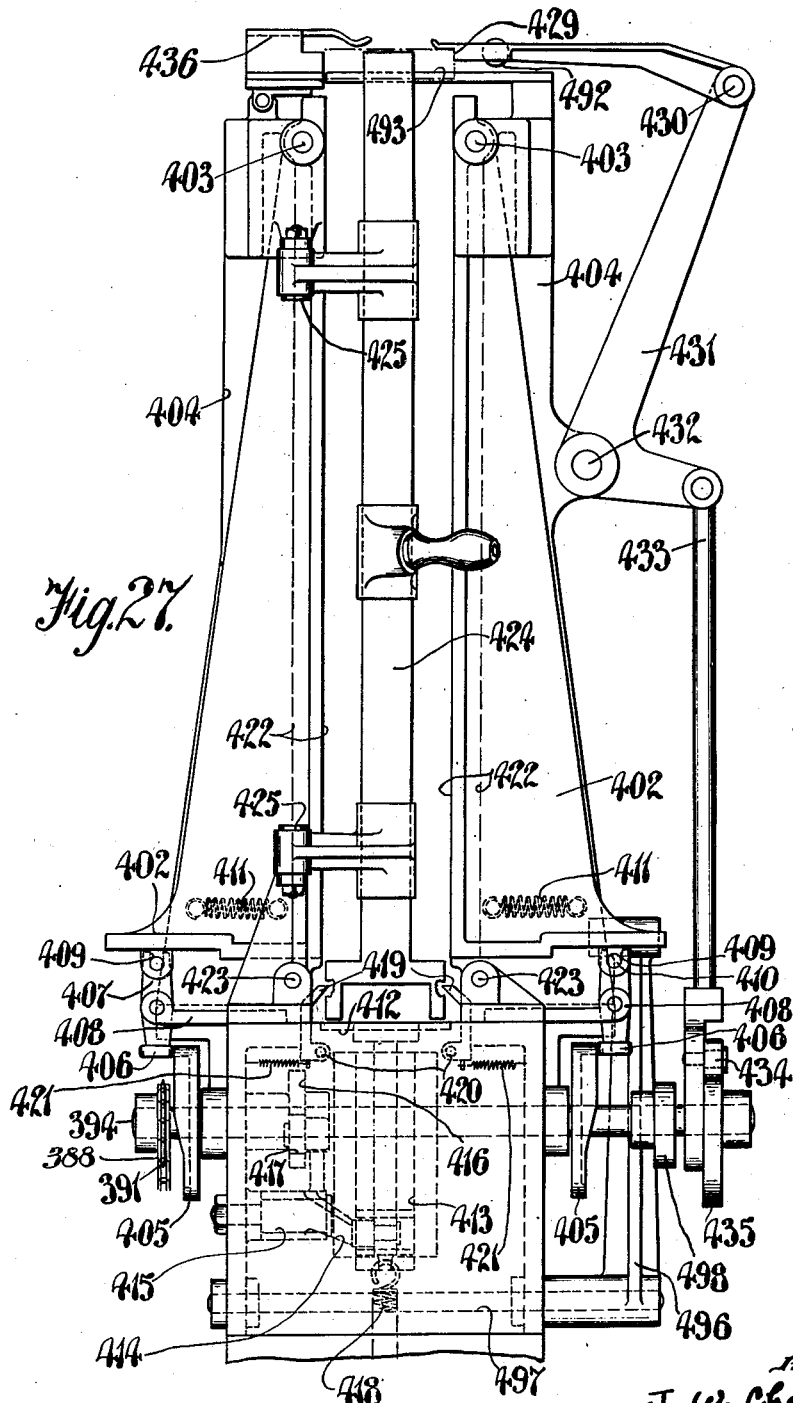

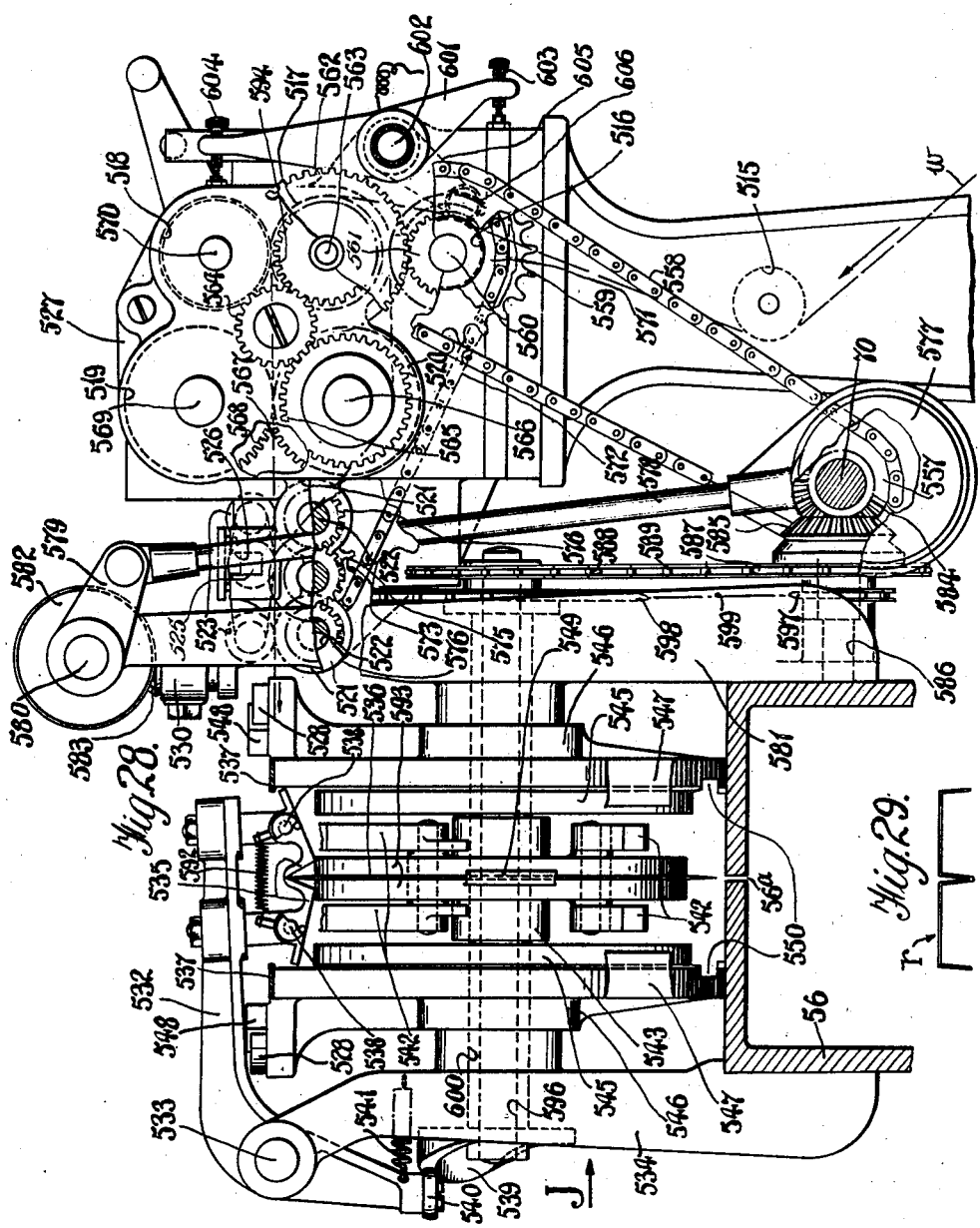

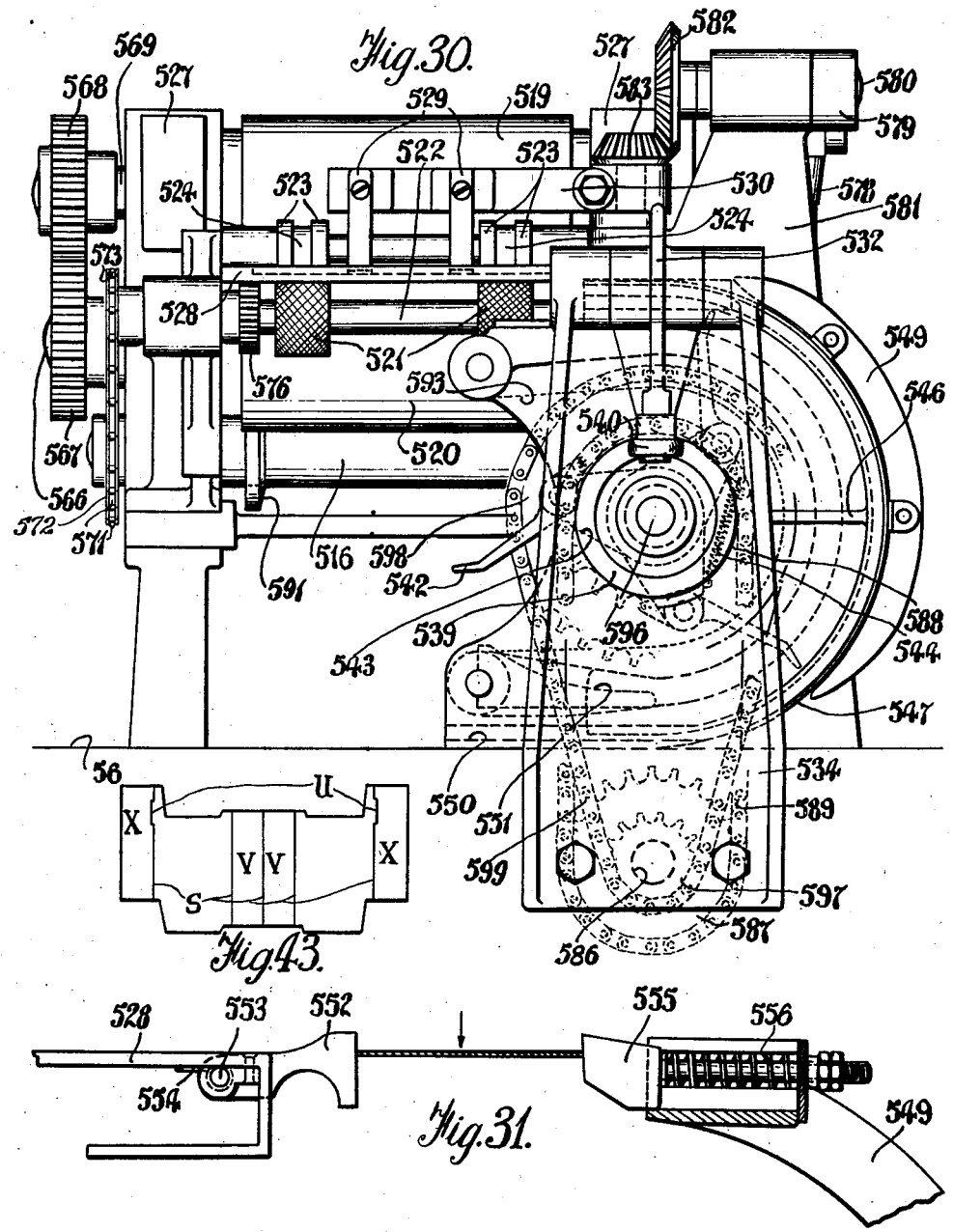

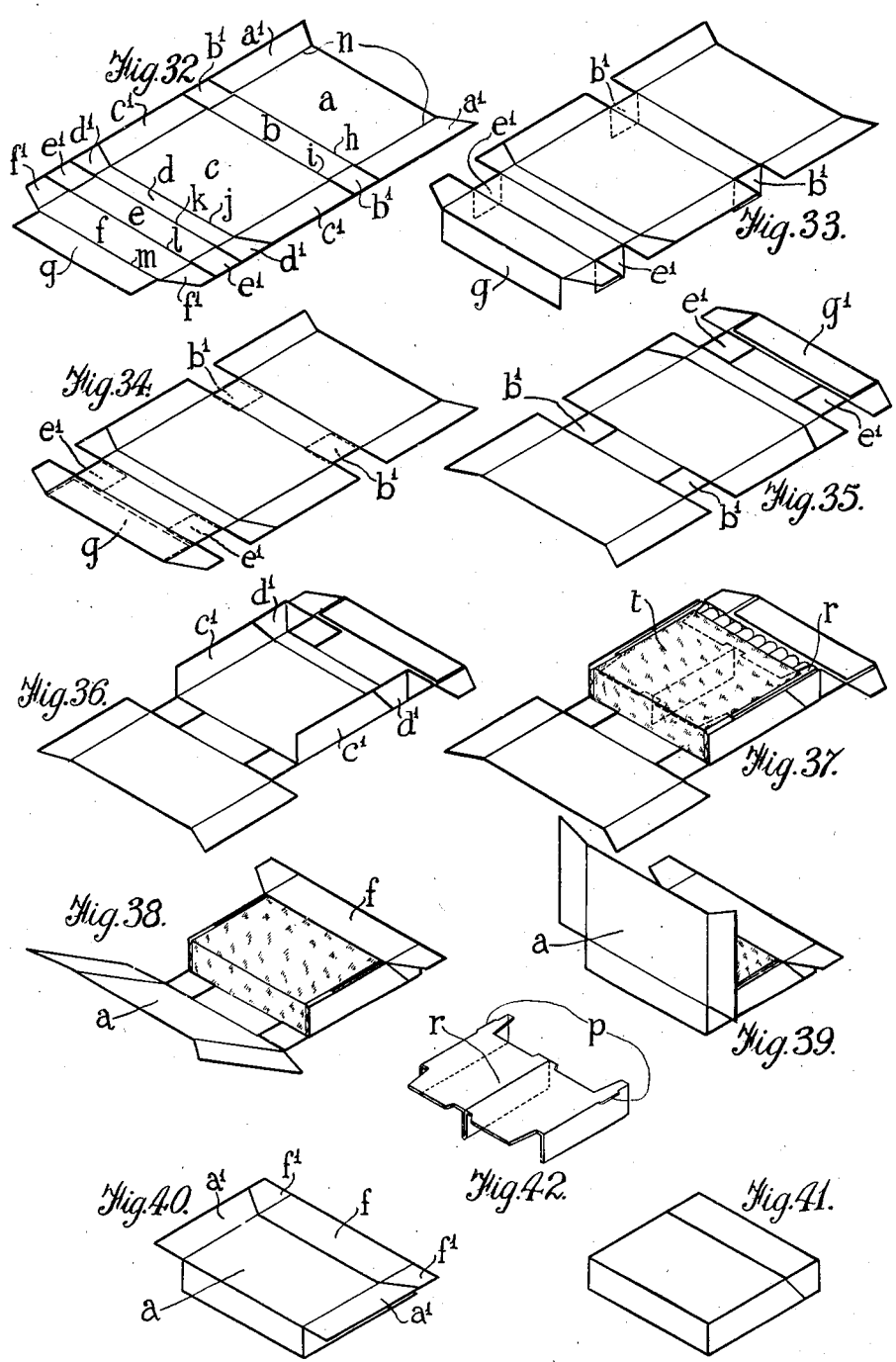

July 1, 1941. J. W. CHALMERS 2,247,871
PACKING OF CIGARETTES OR OTHER ARTICLES
Filed July 31, 1939 36 Sheets-Sheet 30
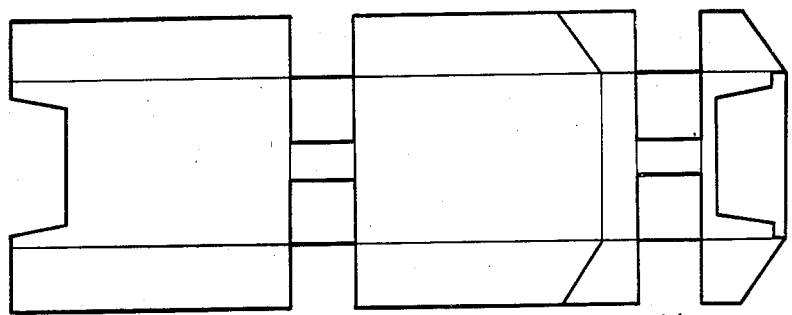
Fig.44.
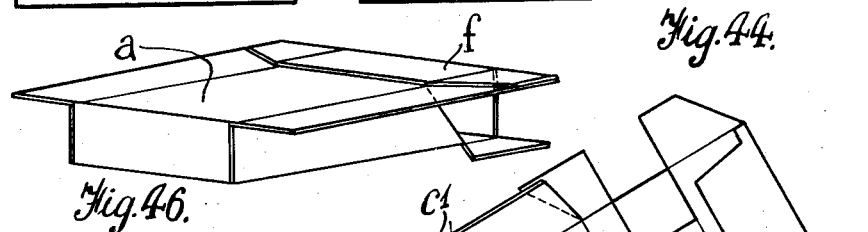
Fig.46.
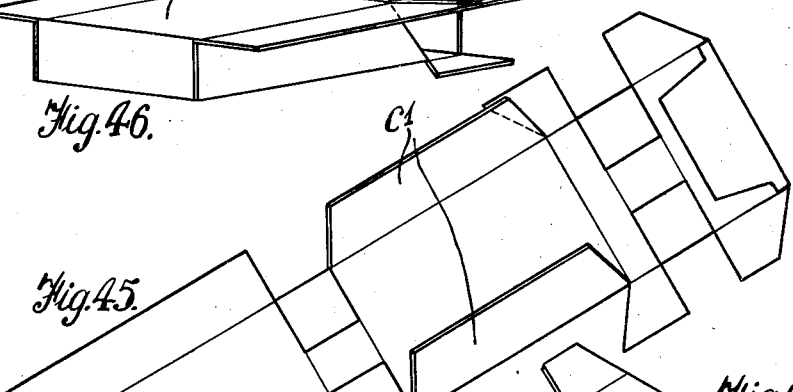
Fig.45.
Fig.47.
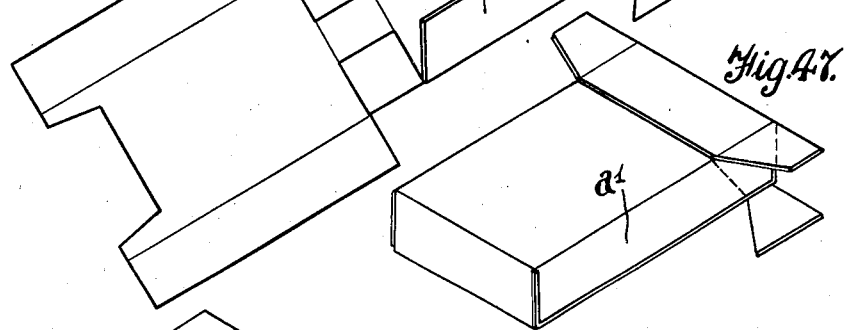
Fig.48.
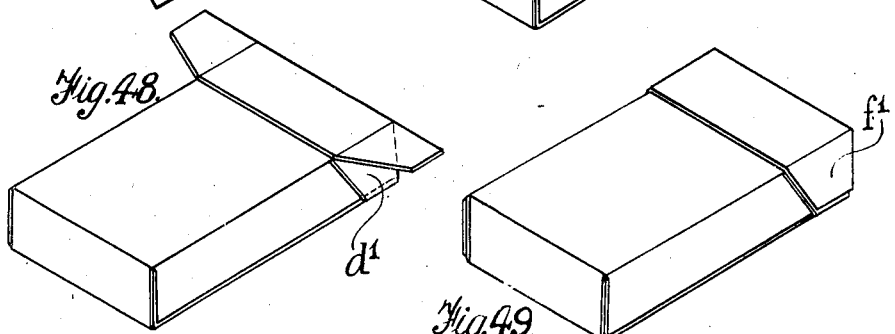
Fig.49.
Inventor
J. W. Chalmers
By Watson, Cole, Grindle &
Watson ATTYS

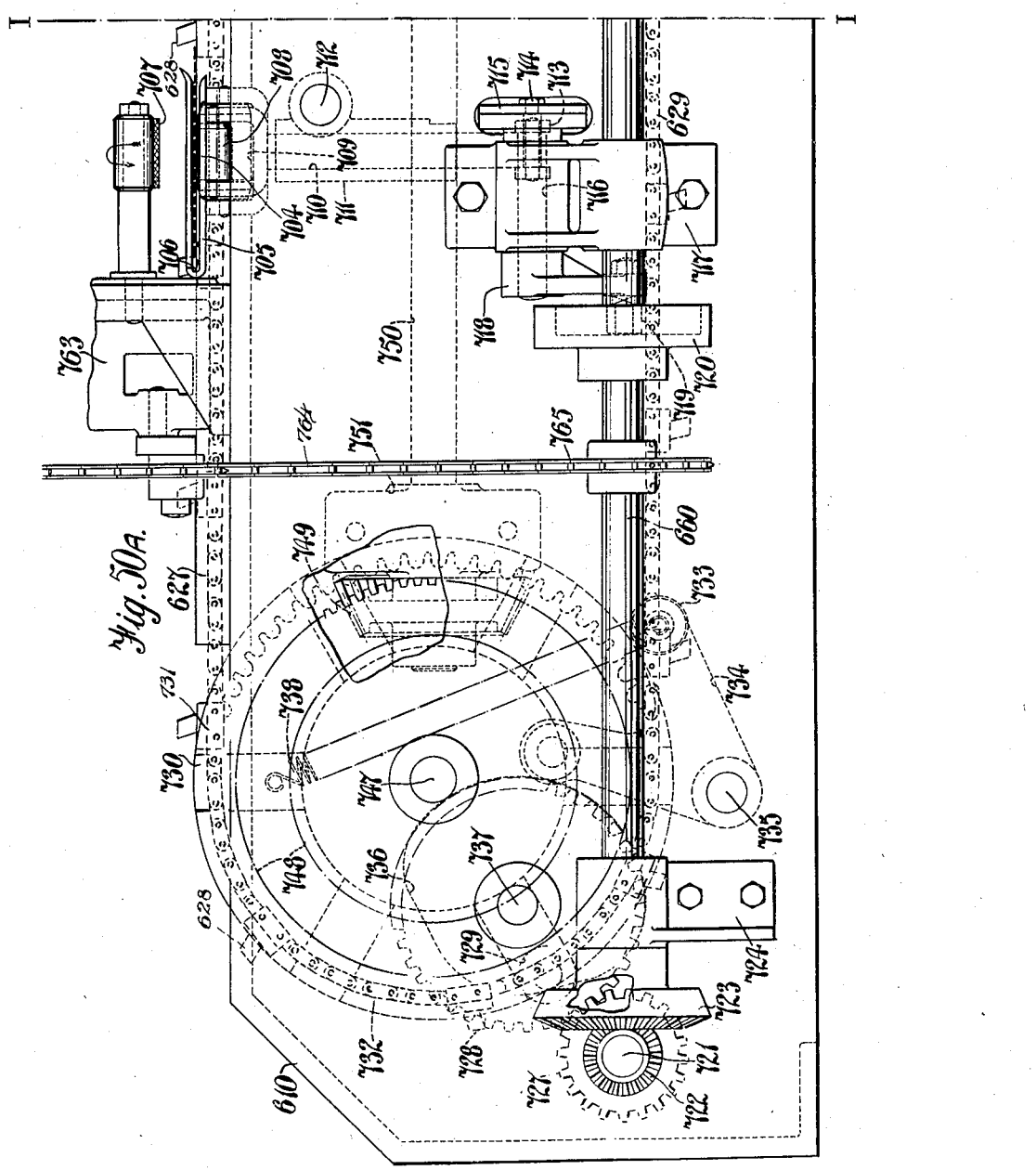

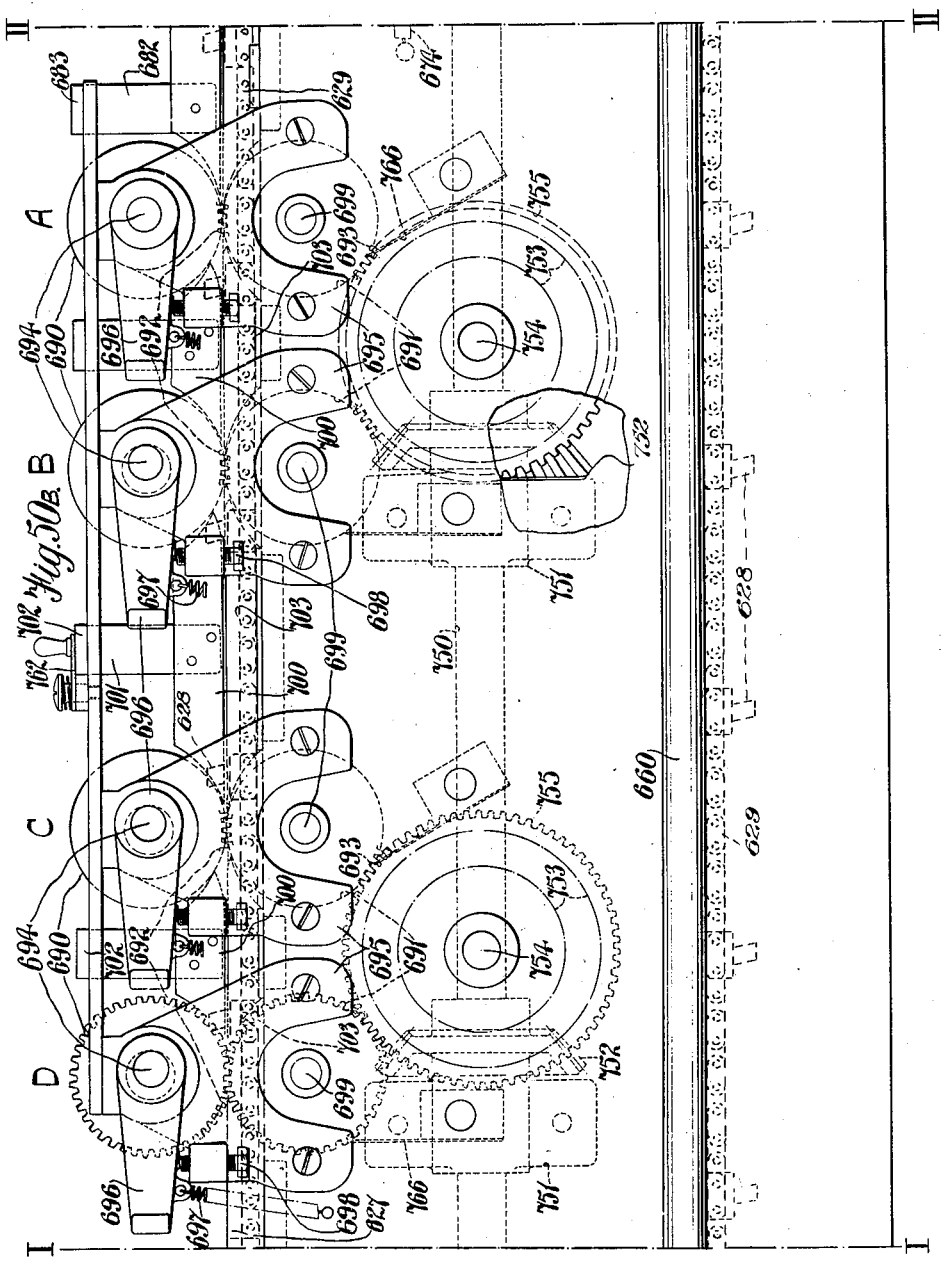

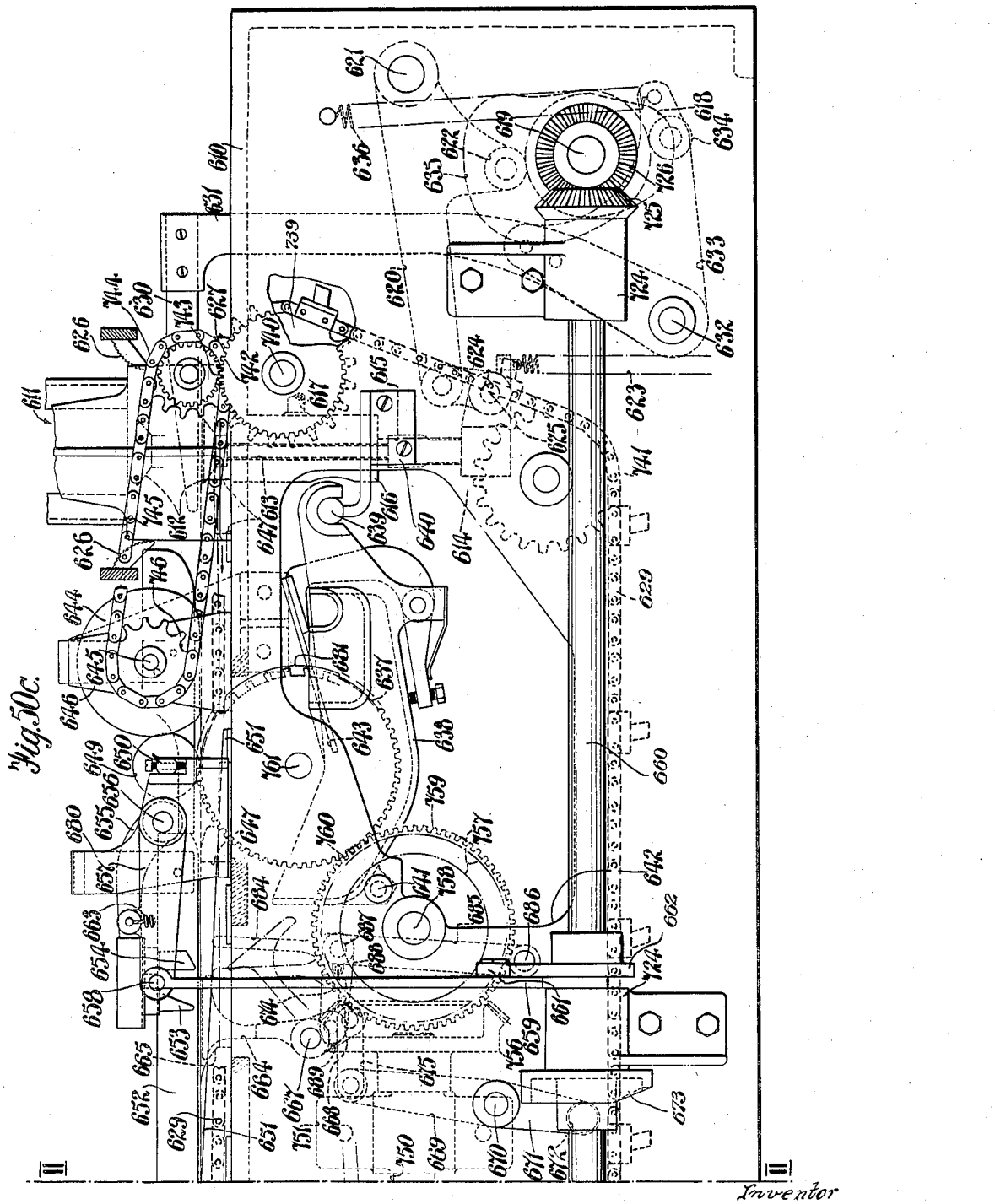

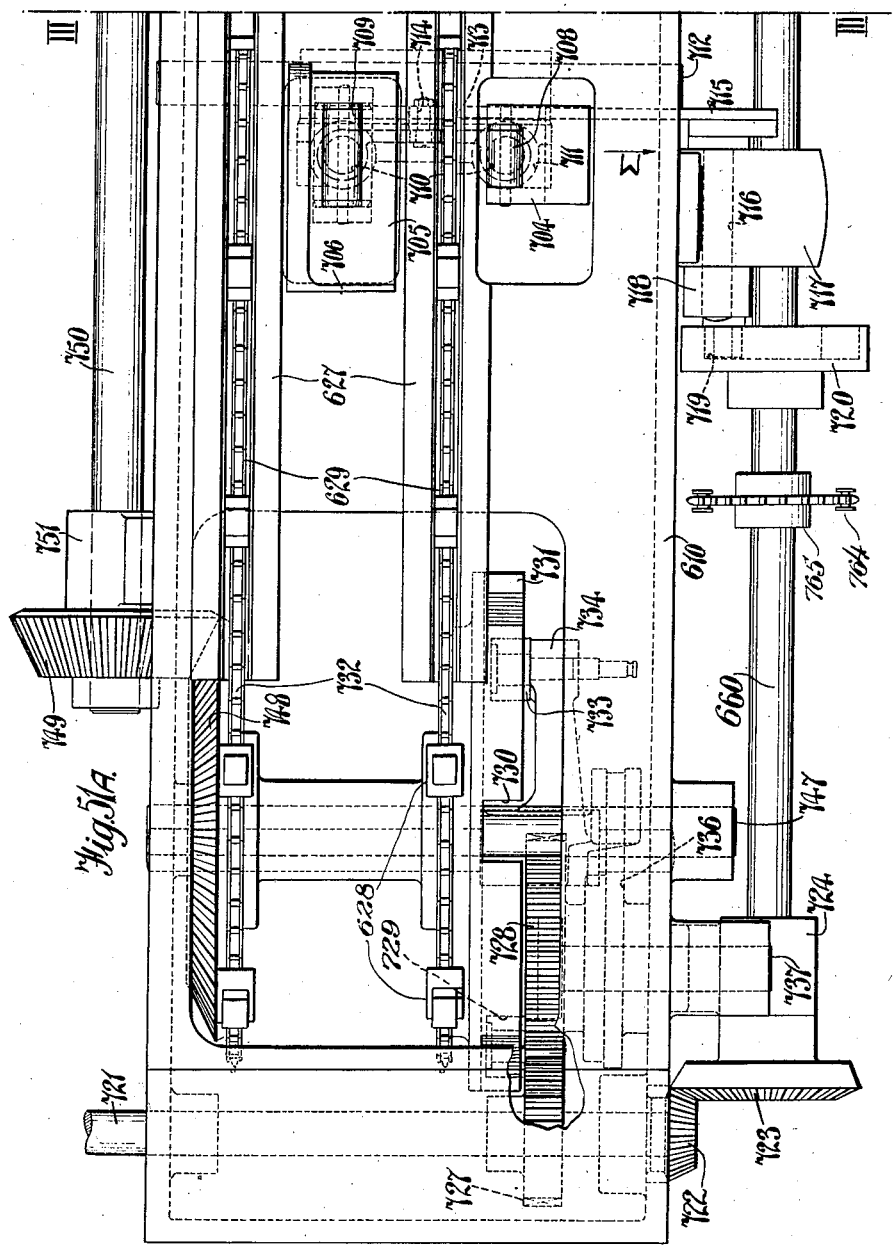

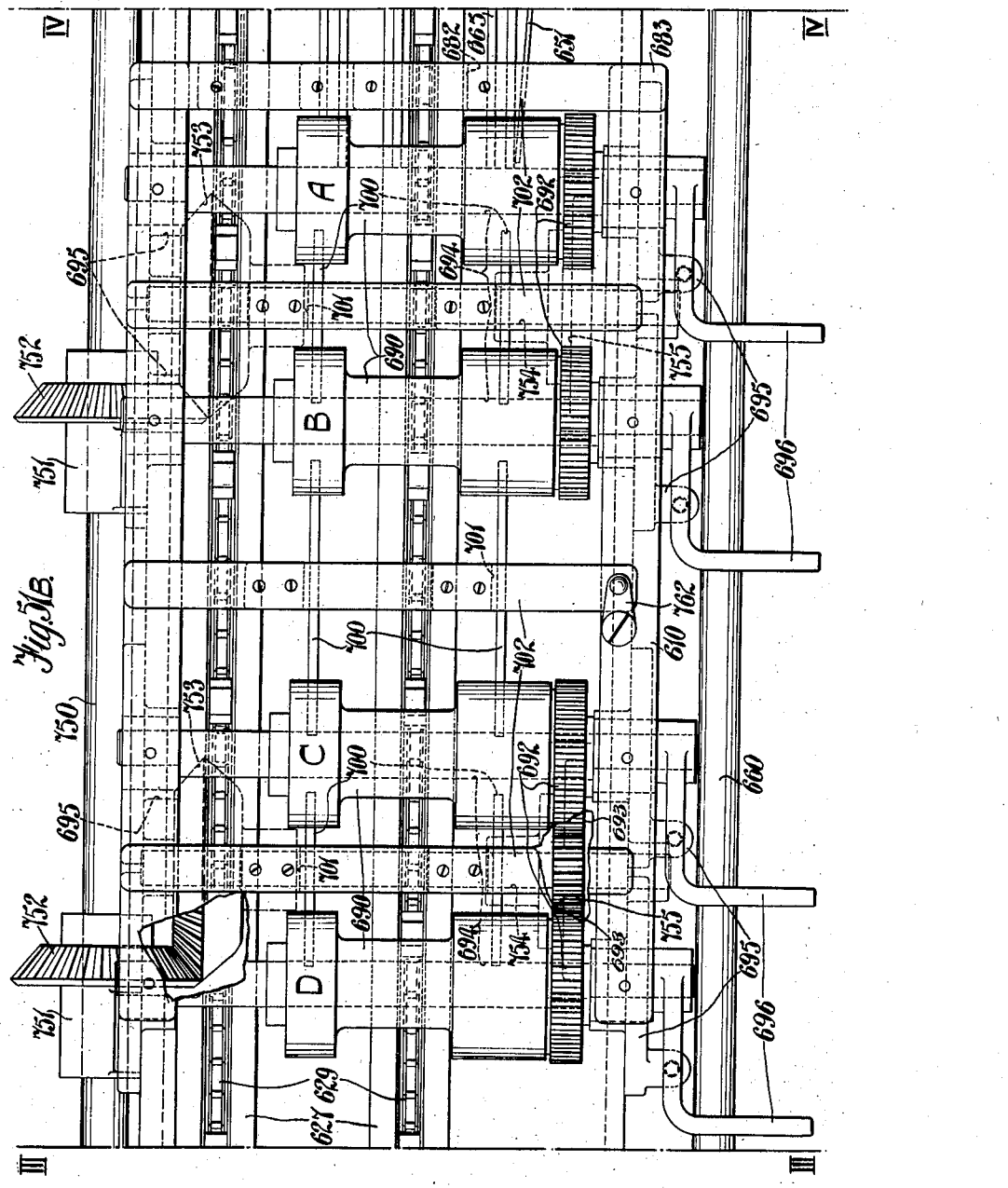

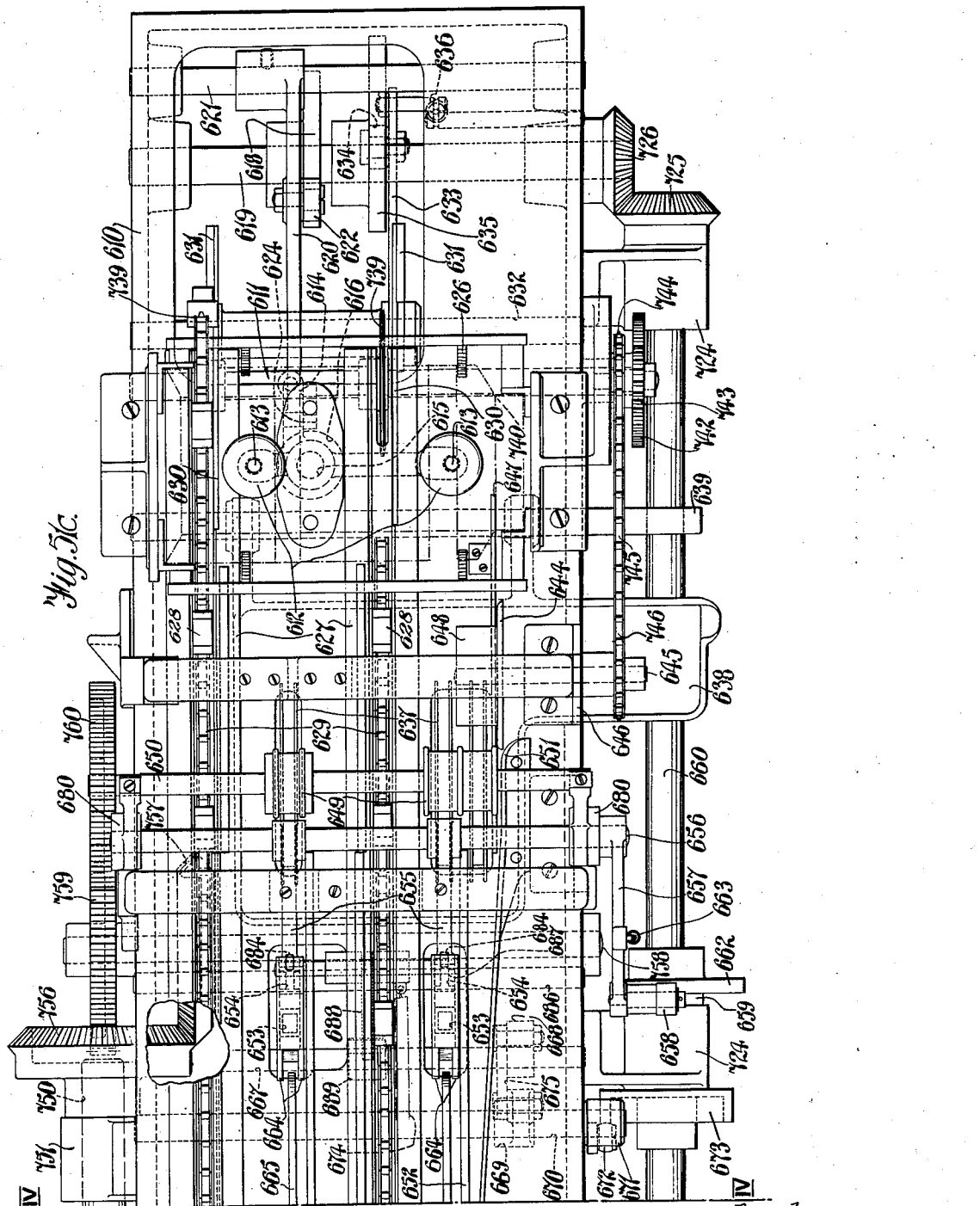

Patented July 1, 1941

2,247,871

UNITED STATES PATENT OFFICE 2,247,871

PACKING OF CIGARETTES OR OTHER ARTICLES

John Walker Chalmers, Deptford, London, England, assignor to Molins Machine Company, Limited, Deptford, London, England Application July 31, 1939, Serial No. 287,653
In Great Britain September 29, 1937

20 Claims. (Cl. 93—3)

This invention is for improvements in or relating to the packing of cigarettes or other articles and refers particularly to a method of and a machine for making and filling boxes of cardboard or other like material which are divided between the ends thereof to form a body and a lid both of box-like form joined by a hinge. Usually the hinge is located towards one end of a completed box and the lid is made shorter than the body.

Several forms of boxes to which the invention is applicable are described and shown in my United States Patent No. 2,163,828.

One form of box, which will be referred to herein as "a box according to definition A," is of oblong rectilinear shape in cross-section and is made of cardboard or other like material, with the front and back walls of the box substantially parallel and forming the longer sides of the oblong, and comprises a relatively deep body portion with the opening at the top thereof and a lid hingedly connected to the back wall of the body portion at a position between the top and bottom of the box.

A box referred to herein as "a box according to definition B" comprises a box according to definition A, and provided with corner portions at the top of the body portion which corner portions extend for a substantial distance above the hinge axis of the lid and engage the front corners of the lid when closed to resist opening of the lid, said corner portions, together with the contents of the box, being arranged within the surfaces swept out by the leading edges of the side walls of the lid during closing of the latter, the front wall of the lid being so dimensioned that during closing of the lid the free edge of such front wall passes clear of the tops of said corner portions and of the front wall of the body portion.

A box according to definition A or according to definition B may be of trapezoidal cross-section.

Blanks used in making boxes whether according to definition A or according to definition B comprise front, back, top and side lid panels, the front and back lid panels being connected by one of said other lid panels, and front, back, bottom and side body panels, the front and back body panels being referred to generally as broad body panels, said broad body panels being connected by one of said other body panels. Such a blank is referred to herein as "a blank as specified."

In some cases when making boxes according to definition B, the corner portions, instead of being constituted by the blank itself, may be constituted by an inner member which co-operates with the folded blank. In addition the inner member may act as a reinforcing member for the box or it may be arranged to divide the box into compartments or it may have both functions.

An inner member which co-operates to provide corner portions is referred to herein specifically as an "inner corner member." Where an "inner corner member" is used, the body portion of the box, sometimes referred to herein as the "receptacle," is constituted by the "inner corner member" and body panels of the blank as specified.

In other cases where the corner portions of the box are provided by the blank itself or where no such corner portions are provided, the inner member may be provided either to act as a reinforcing member for the box or as a member to divide the box into compartments, or it may have both functions.

Unless the inner member is specified as an "inner corner member" it shall include all the above kinds of inner member and the term "inner member" without any qualification shall have all these meanings. In all cases, however, the inner member comprises a member having a portion extending between the broad body panels and a portion substantially parallel with the broad body panels.

The term "article" where used herein shall mean the commodity or commodities enclosed within the box. "Article" may consist, for example, of a number of cigarettes which may be arranged in one or more groups, or alternatively consist of a single object such as, for example, a tablet of confectionery.

A liner of metal foil or other suitable material may be provided for the box, for example, a strip of metal foil may be folded about the article and/or the inner member where such is provided.

In my United States Patent No. 2,209,111, dated July 23, 1940, of which this application is a continuation-in-part, there is fully described and illustrated a machine for making a box according to definition A or according to definition B. In that machine, however, reinforcing panels, which are super-imposed on the blank and secured thereto by adhesive placed between the blank and the reinforcing panels, are pressed against the blank by rollers which operate only during movement of the blank and by opposed, stationary bars. When, however, the machine is operated at a high speed, that is, at a speed such that fifty or more blanks pass a given point during one minute, it is difficult to cause the superimposed portions of cardboard to stick together.

It is found that if the superimposed portions are passed between opposed stationary bars it is not practicable by this means to obtain sufficient pressure to secure the superimposed portions, unless the superimposed portions are maintained between the bars for a long period of time. It will be appreciated that where pressure is applied by means of bars the pressure is applied over a relatively large area, and consequently it is necessary in such a case that the pressure be maintained until substantially the whole of the adhesive is dry. The use of such an arrangement means that either the apparatus must operate slowly or it must extend over such a large area of floor space as to make the apparatus undesirable in practice.

It is also found that when heat is employed to dry the adhesive between the superimposed portions, a relatively long period of time is required in order to obtain a satisfactory adhesion between the superimposed portions and heat warps and sweats the material.

It is an object of the invention to provide mechanism which will cause the superimposed portions of cardboard adequately to adhere to each other when the machine is operated at high speeds and it is proposed to achieve this object by means of intermittently rotatable presser members which are rotated in timed relationship with an intermittent conveyor for the blanks and which operate to press the superimposed portions of material during a period when the presser members and the said portions are at rest. The presser members may comprise rollers.

By applying the pressure by means of rollers in accordance with the present invention it will be appreciated that the pressure applied is concentrated over a very small area of the superimposed portions since in theory the pressure at a given instant is along a line. In this way it is therefore possible by means of pressure rollers to apply a considerable pressure. Such a pressure is impracticable when the pressure is applied between bars over a relatively large area at a time.

The application of the pressure by means of rollers enables the heavy pressure to be progressively applied over the surface of the superimposed portions. This is not possible with bars even if the opposed portions of the bars are arranged as relatively sharp edges.

Further objects and features of the invention will be apparent from the following description taken in connection with the accompanying drawings which illustrate the invention and in which—

Figure 1 is a plan view of the whole machine.

Figures 2A and 2B together constitute a view of Figure 1, in the direction of the arrow A, the views joining up on the line 2—2.

Figures 3A and 3B are plan views of Figures 2A and 2B respectively, the views joining up on the line 3—3.

Figure 4 is a view of Figure 2B taken in the direction of the arrow B.

Figure 5 is a section on line 4—4, Figure 2B but showing portions of both Figures 2A and 2B.

Figure 6 is a section of Figure 2A taken on line 5—5.

Figures 7A and 7B are fragmentary views of Figure 2B drawn to a larger scale and are of diagrammatic form to illustrate the operation of certain folding mechanism.

Figure 1:
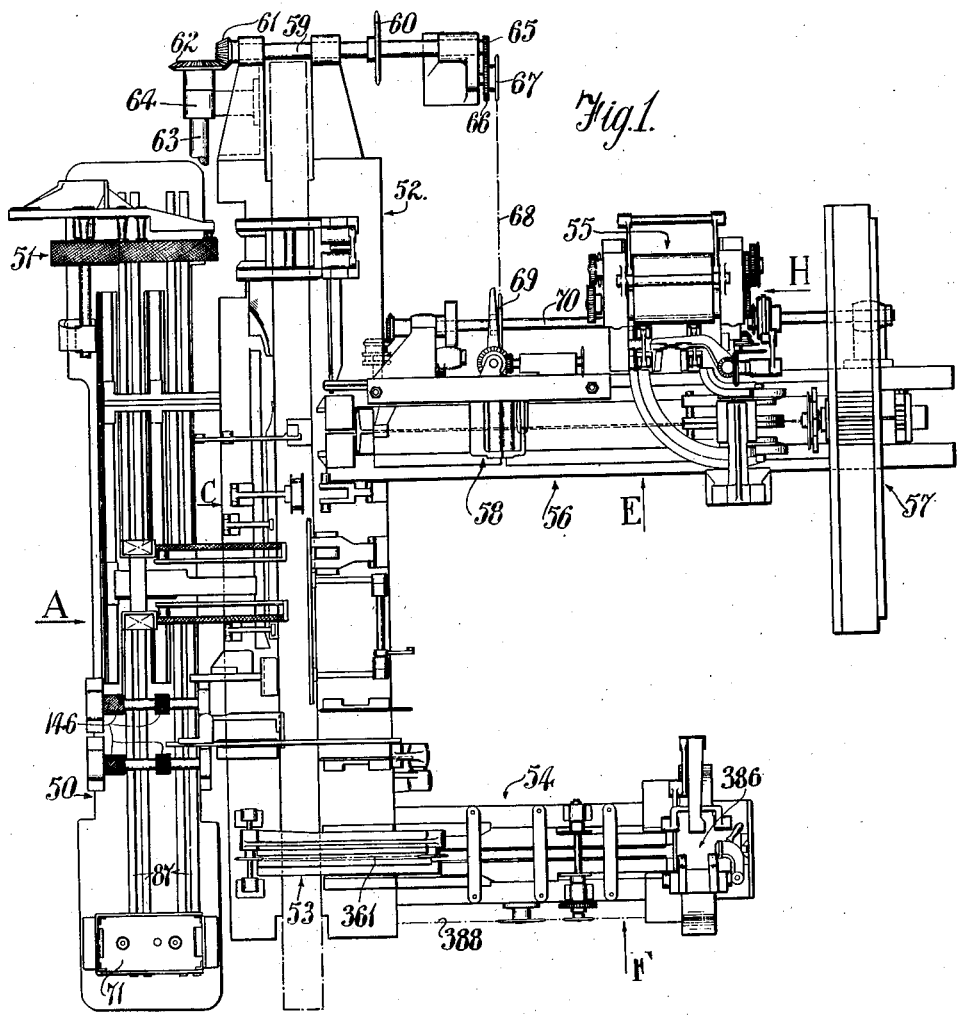

Figures 8A and 8B together constitute a view of Figure 1 in the direction of the arrow C, the views joining up on the line 8—8.

Figure 9 is a rear view of the portion of the machine shown in Figure 8B.

Figure 9B:
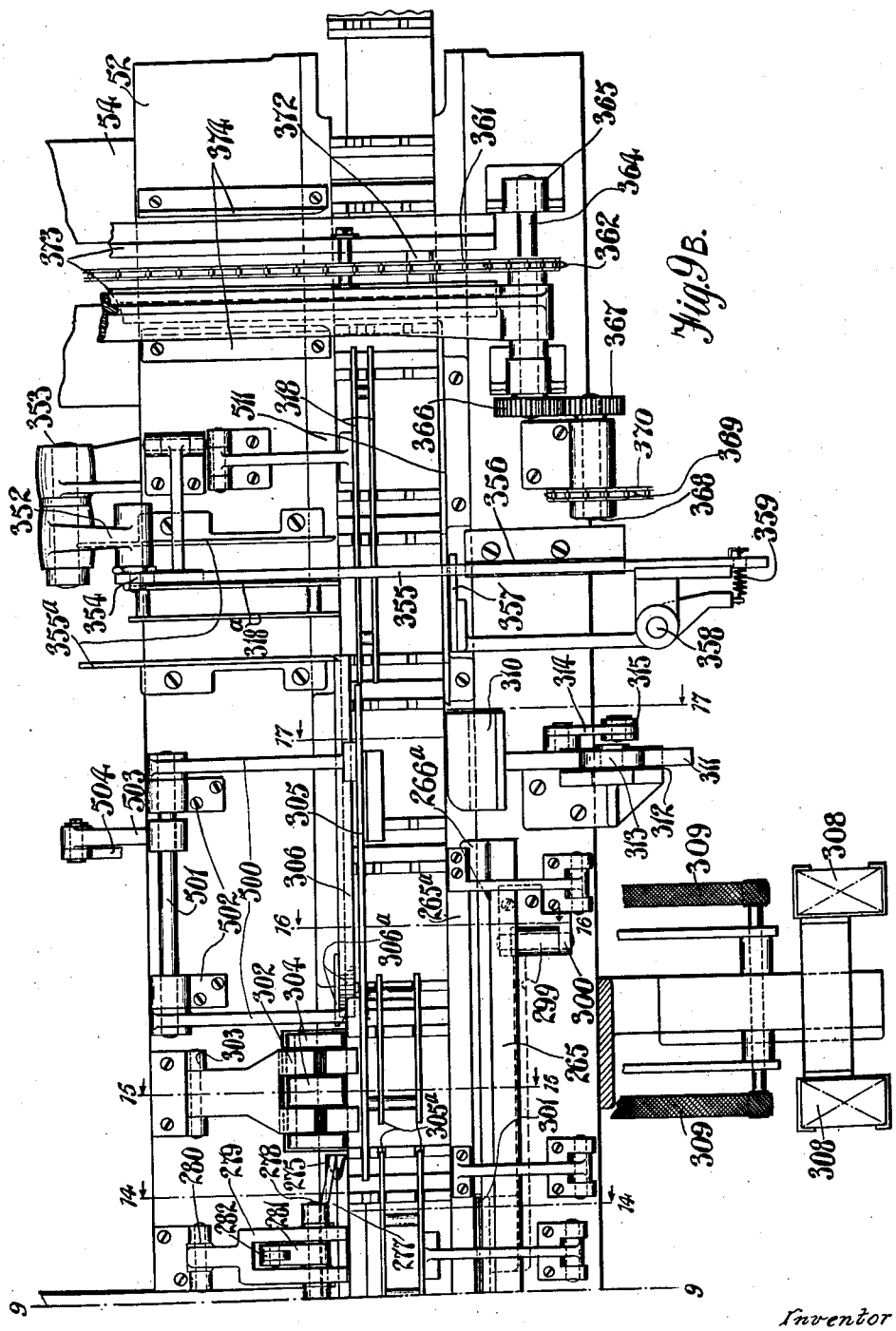

Figures 9A and 9B are plan views of Figures 8A and 8B respectively, the views joining up on the line 9—9.

Figures 10 to 17 are sections on the lines 10—10 to 17—17 respectively of Figures 9A and 9B, and in the case of Figures 14 and 17, also on the lines 14—14 and 17—17 respectively of Figure 8B.

Figure 18 is a view of Figure 10 taken in the direction of the arrow D.

Figure 19 is a section of Figure 6 on the line 6—6 of the arrow drawn to an enlarged scale.

Figures 19A and 19B together constitute a view of Figure 1 in the direction of arrow E, the views joining up on the line 19—19.

Figures 20 and 21 are sections of Figure 19B on the lines 20—20 and 21—21 respectively.

Figures 22A and 22B, are plan views of Figures 19A and 19B respectively, the views joining up on the line 22—22.

Figure 23 is a view of Figure 1 in the direction of the arrow F.

Figures 24 and 25 are sections of Figure 23 on the lines 24—24 and 25—25 respectively.

Figure 26 is a plan view of Figure 23.

Figure 27 is a view of Figure 23 in the direction of the arrow G.

Figure 28 is a view of Figure 1 in the direction of the arrow H.

Figure 29 is a detail of an inner member as produced by the mechanism shown in Figure 28.

Figure 30 is a view of Figure 28 in the direction of the arrow J.

Figure 31 is a detail of Figure 30.

Figures 32 to 41 show perspective views of the more important stages in the folding of the blank.

Figure 42 is a perspective view of an inner corner member.

Figure 43 is a plan view of the blank from which the inner corner member is made.

Figures 44 to 49 illustrate a special method of folding a blank.

Figures 50A, 50B and 50C together constitute a side elevation of a modified construction of that part of the machine shown in Figures 2A and 2B, the views joining up on the lines I—I, and II—II.

Figures 51A, 51B and 51C are plan views of Figures 50A, 50B and 50C respectively, the views joining up on the lines III—III and IV—IV.

In several of the machine views parts have been broken away or sometimes omitted for clearness, but such parts are adequately illustrated in other views.

The general layout of the machine is shown in Figure 1 which will be first briefly described in order that the nature of the machine may be readily appreciated.

Referring to Figure 1, the machine comprises a bed 50 on which the operations of feeding the blank and a few preliminary folding operations are carried out while the blank is moved along the length of the bed. A transfer device 51 thereafter moves the partly folded blank to another bed 52 along which the blank is moved while further folding operations are performed, during which operations the blank receives the cigarettes and the inner member.

When the loaded and partly folded blank reaches the end of the bed 52 another transfer device 53 moves it on to another bed 54 where the final closing operations take place.

The inner member is made and delivered by an apparatus 55 from which it is transferred to a bed 56 which is provided with cigarette feeding apparatus 57 and foiling apparatus 58. The cigarettes, inner member and foil strip are assembled as hereinafter described in detail and the complete bundle is carried along the bed 56 and delivered on to a blank which is in the process of being carried along the bed 52, but is stationary at the time the bundle is delivered.

Figure 1 also shows the main drive of the machine which comprises a countershaft 59 carrying a sprocket 60 driven by chain from a motor (not shown). At one end the countershaft has a bevel wheel 61 engaging another bevel wheel 62 which is fixed to a long shaft 63 (shown broken) carried in bearings 64 fixed to the front of the bed 52. This long shaft is hereafter referred to as the main shaft as it drives all the mechanism on the beds 50, 52 and 54 as described in detail later.

The other end of the countershaft 59 carries a spur gear 65 meshing with another gear 66. The gear 66 has a sprocket 67 fixed to it which is connected by a chain 68 to another sprocket 69 on a shaft 70 from which all the mechanism on the bed 56 is driven as described later.

Now that the general arrangement of the machine has been outlined, each section will be described in detail with reference to the appropriate drawings.

Referring to Figures 2A to 7B and also to the perspective views of the folding stages of the blank; the bed 50 has a magazine 71 at one end in which blanks as shown in Figure 32 are stacked as indicated by chain lines in Figure 3B.

A blank (see Figure 32) comprises a front panel $a$, a bottom panel $b$, a back body panel $c$, a back lid panel $d$, a top panel $e$, a front lid panel $f$ and a lid reinforcing flap $g$ separated by score lines $h$, $i$, $j$, $k$, $l$ and $m$ respectively. Each of the body panels $a$ and $c$ and each of the lid panels $d$ and $f$ is provided with a pair of side panels $a'$, $c'$, $d'$ and $f'$ respectively which are separated from said panels by score lines $n$. Reinforcing flaps $b'$ and $e'$ extend laterally from the bottom body panel $b$ and top lid panel $e$ which are separated from the reinforcing flaps by score lines $n$. The blank is made of thin cardboard or card which is coated or enamelled on one side, which forms the exterior of the finished box, the inner side being uncoated. Any other convenient card material could be used for the blanks. The blanks are placed in the magazine 71 with the coated side uppermost and are removed one at a time from the bottom of the stack by a pair of vertically reciprocating suction members 72, Figures 3B and 4. From Figure 4 it will be seen that the suction members are connected by pipes 73 to a body 74 to which is attached a stem 75 slidable in a guide block 76 fixed to the under side of the bed. A flexible pipe 77 is connected to the guide block 76 and to a suction pump (not shown) and the interior of the guide block and the stem 75 are provided with ports so that the two members, which are relatively movable, together constitute a valve for starting and stopping suction in the suction members. The suction body 74 and its associated parts are reciprocated at intervals by a cam 78 secured to a rotatable shaft 79. The cam operates a bell crank lever 80 pivoted at 81 to a bracket 82 which also forms a bearing for the shaft 79 and is fixed to the bed 50, the lever having a follower 83 engaging the cam. The other end of the bellcrank lever is pivoted to a link 84 which is also pivoted at 85 to the suction body 74. As the cam rotates the suction body is lifted so that the suction members arrive at the position shown in dotted lines in Figure 4 at which time, owing to the relative position of the stem 75 and guide 76, the suction commences and the suction members seize the lowest blank in the magazine 71. The blanks are retained in the magazine by supports 86 having serrated faces. As the suction members move down under the influence of the spring 286 the lowest blank is pulled out of the magazine, being slightly bent in the process so that it clears the supports 86 and is brought down to the lower position where it rests on guide rails 87 when the suction is cut off. The guide rails 87 constitute guides for pusher pieces 88 of an intermittently operated chain conveyor 89. When the blank is delivered to the rails the conveyor is stationary. As the conveyor 89 moves along to the left of Figure 2B a pair of pushers 88 engage the blank and move it along the rails and a pair of top guides 289 are moved in beneath the magazine and downwardly on to the blank to ensure that the blank is in contact with the rails. The guides 289 are supported on arms 90 fixed to a shaft 91 mounted in a pair of brackets 92 which are fixed to members 93 depending from the bed 50. A cam lever 94 is also fixed to the shaft 91 and its follower 95 engages a crown cam 96 mounted on the end of the shaft 79. A spring 100 retains the follower in contact with the cam face. As the cam rotates, the guides 289 are moved from the position shown in Figure 2B to a position where the ends of the guides are just clear of the inner walls of the magazine 71 so as to permit the next succeeding blank to be moved downwardly from the magazine on to the guide rails 87. As can be seen from Figure 7B, the width of the blanks, i. e. the distance between the longitudinal edges of the blanks, is equal to the pitch of the pusher pieces 88 so that a blank when in a flat condition extends between successive pairs of pusher pieces and is thereby accurately located. The guides 289 ensure that the blanks lie flat between the successive pairs of pusher pieces and operate to flatten transverse bowing of the blanks.

As above stated, the blank is carried along the rails by an intermittent conveyor and during its journey along the bed 50 the flaps $g$, $e'$ and $b'$ are bent over into contact with the remainder of the blank and secured thereto by adhesive.

The adhesive applying apparatus consists of disc-like members 101 furnished with segments as shown in Figures 7A and 7B of appropriate form and disposition for applying gum to the flaps $e'$, $b'$. The gum for securing the reinforcing flap $g$ to the panel $f$ is preferably applied to the latter panel, and this may be done by means of a complete disc or a segmental disc, as desired. Generally speaking, gum is applied in short strips in such cases, and therefore the segmental form is preferable.

The gum applying members above described are furnished with gum from rollers 102, Figure 2B, which rotate in gum baths 103 which are supported on a bracket 104 fixed to other brackets 105 which are in turn attached to the members 93. Adjustable scrapers 102a are fitted to the rollers 102. The brackets 105 also constitute bearings for the spindle 106 of the gum furnishing discs 102 and at one end of this spindle is fixed a gear 107 which engages another gear 108 attached to the spindle 109 of the gum applying members. The spindle 109 also has attached thereto a sprocket 110 driven by a chain 111.

As previously stated, the blank is removed from the magazine and carried along the rails with the coated surface upwards, at which stage it is in the condition shown at Figure 32 where the score lines are represented by fine lines, whilst slits and edges are represented by thick lines.

The first operation performed on the blank consists in bending down the flap g at right angles to the plane of the blank, as shown in Figure 33. This operation is effected by a rotatable disc 112 which is fixed to a spindle 113 rotatably mounted in a bracket 114 secured to the top of the bed 50. The disc 112 is driven by a gear 141 mounted on a stud 142 in the bracket 114 and driven by a sprocket 143 which is in turn driven by the chain 111; the gear 141 engaging another gear 144 fixed to the end of the spindle 113. The chain 111 is driven by a sprocket 207a, see Figure 2B. The rim of the disc 112 is cut away as clearly seen in Figure 2B and the parts are so timed that as the disc rotates the leading edge of flap g of the blank runs beneath the disc at the time the cut away portion is approaching the bottom position.

A rail or guide 115 is fixed to the bed, see Figures 2B and 3B, so that its upper edge is level with the level of the guide rails 87. As the blank moves along, the disc 112 bends the flap g vertically downwards over the edge and face of the rail 115. In order to prevent the neighbouring portion of the blank from bending upwards or buckling, the disc 112 has a projection or hub 112a which contacts with the blank and controls it. Immediately after this operation the gum is applied by the mechanism above described, in co-operation with pressure rollers 116 adjustably mounted in bearings 117 fixed to the upper surface of the bed. As the blank moves away from the gum applying position, the edge of the flap g comes into contact with a folder 118 consisting of an oblique rail, see Figures 2B and 3B, and further movement of the flap g causes it to be bent through a further angle of approximately 90° so that it is practically in contact with the lower face of the blank. The neighbouring portion of the blank is controlled during this operation by a top guide plate 122 associated with the folder 118.

During the latter stages of the operation the blank reaches a position which is more clearly shown in Figure 7B at which stage the blank is stationary, while tuckers 119 move downwards and bend down the flaps b', e'.

From Figure 7B it will be seen that each tucker 119 operates simultaneously on the rear edge of one blank and the front edge of the next blank so that at each operation two flaps are bent down by each tucker. During this operation the blanks are stationary and when the conveyor has moved a further stage and when it stops, the tucker again folds down the rear flaps of one blank and the leading flaps of the next, and consequently all the flaps of a particular blank are bent down during two stages of the conveyor movement. Each tucker 119 is fixed to an arm 120 carried on a shaft 121 rotatably mounted in the brackets 117 fixed to the upper surface of the bed 50. The front end of the spindle 121 has attached thereto a lever 123, the other end of said lever being connected at 124 by a small universal joint with a cam rod 125 arranged to slide over the shaft 79. The cam rod 125 carries a roller 126 engaging a cam 127 on said shaft, the return movement being by means of a spring 128. The shaft 79 is continuously rotatable, being driven as hereinafter described so that the above-mentioned tuckers and further parts to be described can operate while the conveyor is stationary.

Referring to Figure 7B, the flaps e' and b' are folded into contact with the lower surface of the blank by means of pivoted tuckers. A tucker 129 is shown in full lines at the end of its movement at which position it has folded a rear flap e' so that the leading edge of such flap engages a curved folder or guide 130 in such a manner that further movement of the conveyor will move the flap into close contact with the surface of the blank. In order to support the adjacent portions of the blank when the flaps are bent down by the tuckers 119, side rails 130a (Figure 3B) attached to the guides 130 are provided which afford suitable support at each side of the score lines h, i, k, l.

During the next conveyor movement the tucker 129 moves from the full line position to the dotted line position, but during this movement it intercepts the leading flap e' of the next blank and partially bends it up so that as the leading edge of the blank meets the curved guide 130 this flap also will be folded into close contact with the blank.

When said conveyor movement has nearly finished the tucker will rise from the dotted position to the full line position, overtaking the moving blank and folding the rear flap e' into the position shown so that in turn this flap is brought into close contact with the face of the blank.

The tucker 129 is pivoted at 131 to a bracket 132 fixed beneath the bed 50 and to the spindle of the tucker 129 is fixed a small lever 133 having a roller 134 at its end which moves in a slot 135 in a lever 136 pivoted at 137 to the bracket 132. The lower end of lever 135 is provided with a roller 138 engaging a crown cam 139 which is also fixed to the shaft 79, the return movement being by a spring 140, Figure 2B.

Further movement of the blank brings the under surface of the flap g into contact with a folding block 145, Figure 3B, the leading end of which is provided with a curved lead, and during the next movement the blank passes between two pairs of pressure rollers 146, 147 which press all the flaps into close contact with the body of the blank.

During the movement of the blank from the base of the magazine to the pressure rollers the blank is controlled and kept in contact with the guide rails 87 by a number of top guides, such as indicated at 148, which are disposed and supported as shown in Figures 3B and 4.

As will be seen from Figure 2B, there are two sets of pressure rollers 146, 147 which are spaced apart to the extent of one conveyor pusher pitch, i. e. the distance conveyor moves each time it is actuated, but as both sets of rollers perform the same function of pressing the flaps into contact with the body, only the first set will be described.

Each upper roller 146 is knurled and is carried on a spindle 149 rotatably mounted in bearings 150 fixed to the bed 50 and at the front end the spindle is provided with a gear 151 which is driven by another gear 152 fixed to a bevel gear 153 which engages another bevel 154 fixed to a spindle 155 mounted in bearings 156 which are secured to the bed 50. An idler gear 157 meshes with the gear 151 and transmits the motion to another gear 158 which is on the spindle of the second set of top pressure rollers. Each lower pressure roller 147 is carried on a spindle which is mounted in a bearing 159 (Fig. 3B) screwed to the bed 50 of the machine and said roller merely rotates by friction as the blank passes between the rollers 146 and 147.

During the successive movements of the conveyor the blank is, therefore, folded from the condition shown in Figure 32 into that shown in Figure 33 and finally to that shown at Figure 34. Further movements of the conveyor carries the blank between a system of rails which may be heated, during which movements the gummed flaps are firmly secured to the body of the blank. The rail system is shown principally in Figures 2A and 3A and in section in Figure 5. From the latter figure it will be seen that rails 160 are fixed to the bed 50 of the machine, and these rails contain strips 161 which may be fixed in the rails 160 and project slightly above the surface of the same to form small pressure ridges. Preferably, however, the rails are pressed upwardly by small springs 162, Figure 2B, in order to provide an elastic pressure between them and the co-operating members.

Above the rails 160 are further rails 163 of angular section which are provided with electrically heated boxes 164 connected to a source of power 165a, Figure 2B. In Figures 3A and 3B the heaters 164 are shown as chain lines to avoid obscuring other parts of the machine. The rails 163 are provided with pins 165 surrounded by springs 166 and loosely connected to channel members 167 which are fixed to brackets 168 pivoted at 169 to brackets 170 mounted on the bed 52, as shown. The rails 163 are made in comparatively short lengths as indicated in Figure 2A so that each length can exert pressure locally.

The brackets 168 constitute bell crank levers and have cam followers 171 at their free ends engaging cams 172 which are fixed to the main shaft 63 of the bed 52. Springs 173 are also provided so that as the cams rotate, the angular section rails 163 are periodically lifted and lowered on to the blanks which move between the two sets of rails. Preferably the movement in such that the rails are separated at the time the blank is moving and then pressed together during the periods when the blank is stationary.

From Figure 5 may also be seen the method of driving the shaft 79 and a bearing 82a for supporting said shaft. A sprocket 174 on said shaft is driven by a chain 175 which is in turn driven by another sprocket 176 fixed on the main shaft 63 of the bed 52. The blank is finally brought to a position where its longitudinal axis lies beneath the centre of the transfer device 51.

The transfer device which is shown in Figures 2A, 3A and 6 consists of a conveyor belt 177 which is driven by a rotatable drum or pulley 178 mounted on a spindle 179 which rotates in bearings 180 and 181 fixed to the bed 50. The drum 179 is driven by a chain 181a from a sprocket (not shown) on the mainshaft 63 of the bed 52, the chain passing around idler sprockets 182 and a sprocket 183 fixed to the spindle 179. The conveyor belt 177 passes around a series of guide pulleys 184, and as shown in Figure 6, co-operates during a portion of its travel with another belt 185 supported on pulleys 186, said belt being driven by friction from the conveyor belt 177. The transfer device is merely an arrangement moving the blank from the bed 50 as hereafter described, turning it over and delivering it to the mechanism carried by the bed 52.

It will be seen from Figure 6 that the blank first passes between the belt 177 and pulley 178 and next between the belt 177 and a guide or stripper 186a, after which it is dripped between the belts 177 and 185 and carried along horizontally until it is delivered into its proper position described in detail later.

From the foregoing description it will be appreciated that the blank in the condition shown in Figure 34 lies on the rails 87 centrally disposed beneath the transfer belts above described and before the transfer takes place the conveyor is stationary.

Means are provided for lifting the blank from the rails 87 to bring it to the level at which it enters between the belt 177 and pulley 178 and further means feeds the blank lengthwise into the grip of the belt and pulley.

The lifting means comprises a platform 188 divided into two sections as shown in Figure 6 and carried by a link or yoke 189. The link 189 is supported on a pair of parallel links 190 pivoted at 191 to a bracket 192 which is fixed to the side face of the bed 52. The lower link 190 is provided with a cam follower 192a engaging a cam 193 secured to the main shaft 63. As the main shaft rotates, the platform 188 is moved downwardly by the cam and upwardly by a spring 194. The upward movement carries the blank between a pair of parallel guides 195 which are furnished with small sloping blocks 196 which are so disposed as to coincide with the spaces left in the outline of the blank, due to the folding over of the flaps e' and b'. When the blank is brought to the level of the blocks 196, a pivoted pusher 197 moves them a short distance to the left, Figure 6, so that the blank is supported by blocks 196 engaging the side body panels a' and c' which permits the platform 188 to move downwardly ready to receive and lift the next blank. The pusher 197 which is constructed as a long lever is rotatably mounted on a spindle 198 fixed in a bracket 199 fixed to the side face of the bed 52 and a lever 200 which forms an extension of the pusher lever has a cam follower 201 at its free end engaging a cam 202 which is also fixed to the spindle 63, while a spring 203 moves the pusher 197 in the opposite direction to the movement made by the cam.

The cam 202 is constructed of two side by side discs as shown in Figure 2A which are of such contour that the pusher gives the blank the short preliminary movement above referred to so that it becomes supported by the blocks 196 and then at the appropriate moment gives the blank a further and longer movement to bring its leading edge into the grip of the pulley 178 and belt 177. In Figure 2A the stem of the pusher 197 lies behind the link 189 and is not therefore visible in that figure, but parts 200, 201 and 202 are shown from which the position of said stem may be gathered.

In Figures 2A and 2B, the chain conveyor 89 is broken away at places in order to avoid confusion with other details.

The chains are carried on sprockets 204, the forward pair of sprockets being carried on a spindle 205 rotatably mounted in bearings 206, Figure 6, fixed beneath the bed 50, while the pair of sprockets 204 at the magazine end of the machine are fixed on a spindle 207, Figures 2B and 4, rotatably mounted in the bracket 82 and another bearing 208 fixed beneath the bed of the machine. The spindle 207 also carries the sprocket 207a which drives the chain 111 previously mentioned.

The driving arrangements of the conveyor are best shown in Figures 2A and 6, from which it will be seen that the shaft 205 has a sprocket 209 fixed thereto which is connected by a chain 210 to a larger sprocket 211 fixed to a spindle 212 supported in a bearing bracket 213 fixed to the side face of the bed 52. The spindle 212 also has a spur gear 214 fixed to it which engages with a larger spur gear 215 fixed to a spindle 216 which is mounted in bearings in the bed 52 and an extension bearing 217 fixed to such bed. The spindle 216 is intermittently rotated as described later, and it will thus be seen that through the gearing above described the conveyor chains 89 on the sprockets 204 are also moved intermittently.

Figure 2A also shows the method of driving the spindle 155. One end of the spindle carries a bevel wheel 218 which engages with a larger bevel 219 rotatably mounted on a stud 220 and having attached thereto a spur gear 221 which meshes with another spur 222 fixed on the front end of the spindle 205.

It will thus be seen that the pressure rollers 146 and 147 which are driven from spindle 155 are intermittently rotated and rotate at the same time as the conveyor is moving along.

The remaining mechanism on Figures 2A, 2B and 6 will be referred to later when dealing with the construction and operation of the mechanism shown on the bed 52.

The blank after being turned over by the transfer device above described is in the condition shown in Figure 35, that is, with the uncoated surface upwards, and it is then fed forwardly by the transfer device and associated parts until it lies on a pair of angle guides 223, Figure 6, which, as will be seen from Figure 9A, are positioned above one of a number of pockets or moulds 224 carried by a chain conveyor 224a, Figure 8A.

The chain conveyor is arranged on the bed 52 and the following description relates principally to Figures 8A to 18 which illustrate this bed. The length of a pocket as measured in the direction of feeding the blank is equal to the length of the panels c and d, and means are provided for properly locating the blank above a pocket during the transfer from the bed 50 to the bed 52. These means comprise a reciprocating tooth 225, Figure 6, pivoted to a bellcrank lever 226 which is in turn pivoted at 227 to a bracket 228 mounted on one of the brackets 229 which support the plate-like bed 50 from the bed 52. The other end of the bellcrank lever 226 is connected to a cam rod 230 which is forked and slides over the main shaft 63 and is furnished with a follower 231 which contacts with a cam 232 so that as the shaft 63 rotates, the feed tooth 225 is reciprocated once per revolution, a spring 233 serving to return the levers.

It will be seen, therefore, that the belts 177 and 185 deliver the blank approximately into position with its rear end lying on a guide plate 234, and shortly afterwards the feed tooth 225 moves into contact with the rear of the blank and pushes it home into its exact position. The blank is then moved downwards into a pocket 224 which is stationary beneath it, the movement being effected by a plunger 235 mounted above said pocket.

From Figure 6 it will be seen that the plunger is carried on parallel links 236 pivoted at 237 and 238 to brackets 239 and 240 respectively. A pair of connecting rods 241 are attached to the lower links 236 and the lower ends of said rods are connected to crank pins 242 which are fixed to gears 243, the said gears also constituting crank discs.

In Figure 6 it will also be seen that each gear 243 meshes with an equal gear 244 on the main shaft 63, and from Figure 8A it will be seen that these gears are duplicated at two positions along the main shaft 63, from which view the relative positions of the connecting rods 241 may also be seen. The gears 243 are carried on short stub shafts 245, one of which is mounted in the bearing 64 adjoining one of the gears, while the other stub shaft is carried in a small bearing 246, see Figures 2A and 8A.

At the upper portion of Figure 6 will be seen a bracket 247 which has a pair of pivot pins 248, see also Figure 9A, at its upper end, and on these pins are pivoted two levers 249 to the bottom end of which are secured the guides 223. Each lever carries a small cam plate 250, the cam plates engaging a pair of cam rollers 251 on the plunger 235, and from Figure 9A it will be seen that a spring 252 tends to force the plates 250 apart.

When a blank is delivered to the guides by the transfer device, the plunger 235 is in its highest position and the rollers 251 are free of the cam plates 250 so that the spring 252 forces the guides 223 apart to a distance limited by a stop 254. At this time the inner walls of guides 223 are wider than the blank width so that the blank can easily be fed into position on such guides. As the plunger moves down, the rollers 251 force the guides 223 towards one another until the edges of the horizontal webs of the angle guides are spaced apart a distance equal to that between the score lines n of the blank. In this condition the guides constitute a kind of die through which the plunger forces the blank, bending up all the side flaps during the movement owing to the shape of the plunger operative face which will now be described.

The foot of the plunger 235 is provided with side extensions 255 and a spring controlled base plate 257. The side faces of the parts 255 and 257 are in alignment as shown in Figures 9A and 19 and the distance between such faces is equal to the distance between the main score lines n of the blank.

At one end the plunger is provided with a spring controlled blade 256 which registers in the downward movement with the extreme edge of the pocket 224 and thus corresponds with the crease k.

It will be seen also from Figure 6 and Figure 10 that the bottom of the pocket is cut away at 258 at a position which corresponds with the crease j of the blank.

Further operation of the plunger is best followed with reference to Figures 10, 18 and 19. As the plunger descends, the blank is forced into the pocket 224, the side body panels c' and side lid panels d' being bent vertically upwards. The base plate 257 holds the blank firmly on the bed 52 and the base of the pocket as the base plate springs compress. The side extensions 255 press the front lid panel f on to the horizontal surface of a plate 259 while the edge of the blade 256 presses on the score line k and bends the panel d slightly below the level of the pocket base so that the panel e occupies a position on the sloping surface of the plate 259. At the same time the side lid panels f' are bent upwards at approximately 80° to the plane of the panel f as shown in Figure 18, by coming into contact with two side plates 260 and 261 as the plunger extensions 255 press the panel f down on to the plate 259.

The purpose of the bending operations on all the panels as the blank is pressed down out of the guides 223 and the bending of the panels f' and panels e and d as mentioned above is to thoroughly break down the material on the scoring lines so that the subsequent folding operations will be more satisfactory and the parts after being folded down and secured will remain in their folded positions.

In Figure 10, the panels a' are shown vertical as folded by the passage through the guides 223, but in actual practice they tend to flatten down as they emerge from said guides.

In order to ensure that the blank is properly located lengthwise during the plunger operation a stop 262, Figure 6, may be provided against which the leading end of the blank abuts.

As a result of the above operations the blank is in substantially the condition shown in Figure 36, after which the pocket 224 containing said blank moves on a stage to the position indicated by the section line 11—11. The panel f and its flaps easily spring over the plate 260 during this movement and also tend to flatten out into the plane of the base of the pocket. During this movement of the pocket the panels a and b are bent upwardly from the plane of the bottom of the pocket by a spiral folder 263, while at the same time the panels f and e pass beneath a plate 264, the leading end of such plate being curved upwardly to assist this movement, see also Figure 11.

The next movement of the pocket brings it to the position indicated by the section line 12—12 and at this stage the condition of the blank which is shown in Figure 12 does not differ materially from that shown in Figure 11, but the panels a and b have fallen slightly on to a sloping guide 265 while the panels e and f still lie beneath the plate 264.

The blank is located transversely of the pocket by a guide 264a. It may be seen from Figures 9A, 11, 12, 13 and 18 that the bed 52 is recessed at 52a, the recess extending a little farther than the end of the plate 264. This enables said plate, which is suitably shaped, to depress the panels e and f below the normal level of the bed 52 for a reason given below.

The next movement of the pocket brings it to the position indicated by the section lines 13—13 and at an early stage in this movement the panel b passes beneath a square guide rail 265a, the end of which is shaped as a folder and suitably curved to guide the panel beneath the rail. The blank is then in the condition shown in the sectional view, Figure 13, in which condition it receives the bundle above referred to, which is delivered on to the body panel c and back lid panel d by means hereinafter described.

The bundle delivered from bed 56 passes over the plate 264 which at this position is extremely thin so that its upper surface is flush with the level of bed 56 and the level of bed 52. The plate thus serves to retain the panels e and f in the recess 52a and prevents them from obstructing the passage of the bundle on to the body of the blank. When the bundle is delivered into position above the panels c and d and is therefore within the pocket 224 it is pressed downwardly into position on said panels by an oscillating presser 266. The presser is carried on a lever 267 pivoted at 268 to a bracket 269 screwed to the bed 52, and the other arm of lever 267 is connected to a link 270, Figure 8A, which is attached at its lower end to lever 271 pivoted at 272 to a bracket 272a fixed to the bed 52. A cam 273 on the main shaft 63 engages a roller 274 on the end of lever 271 so that as the shaft rotates the presser 266 is moved up and down, the return movement being by a spring (not shown).

The loaded blank (see Figure 37) moves on another stage at the next conveyor movement and comes into engagement with folding mechanism which is shown in section at Figure 14, and during this movement the panel e passes beneath a triangular folder 275 while the panel f is pressed into engagement with the angular face of the triangular folder as will be described next.

A reciprocating pusher or folder 276 works in a slot in the bed adjacent to the angle of the triangular folder and as the pusher rises it lifts the panel f into a vertical position and a pivoted folder 277 presses it down on to the angular face of the folder.

From Figures 9B and 14 it will be seen that the folder 277 is pivoted at 278 to a bracket 279 which is hinged to the bed at 280, but clamped in the operative position. A lever 281 is connected to the folder 277 and the end of the lever is connected to a cam rod 282 which can also be seen in Figure 8B. The rod 282 is attached towards its lower end to a link 283 pivoted to a bracket 284 attached to the bed, while a further extension of the rod 282 carries a cam roller 285 which engages a cam 286a on a shaft 287 at the back of the machine. The mounting and driving of this shaft will be described later on. A spring 282a co-operates with the cam 286a to operate the parts just described.

The pusher 276 is carried on a vertical slide piece 288 which slides in a guide 289a fixed to the back of the machine, the slide 288 being operated by a link 290 which is pivoted to a lever 291, the other end of said lever being fixed to a shaft 292 which passes through the bed of the machine.

At the front of the machine another lever 292a is attached to the shaft 292 which also has fixed thereto a lever 293. The free end of lever 293 has a cam follower 294 engaging a crown cam 295 on shaft 63 so that as the cam rotates the shaft 292 is oscillated and the ends of levers 291 and 292a move up and down, the return movement being by a spring 296. The lever 292a has a link 297 attached to its free end which is pivoted at 298 to a curved lever 299 pivoted to the bed of the machine at 300. The free end of the lever 299 carries a folding member 301 which is very similar in shape to the folder 276 and as will be seen from Figure 14, the folder 301 projects through a slot in the bed in the same manner as the folder 276.

The operation of the mechanism just described causes the top and front lid panels to be bent around the triangular folder and the front panel to be bent into a vertical position as shown in chain lines in Figure 14, after which operation the conveyor moves on a further stage to the position indicated by the section lines 15—15. At this position a fork-like member 302 which is hinged to the bed at 303 but clamped in the operative position shown in Figure 15, engages the outstanding corner of the blank formed by the triangular folder 275. It will be seen from Figure 15 that the working face of the fork 302 is of circular form and forms a guide for the corner mentioned, during the next movement. A vertically reciprocating folder 304 which is also forked to clear the fork 302 and normally lies in slots in the bed at 304a so that its upper surface is level with the bed level, rises and brings the outstanding corner of the blank to a position approximately at the upper corners of the pocket 224, the front lid panel being controlled during this operation by a guide 305 operated as described below. The folder 304, Figure 8B, is attached to the slide 288 which carries the folder 276 and thus operates at the same time although it is operating on a different blank, the two blanks being in adjacent pockets. The guide 305 is attached to two arms 500 fixed to a spindle 501, Figure 9B, rotatably mounted in bearings 502 fixed on the bed 52. A lever 503 is also fixed to the spindle and has a cam rod 504 pivoted to its free end. The cam rod 504 which is also shown in Figure 8B is forked to slide on the shaft 287. A cam 505 on said shaft engages a follower 506 on the cam rod and a spring 507 is provided so that as the cam rotates the guide 305 moves up and down, and is out of contact with the front lid panel during the conveyor movements.

As the blank passes to the next stage indicated by the section lines 16—16, the front lid panel passes beneath a guide 306, see also Figure 16, the leading end of which is formed as a small spiral folder 306a, and consequently, when the conveyor stops the front lid panel f is horizontal and approximately in its final position, see Figure 38. Meanwhile, the bottom panel b still lies beneath the square guide 265a.

It will appear from Figure 9B that a number of top guides 305a resembling the guide 305 are positioned at this part of the machine and it may be explained that the only purpose of these guides is to control the loaded blank during the conveyor movements so that it does not rise out of the pocket, the edges of the pockets being slotted as shown to permit close adjustment of the top guides to the surface of the loaded blank. Two such guides are attached to guide 305, while others are supported by curved levers as shown in Figure 14, said levers being hinged to the bed and clamped in the operative position.

Between the positions indicated by lines 15—15 and 16—16 a picture feeding apparatus may be arranged which is shown diagrammatically in Figure 9B as consisting of two magazines 308 from which the pictures are fed to flexible bands 309 and delivered to two adjacent pockets while they are in the stationary positions corresponding to Figures 15 and 16. The bands 309 are offset with respect to the centre lines of the pockets, as shown, so that the two pictures lie side by side on top of the bundle on the blank. The conveyor then moves another stage and as the pocket moves from the position shown in Figure 16, the panel a comes into contact with a horizontal extension 266a of the rail 265 and the effect of this is to bend the panel a approximately into a vertical position and during the movement it is retained in this position so that when the pocket stops the panel a is in position for being closed down on to the face of the bundle, see Figure 39.

The closing member consists of a reciprocating pusher 310 which is fixed to the end of a slide 311 running in a guide 312 fixed to the bed of the machine and having a top control in the form of a roller 313.

A link 314 is connected at one end to the slide 311 and at the other end to a lever 315 pivoted to a bracket on the frame at 316. The other end of the lever has a cam follower 782 at its end which engages with a cam 317 on the main shaft 63, the return movement being by a spring 783. The effect of the movement of the pusher 310 is to bend down the front panel a on to the bundle so that the blank is now in the condition shown in Figure 40. Three further movements of the conveyor bring the partly folded blank just referred to in line with the transfer device 53 and during this movement the flaps are kept under control by top guides 318 similar in construction to the guides 305a previously described.

Means are provided, as described later, for detecting whether the correct number of cigarettes is fed and whether a blank for the inner member is fed, and when either of these detecting means operate they cause an electric circuit to be made. Each detector is arranged in an electric circuit which includes an electromagnet adapted to control the movements of ejector mechanism whereby when an item is not fed or is found to be defective an electromagnet 320 is energised and thereby causes the ejector mechanism to operate in the manner described later. Part of the circuit of the cigarette detector is shown in Figures 8B and 9 where 319 illustrates a battery or other source of power, from which a line goes to the electromagnet 320. The return line from the magnet passes through the cigarette detecting devices 442 referred to later and back to the battery.

Adjoining the magnet is a rotatable disc 321 mounted on a spindle 322 which also has fixed thereto a worm wheel 323. The worm wheel is driven by a worm 324 fixed on a spindle 325 mounted in bearings 326 at the back of the machine and the spindle 325 also carries a sprocket 327 driven by a chain 328 from another sprocket 329 on the shaft 287. The shaft 287 is supported in bearings 330 at the back of the machine and has fixed thereto a spiral 331 engaging with another spiral 332, the latter being shown as a chain line. The spiral 332 is fixed to a cross shaft 333 which has a bevel wheel 334 mounted thereon at the front of the machine, said bevel engaging with another bevel 335 fixed to the main shaft 63. It will therefore be seen that the disc 321 is driven in synchronism with the main shaft 63 which latter also drives the intermittent motion driving the pocket conveyor as will now be described.

The shaft 333 carries a spur gear 336 engaging another spur gear 337 mounted on a spindle 338, the latter gear serving also as a crank disc and having a crank pin 339 as shown in Figure 8B. A connecting rod 340 which is slidably mounted on the spindle 341 of one of the conveyor sprockets 342 is connected to the crank pin. As the gear 337 rotates, the connecting rod slides to and fro on the spindle 341 and has an angular motion which causes a key or block 342a at the back of the connecting rod to enter into one of the slots 343 of a wheel 344 which is also fixed to the shaft 341. The angular movement will therefore cause the wheel 344 to be moved at intervals through an angle equal to the swing of the block 342a, thus imparting an intermittent motion to the shaft 341 and therefore driving the conveyor 224a as desired. The spindle 216 of the forward conveyor sprocket 342 is thus also intermittently rotated as previously mentioned.

Referring again to the disc 321 it will be seen that it is provided with a number of studs 345 which are spaced at equal distances around the periphery. The number of studs spaced around the disc 321 must be at least equal to the number of pocket stages (i. e. movements of the conveyor 224a) that occur before an item at the most remote detector position reaches the ejector mechanism. A few additional studs are required for a reason mentioned later.

These studs 345 are controlled by further springs (not shown) so that if they are pressed into or away from the surface of the disc 321 they stop in position. As any particular stud passes beneath the projection 346 on the armature of the electromagnet 320, the projection will, if the magnet is energised, force the stud into the disc and consequently the rear end of the stud will project through the disc and owing to the spring stud arrangement, remain in that position. When the said stud reaches the top position on the disc it comes into contact with one arm of a bellcrank 347, pivoted at 348 and raises it, as shown in Figures 8B and 9, against the tension of spring 349. The position of the bellcrank lever may be accurately adjusted by a screw stop 780 as shown.

When the bellcrank lever is in its normal position, one end lies behind an angular piece 351 which is fixed to the side of a cam lever 352 pivoted to a bracket at 353. The upper end of the lever 352 is pivotally connected at 354 to an ejector bar 355 which is slidably mounted on a guide 356. The front end of the ejector bar carries an ejector 357 (Figure 9B) which is pivoted to the bar at 358 and controlled by a spring 359. The purpose of this spring mounting is to enable the ejector 357 to swing in case of a jam. The lever 352 is urged by a strong spring 360 shown at the bottom of Figure 8B to cause the ejector head 355 to move across the conveyor path and eject a defective, partly formed, box, but this movement is prevented by the angle 351 being obstructed by the bellcrank 347. At such times as the bellcrank is raised, the lever 352 is free to move, and consequently any faulty boxes may be ejected from the machine without stopping the normal operation of the same. Such boxes pass through guides 355a having top control guides 318a similar to the guides 305a previously mentioned. A cam 508 on shaft 287 engages a cam follower 509 on an extension of the lever 352 and restores the parts to their normal position after operation, the lever 352 being then retained in position by the angle 351. The projecting stud 345 just referred to is pressed back to its normal position by an abutment 510 when it reaches a position opposite to that of the magnet 320. Until a stud has been pressed back as described it cannot again be actuated by a detector magnet, and for this reason a few extra studs are required on the disc 321 to cover the space between the top position of the disc and the abutment 510. Beyond the position of the abutment (considered in the direction of rotation of the disc) all the studs are ready to be depressed by a magnet so that if necessary a magnet might be arranged to operate on the first stud after the abutment position. In Figure 9B side guides 511 are shown near the ejector position which control the partly folded blank and prevent displacement of the various panels until the blank reaches the transfer device 53. The guide 511 near the ejector 357 is slotted to permit the ejector to pass through.

The transfer device 53 consists of a continuously moving chain 361 carried on sprockets 362 and 363 (see also Figure 23), the sprocket 362 being fixed to a spindle 364 running in bearings 365 on the bed 52. One end of the spindle 364 has a spur gear 366 thereon engaging another spur gear 367 on a spindle 368 which has a sprocket 369 at its other end. The sprocket 369 is connected by a chain 370, Figure 8B, to another sprocket 371 near the end of the main shaft 63. The conveyor 361 carries a series of pusher pieces 372 which sweep across the pocket conveyor path and remove the partly finished boxes in succession from the pockets as the latter stop in the path thereof. The pusher pieces 372 are controlled by guides 373 for a reason mentioned later, and the partly finished boxes in the condition shown in Figure 40 pass between a pair of guides 374 and are delivered to the closing bed 54.

Referring to Figures 23 to 27, the closing bed 54 is provided with a chain conveyor which runs continuously and is provided with pusher pieces 376 as shown in Figure 23, said pusher pieces being slotted so that the pusher pieces 372 of the conveyor 361 may pass through them as the latter conveyor overhangs the former as shown in Figure 23. The guides 373 mentioned in the previous paragraph keep each pusher piece 372 with its operative face vertical as shown in Figure 23 until a pusher piece 376 has removed a box from the control of such pusher piece. The pusher pieces 376 carry the partly finished boxes between guides 377, the boxes being controlled by top plates 378 supported on bridges 379. As the partly finished boxes move along between the guides, gum is applied to the panels f' and a' at each side of the box and owing to the shape of said panels the gum is applied in two parallel streaks by segmental gum wheels 380 which are of the construction shown in Figure 23 and have segments of different lengths to suit the different lengths of the streak, due to the oblique cut which separates the panels. After the gum is applied, the partly finished boxes move beneath a rotating folder consisting of disc-like wheels 381 mounted on a spindle 382 carried in bearings 383 fixed to the bed 54, and these discs 381 are cut away in a similar manner to the disc 112 previously mentioned, and operate in much the same manner. The cut-away portions permit the leading edge of each panel f' to run beneath a disc just before the full diameter comes to the lower position. Thus, as the discs rotate, the panels f' and a' are bent down at right angles to the plane of the front panels of the box over thin knife-like strips 384, and as the leading edge of each panel f' passes clear of a disc 381 it comes into contact with a small spiral folder 385. At this position the knives 384 terminate, and therefore the upper panels are folded into close contact with the lower panels and adhere thereto owing to the adhesive applied.

Further movement of the conveyor carries the box, which is now in the condition shown in Figure 41, between further guide members constituted by the lower portions of the sides of the brackets 404 described below until it reaches a position centrally disposed with respect to a vertical stacker or magazine indicated generally by 386. At this position the pusher piece is tripped by a crescent shaped plate 387, Figure 23, and passes below the bed 54 leaving the box in the desired position at the bottom of the stacker.

The conveyor 375, gum wheels 380 and the folders 381 are all driven by a chain 388 which passes over sprockets 389, 390 and 391 on the spindles 392, 393 and 394 respectively. Spindle 392 carries the gum discs which rotate in the ordinary manner in a bath 395 and have the usual scraping devices 396. Spindle 393 of the sprocket 390 also carries a gear 396 which meshes with another gear 397 on the spindle 382 of the rotary folder, while the spindle 394 also serves as the spindle for a sprocket 399 at one end of the conveyor 375, the sprocket 400 at the other end merely running idly on its spindle bearings.

Chain 388 is driven from a small sprocket 401, Figure 8B, which is mounted on the end of the shaft 287, see also Figure 1.

The vertical stacker comprises a rectangular box, the walls of which are preferably heated, for example, by electrical heaters.

The side walls consist of a pair of members 402 which are pivoted at 403 to brackets 404 fixed to the bed of the machine as indicated in Figure 26. The pivoted walls are operated as described later to swing slightly about their pivots so that as the boxes are moved upwards into the stacker the pressure on the sides of the boxes is released during the actual movement.

The mechanism for operating these walls consists of two crown cams 405 on the spindle 394 which engage cam rollers 406 on double arm levers 407 pivoted to brackets 408 fixed to the bed of the machine. The upper ends of the levers are slotted at 409 and engage pins 410 attached to the movable side walls. Springs 411 which are fixed at one end to the brackets 404 and at the other end to the side walls 402 so that they tend to pull the walls outwards, co-operate with cams to effect the movement of the walls.

Each box as it is delivered beneath the stacker is moved upwardly into the same by a reciprocating platform 412 which slides in a guide 413 being operated by one arm 414 of a bellcrank lever pivoted at 415 to the machine frame and operated by a cam 416, Figure 27, which engages a roller 417 on the other end of the bellcrank lever. A spring 418 draws the platform 412 back into its lower position.

Just after a box is lifted by the platform 412 it is subjected to end pressure to ensure that the lid is properly closed. This is effected by a presser arm 495 pivoted to a lever 496 which is in turn fixed to a spindle 497 rotatably mounted in the bed 54. A cam follower (not shown) on the lever 496 engages a cam 498 on the spindle 394 and in co-operation with a spring (not shown) causes the presser to press the box endwise at the desired time, the reaction being supplied by a bar 424.

As the platform moves a box upwardly into the stacker the box passes over a pair of spring pawls or catches 419 which are pivoted at 420 to small brackets, not shown, in the interior of the bed and are normally urged into the position shown in Figure 27 by springs 421. As a box moves upwards the pawls rotate on their pivots and permit the box to pass by, but spring in again and prevent it from falling as the platform 412 descends.

In order to maintain the resulting column of boxes in the correct vertical position in spite of the movement of the walls 402, the latter are grooved to contain fixed strips 422 which are fixed to the pivot 403 and a rod 423 near the base of the stacker and are flush with the operative faces of said walls when the latter are in the inner position. Three of these strips are shown in connection with each wall. The other walls of the stacker consist of a vertical bar 424 which is hinged at 425 but normally clamped in position while the front wall consists of a vertical plate 426 which is carried on brackets 427 which are in turn mounted on rods 428 secured to the brackets 404.

As the boxes reach the top of the column they are removed in a transverse direction by a reciprocating pusher 429 which is pivoted at 430 to a bellcrank lever 431 pivoted to the frame 404 at 432, said lever being operated by a cam rod 433 having a roller 434 running in contact with a cam 435, the return movement being by gravity assisted by a spring, not shown. The pusher 429 is supported also by a roller 432 which travels on a plate 493 but is slightly lifted as shown in Figure 27 when the pusher engages a rising box. The pusher 429 may be arranged to thrust each box through a mouthpiece or guide 436 which is shown pivoted in Figure 27 so that it may tilt and deliver each box down a slope, for example, to a wrapping machine.

Referring now to Figures 19A to 22B, the bed 56 carries at one end a cigarette feeding apparatus indicated generally in Figure 1 by the reference 57. This apparatus may be of any known type, but as shown, it consists of a hopper 437 having an outlet at the base in which are fitted a number of partitions 438 so that cigarettes in the hopper can pass down between the spaces in the partitions on to the bed of the machine. The mechanism which moves the cigarettes through the hopper is driven by chain from a sprocket 437a on the shaft 79. From Figure 22B it will be seen that the middle two partitions are close together, being only separated by a few millimetres. The object of this arrangement is to divide the cigarettes emerging from the spaces between the partitions into two side by side groups, each group being five cigarettes in width. The ends of the spaces between the partitions are closed by covers 439. A continuously moving chain conveyor 440 runs along the bed 56 and carries a series of pusher pieces, such as 441, which project through a slot 56a in the bed, see Figures 22A and 22B. As each pusher 441 passes beneath the partitions 438 it carries away the two lower rows of cigarettes in the form of two side by side batches of 10 cigarettes each.

At the outlet from the spaces between the partitions there is provided an electric detecting device 442 which is shown merely as a block in Figure 19B. Detectors of this kind are, however, well known and consist of a series of movable members so arranged that if a cigarette is missing from a batch fed from the hopper a movable member drops and completes an electric circuit.

In the present instance the operation of one of the members would cause the circuit shown in Figure 8B to be energised, and consequently, an electromagnet 320 will cause one of the studs 345 to project from the disc 321 and in the course of time such stud would cause a faulty box to be ejected by the ejector as previously described.

The cigarettes are carried along the bed between guides 443 fitted with a top plate 444 so that, together with the bed 56, these members constitute a rectangular tunnel of approximately the same dimensions as the batches of cigarettes. In order to maintain the spacing between the side by side batches the top plate 444 is fitted with a downwardly projecting tongue 445, see Figure 20.

It will be noticed also from Figure 20 that the side guides 443 are grooved at 446. These grooves are to accommodate small lateral projections 447 at each side of the pusher piece 441. These projections are provided so that the pusher engages the inner member when the same is associated with the batches of cigarettes and will be referred to later.

Shortly after leaving the hopper the cigarettes arrive beneath the apparatus, indicated generally by the reference 55 in Figure 1, which produces the inner member. The description of this apparatus will be deferred for the sake of convenience, but for the present it may be assumed that an inner member $r$ of cross-section such as shown in Figure 29 is deposited on the bed 56 in the path of the cigarettes. The inner member, as will be seen in Figure 42, has two small projections $p$ which serve to stiffen said member against movement by the lid when the box is opened and closed, and as it is essential that these projections should lie beyond the plane of the side walls of said member, the side guides 448 through which the cigarettes and said member are next conveyed and which are of much the same construction as those numbered 443, are provided with small additional grooves 448a which clear the projections $p$ on the inner member and permit said member to pass along the guides uninjured. The inner member just described is an "inner corner member."

The side guides 448 have a top plate 449 which is similar to the top plate 444.

Referring to Figure 19A, it will be seen that the guides 448 terminate near a slot 450 made transversely of the bed 56. A strip of tin foil or similar material $t$ which is fed from a reel (not shown) is fed downwardly through the slot 450 by feed rollers 451 and 452, the latter being merely a pressure roller. The roller 451 is fixed on a spindle 453 which carries at its rear end a bevel wheel 454 engaging a large bevel 455 which in turn engages a smaller one 456. The latter is mounted on a spindle 457 mounted in bearings 458 and at the opposite end has a sprocket wheel 459 fixed thereto which is connected by a chain 460 to another sprocket 461 on the shaft 70 of the machine. The large bevel 455 is mounted on a vertical spindle 462 which also carries a knife blade 463 so that as the spindle 462 rotates the knife blade sweeps round and cuts the tin foil against co-operating edges 464. The general construction of this apparatus is clear from Figures 19A and 22A and no further description is thought necessary. The apparatus is so driven and timed that a strip of tin foil is severed just as the leading ends of the cigarettes engage the strip and push it into folding apparatus where it is wrapped as a strip around the cigarettes and inner corner member as shown in Figure 37.

The folding apparatus merely consists of a top plate 465 which in co-operation with the surface of the bed 56 bends the foil into a U about the member and the cigarettes, whilst side guides 466 grooved in the same way as the guides 448 retain the various items in the proper position with respect to the pusher. The wrapped bundle is carried along the remaining part of the bed 56 by the pusher and delivered into a pair of guides 467 which constitute in section a prolongation of the guides 466 and are similarly grooved. At this point the pusher piece passes beneath the bed on its return journey, being tripped by suitable mechanism in the known manner so that it falls back clear of the bundle which remains stationary within the guides 467.

To eject the bundle from the guides and deliver it on to the blank which lies in the conveyor pocket 224 on the bed 52 as indicated at the left hand end of Figure 19A, a pusher 468 is provided which on its working stroke moves horizontally through the guides 467 and delivers the bundle to the position indicated, after which the operative face of the pusher moves in a vertical plane with a swinging movement about a guide bar 469, and returns backwards for the same distance and then swings down to engage the next bundle lying within the guides 467.

These movements are effected in the following manner. The pusher 468 is connected to a slide 470 which slides on the guide 469 and is reciprocated thereon by a link 471 pivoted at 472 to a bracket 473 on the frame of the machine. The connection between link 471 and the slide 470 is by means of a roller 471a on the link which works in a groove 470a in the slide, see Figure 22A. The link 471 is slotted as shown and a sliding block 474 which works in this slot embraces a crank pin 475 of a crank formed on the end of the forward conveyor spindle 476 by crank discs 490, see Figure 22A. Therefore, as the spindle rotates the pusher 468 is reciprocated. The swinging movement is obtained by a partial rotation of the guide rod 469 to which the slide 470 is attached by means of a key working in a spline 477. The guide rod 469 is rotatable mounted in a bearing 480 and at its other end carries a small pinion 481. This pinion engages with a toothed quadrant 482 which is pivoted on a pin at 483. The hub of the quadrant has a short lever 484 projecting therefrom which carries a cam roller 485 running in a box cam 486 which is fixed on the shaft 70. As the shaft rotates the quadrant is oscillated about the pivot 483 and thus communicates an oscillating movement to the guide rod 469 and by suitably timing the parts said rod is caused to lift the pusher 468 at the end of its working stroke and lower it again at the beginning of the next working stroke.

The shaft 70 which is driven by the chain 68, as previously described, is carried in bearings 487 at each end of the bed 56 and at one end is fitted with a bevel wheel 488 which engages another bevel 489 mounted on one of the crank discs 490 which is in turn fixed to the forward conveyor spindle 476. The conveyor is carried by sprockets 512 on the spindle 476 and spockets 513 on a spindle 514 at the other end of the bed 56. Thus, as the shaft 70 rotates, the chain conveyor is continuously operated and the foil feeding and cutting apparatus is also continuously driven.

The apparatus for producing the inner corner member $r$ will be described with reference to Figures 28 to 31 and also to Figure 22B which includes a plan of the principal parts of the apparatus.

The inner corner member is made from thin cardboard or like material similar to that used for making the receptacle. The material is fed as a web $w$ from a reel (not shown) and passes around a guide roller 515, after which it passes over a roller 516 which may have flanges 591 for guiding the web, the roller forming part of a detector, as described later. The web next passes between a pair of feeding rollers comprising a roller 517 and a co-operating roller 518 which is preferably rubber covered and then between rollers 519 and 520. The roller 520 is provided with scoring or perforating and cutting blades and the roller 519 with slots into which said perforating and cutting blades enter. These blades form the scores or perforations s and the cuts u in the blank of the inner corner member and also sever it from the web. The member which is thus severed from the web passes into the grip of feed rollers running slightly faster than the web speed in order to space the cut blank therefrom. These feed rollers, which are shown clearly in Figure 22B, comprise two pairs of knurled rollers 521 on spindles 522 and two sets of co-operating pressure rollers 523. The rollers 523 are carried on arms 524 which are pivoted on a fixed spindle 525 adjustably mounted in slots 526 on the side frames 527. The feed rollers deliver the cut blank on to curved guides 528, just in front of a feeding member comprising feed teeth 529 fixed to a swinging lever 530. The teeth are provided with grooves 781 as shown in Figure 30 so that they slightly overlap the adjacent end of the inner corner member and the latter is therefore engaged securely by the teeth and moved round to the desired position. During the movement the blank is controlled by a top guide 595 supported on the spindle 525. The lever 530 which is carried on a spindle 531 is mechanically operated as hereafter described to cause it to swing through an arc of 90 degrees, thus bringing the blank into position beneath a folding or nipping device which forms the central division (or rib) in said blank by folding the middle two panels v, Figure 43, into contact. The blank is registered in this position by stops 548 at the ends of the guides 528. The folding device also bends up the outer panels x at right angles to the plane of the blank. This folding or nipping device consists of a lever 532 pivoted at 533 to a bracket 534 fixed to the machine bed 56 and having at one end a pair of pivoted folders 535 which effect the folding operations. The folders 535 which are shown clearly in Figures 28 and 22B are substantially L-shaped in cross-section, the short limbs of the L's being arranged to fold the middle panels of the inner corner member about a creasing blade 536, while the longer limbs of the L's press the inner corner member between a pair of plates 537 which are spaced apart a distance equal to the distance between the outer scores s (Fig. 43) when the middle rib has been nearly formed so that the movement bends the outer panels up at right angles to the plane of the member. The plates 537 may constitute portions of the guides 528 or as shown may be attached thereto. The creaser blade is clamped between a pair of horse-shoe-shaped clamps 593 which are in turn fixed to members 546 referred to later.

The folders 535 which are pivoted at 538 are controlled by a spring 592 so that normally they tend to assume the position shown in Figure 28, but from that figure it will be observed that continued downward pressure by the lever 532 will cause the short limbs of the L's after being arrested by the blank which is then held against the clamp 593 to approach one another until they are practically parallel and closely embracing the creaser blade 536. Each pivot 538 has a segmental stop on it as shown in Figure 28 to limit the folder movements.

The lever 532 is operated at the desired intervals by a cam 539 which engages a roller 540 at the end of the lever 532, the return movement being by a spring 541. The blank is thus formed into a section resembling that shown in Figure 29, but upside down as compared with that figure.

After the forming operation is completed the inner corner member is rotated through 180° so that it is turned over and delivered on to the surface of the bed 56 in the path of the oncoming batch of cigarettes. This movement is effected by means of a rotary conveyor comprising a number of pawls 542 or feeding fingers which are mounted on a rotary member or spider 543 and are controlled by springs 544 so that normally they assume the position shown in Figure 30. The pawls are arranged in three pairs and each pair carries an inner corner member around curved guides 545 which are formed on curved frames 546 which are fixed in position as described later, the blank being controlled in transit by strips 547 which are fixed to the frames 546 and overhang the curved guides 545 as shown in Figure 28. A curved guide 549 which is supported from the frame 546 as shown in Figure 30 prevents the blank from bending and moving away from the creasing member 536.

It will be noted from Figure 28 that the lower parts of the frames 546 are grooved at 550, these grooves being adapted to accommodate the side wings 447 of the pusher piece 441. When a pair of pawls 542 has delivered an inner corner member on to the bed 56 the pawls are tripped back by striking an abutment 551 so that the inner corner member remains still on the bed in spite of the continued movement of the pawls 542. Immediately the pawls have cleared the abutment 551 they spring back to their operative position under the influence of the springs 544. In this way an inner corner member r of the kind shown in section in Figure 29 is deposited on the bed in the path of the cigarettes which as previously mentioned are divided into two side by side batches by the rib 445 of the top plate 444. The cigarettes carried along by the pusher piece will, therefore, pass beneath the inner corner member and when the ends of the cigarettes are flush with the ends of said member the latter will be gathered by the projections 447 and carried along with the cigarettes, the whole assembly being thereafter carried into contact with the foil strip which is wrapped about the assembly to form the bundle previously referred to.

In a modification and in order properly to locate the blank of the inner corner member in position beneath the folders 535, spring stops may be arranged as shown in Figure 31. One of these stops 552 is pivoted at 553 to the central guide 528 and is under the influence of a spring 554 which normally retains it in the position shown in the drawing. As a blank is carried around the guides 528 by the feeding device the stop 552 will be depresesd until the blank has passed it when it will once more spring into the position shown in the drawings and form a locating device or stop for the rear edge of the blank. The front edge of the blank is similarly located by a stop 555 mounted on the curved guide 549 and controlled by a spring 556. The spring 556 is very delicate and as the blank is pressed down from the position shown by the folders 535 and thereafter carried away by the pawls 542 the member 555 is moved against the pressure of the spring and permits the blank to pass on under the curved guide 549.

The apparatus described above is driven from the main shaft 70 by means of a sprocket 557 which drives a chain 558 engaging a larger sprocket 559 on the spindle 560 of the roller 516. The spindle 560 has attached thereto a gear 561 which engages with another gear 562 on the spindle 563 of the roller 517. A gear 594 fixed to the back of gear 562 engages with an idler gear 564 which in turn engages with a gear 565 on the spindle 566 of the roller 520. At the other end of the spindle 566 is mounted a gear 567 which engages with another gear 568 on the spindle 569 of the roller 519. In Figure 28, the roller diameters coincide in several cases with the pitch circles of the gears and therefore the rollers are shown as dotted lines with the gears broken away at places. The roller 518 is carried on a spindle 570 which runs freely in the frames 527. The rear end of the spindle 560 has attached thereto a sprocket 571 which drives a chain 572 which runs around a sprocket 573 on a shaft 574, Figure 22A, rotatably mounted in one of the frames 527. The other end of the shaft 574 has fixed thereto a gear 575 which engages with gears 576 on the spindles 522 of the knurled rollers 521, see Figure 22B.

The lever 530 is also operated from the main shaft 70 by means of an eccentric 577 having a rod 578 pivoted at its upper end to a lever 579 which is fixed to a spindle 580 mounted in a bearing formed in a bracket 581. The spindle 580 has fixed thereto a bevel wheel 582 which engages with another bevel 583 fixed to the shaft 531 which carries the lever 530. In this way rotation of the shaft 70 causes the lever 530 to be periodically oscillated through the angle of 90° as above-mentioned. The shaft 70 also carries a bevel wheel 584 which engages with another bevel 585 mounted on a pin 586 which is fixed into the bracket 581 as shown in Figure 28. At the back of this bevel is fixed a large sprocket 587 which drives another sprocket 588 by means of a chain 589 said sprocket being fixed to a spindle 596 which runs in bearings formed in the brackets 534 and 581 and carries at its other end the cam 539. As will be seen from Figure 28, the brackets 534 and 581 have bosses on their inner faces and it is to these bosses that the frames 546 are fixed.

A further sprocket 597 also fixed to the bevel wheel 585 drives another sprocket 598 by a chain 599, the sprocket 598 being fixed on a sleeve 600 which is also journalled in the brackets 534 and 581 and embraces the shaft 596. This sleeve 600 carries the member 543 on which the pawls 542 are pivoted.

The detector for the inner member which is shown at the right hand side of Figure 28 consists of a double arm lever 601 fixed to a spindle 602 mounted in the frames 527 on insulating bushes as indicated by cross hatching. The lever 601 has contact screws 603 and 604 at its ends as shown, and an arm 605 fixed to the spindle 602 has a roller 606 on its end which is urged towards the surface of the roller 516 by a spring (not shown). Should the paper web break, the roller 606 moves inwards and contacts with the roller 516, thus causing an electrical connection at the contact screw 603 to be made.

There is sometimes a double thickness of material in a web at the position where a joint has been made and when such thickness passes between the rollers 516 and 606 the other electrical contact 604 will be made.

In either case, the circuit of an electromagnet similar to the electromagnet 320 will be completed and the appropriate stud 345 forced out of the disc 321 so that at the proper time the box which lacks an inner corner member or contains one formed of joined material will be ejected from the machine in the manner previously described.

The detector 601 is similarly included in a circuit comprising a source of power which may be the battery 319 and an electromagnet (not shown) which is similar to the magnet 320. This further magnet is disposed near the periphery of the disc 321 in the same manner as the magnet 320 but at a position more remote (i. e. further round the periphery considered in a direction opposite to the direction of rotation of the disc) from the top position of the disc at which a projecting stud comes into contact with the bell crank 347. This is because the detector 601 is more distant from the ejector position than is the detector 442, that is, there are more pocket stages (movements of the conveyor 224a) between the detector 601 and the ejector position, see Figures 8B, 19B and 28.

When it is desired to make boxes according to definition A without corner portions, of trapezoidal cross-section, the front body and lid panels may be wider or narrower than the corresponding back panels.

If the front panels are wider, the machine will be constructed and operated in the same manner as that previously described, except for a few minor alterations. The blank magazine 71 is altered to suit the shape of the blank and the pusher pieces of the two conveyor chains 89 are slightly staggered to suit the varying width of the blank. The transfer device 51 is as before, except for such items as the position of the stops 196 which are adjusted as necessary.

The bed 52 is substantially the same but the conveyor pockets 224 are made of trapezoidal cross-section with the narrow side constituting the base of the pocket. The guides 355a at the ejector 357 and the various guides of the transfer device 53 require obvious alteration to suit the new section of the box.

The bed 54 requires alteration in respect of the guides which have to be of suitable angular construction to suit the box section.

The rotary folders 381 may be as before or if necessary they may be altered to rotate in planes parallel to the sides of the box while the fixed folders 385 must be suitably shaped to suit the new shape of the box. The stacker 386 is replaced by a horizontal drier with suitably sloping sides.

If the box according to definition A is to be of trapezoidal cross-section with the front narrower than the back, the pockets 224 are of rectangular cross-section as in the machine described with reference to the drawings and the only material difference in the machine is in the guides and folders of the closing bed 54 which are disposed at the proper angles to suit the box section. The stacker 386 is replaced by a horizontal drier as in the above described modification.

If, however, a trapezoidal box is required according to definition B, the front should be wider than the back as explained in the specification of United States application Serial No. 225,008, and in such a case the machine construction is as set forth above.

If an inner member is used in any of the above cases the guides of the bed 56 are altered to suit the angular shape of such member and after the member is delivered on to the blank it will retain its shape by reason of the shape of the pockets where such are of trapezoidal cross-section while when the pockets are rectangular, the bottom edges of the member will lie snugly in the bottom angles of the blank and thus be kept under control.

Referring now to Figures 44 to 49, which illustrate a series of folding stages in the manufacture of a box according to definition B, it will be observed that the front body panel is relatively longer than the front body panel of the blank shown in Figure 32. This is because in the present instance the corner portions of the box are provided by the blank itself whereas in the former case an inner corner member constituted part of the box.

The same reference letters are used as in Figure 32, but only the panels of interest in the present description have been marked.

The blank shown in Figure 44 is provided with reinforcing flaps, secured to the main body of the blank as in the previous case. The first operation consists in folding up the side panels c' at right angles as shown in Figure 45. Next the front body panel a with its side panels is folded as shown in Figure 46 so that it is substantially parallel with the back body panel. The front lid panel f is then folded over to the position shown in the figure.

Adhesive is applied to the side panels of the front body panel a and then said side panels are folded down to bring the box into the condition shown in Figure 47. The next stage in the operations is shown in Figure 48 where the side lid panels d' of the back lid panel have been folded upwards, and after the application of adhesive the side lid panels f' of the front lid panel are folded down so that the box is in its finished form as shown in Figure 49.

In an alternative method the front body panel a may be brought into the position shown in Figure 46 as the first operation. Then the side panels a' and c' are folded in any order and secured. Next the front lid panel f is brought to the position shown in Figure 46 after which the panels d' and f' are folded to suit the folding of panels a' and c' and secured.

Or again, the front lid panel may be folded into the position shown in Figure 46 as the next operation after the folding of the front body panel a as set forth in the preceding paragraph.

In carrying out the method as illustrated in Figures 44 to 49 the machine is of the same general construction as that described with reference to the drawings up to the transfer device 53 except that the conveyor pockets 224 are shorter so that only the panels c' are folded when the blank is pressed into a pocket by the plunger.

The partly folded blank is transferred from the pocket 224 as before and delivered to a closing bed similar to the bed 54 where the box is brought into the condition shown in Figure 47. The only material difference in such bed is that the guides have to be suspended above the bed level a distance sufficient to enable the panels d' to pass freely along. The application of adhesive and folding down of the panels a' is substantially the same as before but the fixed folders 385 also require to be suspended a little above the bed level. After this the box passes between a further set of guides, adhesive applying apparatus and folders like that shown on the bed 54 and arranged in tandem with the set just described. The parts are, of course, modified as to shape and location to suit the small lid flaps.

The box, which is then as shown in Figure 49, passes up the stacker.

The apparatus described above with reference to Figures 7A and 7B is found to limit the speed of the machine very considerably. The apparatus so far described and shown in Figures 7A and 7B will only stick the flaps when the speed is less than or not much in excess of 30 boxes per minute. Where however higher speeds are required it is necessary to make certain modifications to the apparatus illustrated in Figures 7A and 7B. These modifications, which are described below, enable the machine to work at a high speed to produce 120 boxes per minute. It is better, however, in all cases to use the modification about to be described.

Referring to Figures 7A and 7B and to the accompanying text it will be found that the pushers 88 are stationary in the position shown. An inspection of the drawings will thus show that the pressure rollers 146 at the left of the Figures and the other set of pressure rollers which are spaced one pusher pitch away will operate on the blanks while they are moving. In consequence, the panels e' and b' are only subjected to the roller pressure for a very short time and this period is inadequate for high speed working.

In the modification about to be described with reference to Figures 50A to 51C, the parts are rearranged and the timing so adjusted that the blanks are stationary, while the flaps e' and b' are gripped between pressure rollers similar to the rollers 146 and 147. As the period of time that the conveyor is stationary is relatively large as compared with the time occupied during each movement of the conveyor, an improved result is obtained.

Referring now to Figures 50A to 51C of the drawings, the machine bed 610 has a magazine 611 at one end in which blanks of the kind shown in Figure 32 are stacked as indicated by chain lines in Figure 51C.

The blanks are placed in the magazine 611 with the coated side uppermost and are removed one at a time from the bottom of the stack by a pair of vertically reciprocating suction members 612, Figures 50C and 51C. The suction members are connected by pipes 613 to a suction body 614 to which is attached a stem 615 slidable in a guide block 616 fixed to the face of the bed. A flexible pipe 617 is connected to the guide block 616 and to a suction pump (not shown) and the interior of the guide block 616 and the stem 615 are provided with ports so that the two members, which are relatively movable, together constitute a valve for starting and stopping suction in the suction members. The suction body 614 and its associated parts are reciprocated at intervals by a cam 618 secured to a rotatable shaft 619. The method of driving this shaft will be deferred until later when the whole driving arrangements are described. The cam operates a lever 620 fixed to a shaft 621 rotatably mounted in the bed 610, the lever having a follower 622 which is held in engagement with the cam by a spring 623. The other end of the lever 620 is pivoted to a link 624 which is also pivoted at 625 to the suction body 614. As the cam 618 rotates, the suction body is lifted so that the suction members arrive at the position shown in chain lines in Figure 50C, at which time, owing to the relative positions of the stem 615 and guide 616, the suction commen the suction members seize the lowest blank in the magazine 611. The blanks are retained in the magazine by supports 626 having serrated faces. As the suction members are moved downwardly by the cam 618 the lowest blank is pulled out of the magazine, being slightly bent in the process so that it clears the supports 626 and is brought down to a lower position at which, when the suction is cut off, it rests on guide rails 627. The guide rails 627 constitute guides for the pusher pieces 628 (see Figure 50B) of an intermittently operated chain conveyor 629. When the blank is delivered to the rails the conveyor is stationery. As the conveyor 629 moves along to the left of Figure 50C a pair of pushers 628 engage the blank and move it along the rails and a pair of top guides 630 are moved beneath the magazine and downwardly on to the blank to ensure that the blank is in contact with the rails. The guides 630, Figure 50C, are supported on arms 631 pivoted on a shaft 632 mounted in bearings in the bed 610. A cam lever 633 is also fixed to the shaft 632 and adjustably secured to an arm 631 and a cam follower 634 which is carried by the lever 633 engages a cam 635 also mounted on the shaft 619. A spring 636 retains the follower 634 in contact with the cam 635. As the cam rotates, the guides 630 are moved from the position shown in Figure 50C to a position where the ends of the guides are just clear of the inner walls of the magazine 611 so as to permit the next succeeding blank to be moved downwardly from the magazine on to the guide rails 627.

As above stated, the blank is carried along the rails 627 by an intermittent conveyor and during its journey along the bed 610 the flaps g, e' and b' are bent over into contact with the panels f, e and b respectively of the blank and are secured thereto by adhesive.

The adhesive applying apparatus consists of disc-like members 637 furnished with segments 681 as shown in Figure 50C of appropriate form and disposition for applying adhesive, e. g. gum or paste, to the flaps e' and b' and to the panel f. The adhesive for securing the reinforcing flap g to the panel f is preferably applied to the latter panel, and this may be done by means of a complete disc or a segmental disc, as desired. Generally speaking, adhesive is best applied in short strips in such cases, and therefore the segmental form is preferable.

As will appear later from the description of the driving arrangements, the discs 637 during one complete rotation apply adhesive to three successive blanks. The particular disc shown in Figure 50C is for applying adhesive to the panel f, and thus there will be three segments 681 on the periphery, spaced at 120°. Each segment is sub-divided into a number of smaller segments, as shown, so that the adhesive is applied to the panel in a series of short dashes. The disks for applying adhesive to the flaps e' and b' are of similar construction so far as the spacing of the segments is concerned, but owing to the smallness of the flaps the segments are very short.

The adhesive applying members above described are furnished with adhesive from a bath 638 in which they rotate. The bath is supported on a rod 639 fixed to a bracket 640 and on a spindle 641 supported in holes in the bed 610. By withdrawing the spindle 641 the bath may be swung downwardly around the rod 639 and slid out of the hole 642 in the frame along said rod.

Adjustable scrapers 643 are provided to remove excess adhesive from the discs 637.

As previously stated, a blank is removed from the magazine and is carried along the rails with the coated surface upwards. During transit through this portion of the machine the blank is controlled by a number of top and bottom guides similar to the guide 652 referred to below.

The first operation performed on the blank consists in bending the flap g downwardly so that it is disposed at right angles to the plane of the blank, as shown in Figure 33. This operation is effected by a rotatable disc 644 which is fixed to a spindle 645 rotatably mounted in a bracket 646 secured to the top of the bed 610. The rim of the disc 644 is cut away as clearly seen in Figure 50C and the parts are so timed that as the disc rotates the leading edge of flap g of the blank runs beneath the disc at the time the cut away portion is approaching the bottom position.

A rail or guide 647 is fixed to the bed, so that its upper edge is level with the upper surfaces of the guide rails 627. As the blank is moved along the rails 627, the disc 644 bends the flap g vertically downwardly over the edge and face of the rail 647. In order to prevent the neighbouring portion of the blank from bending upwards or buckling, the disc 644 has a projection or hub 648 which contacts with the blank and controls it. After this folding operation adhesive is applied by the mechanism above described, in co-operation with pressure rollers 649 which are rotatable on a shaft 650 adjustably mounted in bearings 680 fixed to the upper surface of the bed. As the blank is moved away from the adhesive applying position, the edge of the flap g comes into contact with a folder 651 consisting of an oblique rail, see Figure 51C, and further movement of the blank causes the flap g to be bent through a further angle of approximately 90° so that it is practically in contact with the under surface of the panel f. The neighbouring portion of the blank is controlled during this operation by a top guide plate 652. The guide 652 is supported by a bracket 682 depending from a bridge plate 683 which extends across and above the bed 610. It will be seen from the drawings that a number of guides of similar construction to the guide 652 are provided for the purpose of controlling the blank during transit. These further guides will be referred to later as the occasion arises. A guide similar to 652 and in alignment therewith projects upwardly from the bed surface.

During the latter stages of the operation the blank reaches a position at which the blank is stationary, and during this stationary period pairs of tuckers 653 and 654 move downwards and bend downwardly the flaps e' and b' in the manner described below.

The pair of tuckers 653 operate on the rear flaps e' and b' of one blank while the pair of tuckers 654 simultaneously operate on the front flaps e' and b' of the next blank so that at each operation two flaps on each of two neighbouring blanks are bent down at once by the tuckers 653 and 654. When the conveyor has moved a further stage the tuckers again operate and fold down the rear flaps of one blank and the leading flaps of the next, thus all the flaps e' and b' of a particular blank are bent down during two stages of the conveyor movement. The tuckers 653 and 654 are fixed to arms 655 carried on a shaft 656 rotatably mounted in the brackets 680 fixed to the upper surface of the bed 610. The front end of the shaft 656 has attached thereto a lever 657, the other end of said lever being connected at 658 by a small universal joint with a cam rod 659 arranged to slide over a cam shaft 660. The cam rod 659 carries a roller 661 engaging a cam 662 on said shaft, the return movement being by means of a spring 663 (Figure 50C). The shaft 660 is continuously rotatable, being driven as hereinafter described so that the above-mentioned tuckers and further parts to be described can operate while the intermittent conveyor 629 is stationary.

The flaps e' and b' are folded into contact with the lower surfaces of the panels e and b by means of pivoted tuckers. A tucker 664 is shown in dotted lines (Figure 50C) at the end of its movement, at which position it has operated to fold a rear flap e' so that the leading edge of such flap engages a curved folder or guide 665 in such a manner that further movement of the conveyor will move the flap into close contact with the lower surface of the panel e. The position of the tucker 664 at the other end of its movement is shown in chain lines.

Further tucking members 684 are provided which operate on the leading flaps e' and b' of one blank while the tuckers 664 operate on the rear flaps e' and b' of the preceding blank. The members 684 are formed on the ends of levers 685 which are pivoted on a spindle 686 extending across the bed 610. The upper ends of the levers are fixed together by a spindle 687 to which is pivoted a link 688. The other end of the link 688 is pivoted to a short lever 689 which is fixed to a spindle 667 referred to below whereby the tuckers 684 are operated by the same mechanism as the tuckers 664.

As above stated, the tuckers 653 and 654 operate while the blanks are stationary, and at the commencement of the operation of the tuckers 653 and 654 the tuckers 664 and 684 are in the positions shown in chain lines. After the tuckers 653 and 654 have folded down the flaps the tuckers 664 move in an anti-clockwise direction while the tuckers 684 move in a clockwise direction, as viewed in Figure 50C. Thus the tuckers 664 bend up the rear flaps e' and b' on the leading blank while the tuckers 684 bend up the leading flaps e' and b' of the succeeding blank. The tuckers 653 are narrow so that the tuckers 664 which are slotted can pass by, and on the other hand the tuckers 654 are slotted so that the tuckers 684 which are narrow can pass through them. As the conveyor moves on again the tuckers 664 which are still in substantially the upper position prevent the leading flaps e' and b' of the succeeding blank from unfolding to any appreciable extent, and the flaps are thereafter controlled by the guide 665 until they enter between pressure rollers referred to below. The tuckers 664 and 684 may operate to some extent while the conveyor is moving, in which case the tuckers 664 will rise and overtake the rear flaps e' and b'.

Each tucker 664 is fixed to a spindle 667 rotatably mounted in the bed 610, and to the spindle 667 is fixed a small lever 668 which is pivoted at its end to a link 675 pivoted to a lever 669 fixed to a spindle 670 rotatably mounted in the bed 610. A lever 671 is fixed to the spindle 670 and provided with a roller 672 engaging a crown cam 673 which is also fixed to the shaft 660, the return movement being by a spring 674 (Figs. 50B, 50C). The spring 674 is fitted between the spindle 667 and a pin in the bed so as to avoid the effect of backlash in the moving parts and secure the desired movements of tuckers 664 and 684. Further movements of the conveyor bring the blank, with its flaps under control as above described, into the grip of the first set of pressure rollers.

There are four sets of rollers which are marked A, B, C and D. Each set consists of an upper roller 690 and a lower roller 691, each pair of rollers being geared together by gears 692 and 693 and intermittently rotated. The upper rollers of each set are rotatable on spindles 694 which are supported in brackets 695 fixed to the machine bed. As may be seen from Figures 50B and 51B, the spindle ends are eccentric whereby the upper and lower rollers may be separated by pulling upwards on levers 696 against the tension of springs 697. Adjusting screws 698 are provided for setting the rollers. The lower rollers are fixed to spindles 699 journalled in the machine bed and driven as described later. Scrapers 766 are provided for removing from the rollers 691 adhesive which may get thereon. During transit between the pairs of rollers the blanks are controlled by top guides 700 fixed to brackets 701 depending from bridges 702 extending across the bed and supported by the brackets 695 in a similar manner to the guide 652. Throughout the machine the bridge members are secured by spring clamps of the kind indicated in Figures 50B and 51B by the reference numeral 762. Guides 703 support the blanks, said guides being fixed to the bed surface. The sets of rollers are grouped in two pairs and the arrangement is such that the set A and set B grip in turn (i. e. at successive stops of the conveyor) the leading flaps e' and b' of a blank. Thus rollers A and B are spaced apart a distance equal to the pitch between successive pushers 628.

The sets of rollers C and D operate on the trailing flaps e' and b' of said blank. They are also spaced apart a distance equal to the pitch between successive pushers, but set C is separated from set B by a distance equal to the pitch between successive pushers plus half a blank width so as to secure the proper location of the flaps beneath the appropriate rollers. The reason for arranging the sets of rollers so that they operate in the manner described is because in the packing machine in question the blanks after passing through the rollers are turned over lengthwise and delivered on to the packing machine conveyor which is parallel to the conveyor 629 but which moves in the opposite direction. In this manner the leading flaps e' and b' on the conveyor 629 become the trailing flaps on the packing machine conveyor, and should one not be properly stuck it may open and it is inconvenient to turn down such a trailing flap on the packing machine. If a leading flap opens on the packing machine it can easily be pressed down by a fixed folder or guide. For this reason it is preferable to operate on the flaps which are leading on the machine illustrated at the earliest possible moment to ensure proper adhesion of said flaps.

The upper roller of set A may have that part of its periphery which engages the panel f cut away to segmental form in order that the remainder of the blank may pass into the bight formed between the rollers before actual pressure is exerted on the panel. For instance, the panel

*f* may travel halfway between the rollers before the pressure starts on panel *f* and flap *g*. This is because with a long fold in the blank parallel to the direction of movement it is sometimes found that if pressure is exerted on the beginning of the fold the rest of the flap will tend to skew and the flap will not be properly bent along the score line between flap *g* and panel *f*.

After the blank has passed through the rollers D it is delivered on to a pair of platforms 704 and 705, the latter being provided with a stop or locator 706. The blank is indicated by heavy dashes in Figure 50A. As the blank comes up against the stop the platforms are lifted and the blank is brought into contact with a travelling belt 707, Figure 50A. Rollers 708 and 709 protrude slightly through the platforms so that as soon as the blank touches the belt it moves transversely of the bed 610 in the direction of the arrow M, Figure 51A, and passes into the grip of a pair of belts (not shown) which turn it over lengthwise and deliver it on to the bed of the packing machine previously referred to; a fragment of this transfer mechanism is shown at 763, Figure 50A, the belts being driven by a chain 764 from a sprocket 765 on the cam shaft 760. The rollers and platforms are supported by stems 710 movable in a vertical guide 711 which is fixed to a support 712 fixed inside the bed 610. The stems 710 are connected by a yoke 713 having a slot in which a pin 714 is movable, and the pin 714 is fixed to a lever 715 fixed to a spindle 716 journalled in a bracket 717 which also forms a bearing for the shaft 660. The spindle 716 has a lever 718 at its other end carrying a roller 719 which runs in a box cam 720 fixed on the shaft 660. Thus as the shaft 660 rotates the platforms and rollers are lifted and lowered at the desired times.

The machine is driven by a shaft 721 which is an extension of the shaft 59, Figure 1, the shaft being journalled in the bed 610. A bevel gear 722 at the end of the shaft 721 engages another bevel 723 on the cam shaft 660 which is supported in the bearing bracket 717 above referred to and other bearings 724 fixed to the front of the bed 610. The other end of the cam shaft 660 has a bevel wheel 725 fixed to it which engages with a bevel 726 fixed to the end of the shaft 619. In this way all the cams are continuously driven. The shaft 721 has also a spur gear 727 fixed to it which engages with a larger spur gear 728 rotatable on a stub spindle 737 fixed to the bed. The gear 728 carries a roller 729 which engages slots 730 in a slotted disc 731 which is fixed to one of the conveyor driving sprockets 732 which are mounted on a spindle 747 journalled in the bed. In this way the conveyor is intermittently driven. The disc 731 is locked in its stationary position by a roller 733 entering a slot 730. The roller is carried on a bell crank lever 734 pivoted at 735 and oscillated by a cam 736 fixed to the hub of the gear 728 and a spring 738.

The conveyor chains 629 pass over smaller sprockets 739 fixed to a cross spindle 740 and around idlers 741 which are adjustable for tensioning the chains. The spindle 740 has a gear 742 fixed to it which engages with a smaller gear 743 to which is fixed a chain wheel 744. A chain 745 on the wheel 744 drives another sprocket 746 which is fixed to the spindle 645 of the disc 644. One of the conveyor drive sprockets 732 has a bevel wheel 748 fixed to it which engages with a smaller bevel wheel 749 fixed to a shaft 750 supported in bearings 751 at the back of the machine. The shaft 750 carries bevel wheels 752 which engage with other bevels 753 fixed on cross shafts 754 journalled in the bed. Each cross shaft has a spur gear 755 fixed on it which engages with the gears 693 of the lower pressure rollers 691. In this way all the sets of rollers are intermittently driven in timed relationship with the intermittent conveyor 629.

The shaft 750 has a further bevel 756 fixed to it which engages with a bevel 757 fixed to a cross shaft 758 journalled in the frame. A spur gear 759 is fixed on the outer end of the shaft 758 and engages with another spur gear 760 which is fixed on the spindle 761 of the adhesive applying discs 637. In this way the adhesive applying discs are also intermittently driven.

The machine illustrated and described is capable of dealing with 120 blanks per minute, and the construction of the intermittent drive is such that during one revolution of the driving gear 728 the slotted disc 731 is moving for 240° and stationary for 120°. The pitch of the pushers 628 is five inches. If at the moment of stopping, a tab *e'* or *b'* is centrally disposed with respect to the line joining the centres of a set of rollers, the tab in question is passing between the rollers for 25° of the 240° of the slotted disc movement before the tab becomes centrally disposed. When the conveyor starts again there is a similar movement of 25° before the tab is clear of the rollers. Thus in all, each tab is under pressure for a total of 170° of the movement of the gear 728, viz. 50° while the conveyor is moving and 120° while it is still. In other words, the tab is under pressure for nearly half a cycle.

In a construction such as that shown in Figures 7A and 7B, and assuming the same ratio of movement to rest in the intermittent drive, a tab is only under pressure from the rollers for a very limited time, which in the particular construction is the time during which the driving element is rotated through an angle of approximately 20.5°.

By the construction according to the invention, however, the driving element 728 rotates through an angle of 120° during the time in which the rollers 690, 691 are stationary and are pressing upon the superimposed flaps. The rollers 690, 691 also press upon the flaps whilst being rotated prior to and after the stationary period, and the driving element 728 rotates through an angle of about 50°, that is, about 25° prior to the stationary period, and about 25° after the stationary period. Thus in the construction shown in Figures 50A to 51C the driving element rotates for a period of time during which period the element moves through an angle of about 170° and pressure is applied to the superimposed flaps during the whole of this period of time, although of course the area under compression at a given instant is small. Thus in the construction according to Figures 50A to 51C the period of time during which pressure is applied to the superimposed flaps is about eight times greater than in the construction shown in Figures 2B, 3B, 7A, and 7B, in which the pressure is applied only during the rotation of the rollers 146, 147. During the 240° of moving time the conveyor moves five inches as in the present case, but a tab is only about five-eighths of an inch long, and thus at the most is subjected to pressure for one-eighth of the movement, viz. 30° of the driver movement. In the present case a larger period of pressure time between moving rollers is obtained. The movement of the rollers is that occurring at the beginning and end of the entry of the roller into the slots, and thus a large angle of driver movement produces only a little pressure roller (i. e. blank) movement, whereas in the previous case the slotted wheel is moving at nearly its maximum speed before a tab passes between the rollers.

If desired, the upper pressure rollers may have knurled peripheral surfaces which engage with the blank, and the rollers are rotated in timed relationship with the conveyor, while the lower rollers are freely mounted for rotation and rotated by frictional engagement as the blank passes between the co-operating pressure rollers. Preferably, however, the peripheral surfaces of each of the co-operating pressure rollers are smooth surfaces as in the construction illustrated, in Figures 50A to 51C, in which case both rollers are positively driven in timed relationship with the conveyor.

The pressure rollers are moved in timed relationship with the conveyor 629 and preferably have a slightly greater surface speed than the linear speed of the conveyor so that when the superimposed portions of the blank are first engaged between the co-operating pressure rollers the blank is moved for a short distance in advance of the pusher pieces carried by the conveyor so that when the conveyor stops while the blank is engaged by and held between pressure rollers, the rear edge of the blank is not damaged by the pusher pieces. In practice the diameter is about .002 of an inch greater than the true diameter for a circumference exactly equal to the blank width and the distance between the neighbouring two pushers is about .020 of an inch greater than the blank width.

What I claim as my invention and desire to secure by Letters Patent is:

1. In a box making machine, an intermittently movable conveyor to feed a box blank which includes front, back, top and side lid panels, the front and back lid panels being connected by one of said other lid panels, front, back, bottom and side body panels, the front and back body panels being connected by one of said other body panels while the back lid and back body panels are hingedly connected, and reinforcing lid and body panels, means to fold the reinforcing panels into engagement with other panels of the blank, means to position adhesive between the reinforcing panels and the other panels engaged thereby, opposed intermittently rotatable presser members driven in timed relationship with the conveyor to synchronize the stationary periods of the presser members and the conveyor and so positioned relatively to the conveyor during a stationary period as to apply pressure to a reinforcing panel and the box panel engaged thereby, means to fold the lid panels to form a box-like lid, means to fold the body panels to form the body of a box, and means to secure engaging, overlapping body panels and engaging overlapping lid panels.

2. In a box making and filling machine, an intermittently movable conveyor to feed a box blank which includes front, back, top and side lid panels, the front and back lid panels being connected by one of said other lid panels, front, back, bottom and side body panels, the front and back body panels being connected by one of said other body panels while the back lid and back body panels are hingedly connected, and reinforcing lid and body panels, means to fold the reinforcing panels into engagement with other panels of the blank, means to position adhesive between the reinforcing panels and the other panels engaged thereby, opposed intermittently rotatable presser members, driven in timed relationship with the conveyor, to synchronize the stationary periods of the presser members and the conveyor and so positioned relatively to the conveyor during a stationary period as to apply pressure to a reinforcing panel and the box panel engaged thereby, means to deposit an article on the back body panel, means to fold the lid panels to form a box-like lid about the article, means to fold the body panels to form the body of a box about the article, and means to secure engaging, overlapping body panels and engaging overlapping lid panels.

3. In a box making and filling machine, an intermittently movable conveyor to feed a box blank which includes front, back, top and side lid panels, the front and back lid panels being connected by one of said other lid panels, front, back, bottom and side body panels, the front and back body panels being connected by one of said other body panels while the back lid and back body panels are hingedly connected, and reinforcing lid and body panels, means to fold the reinforcing panels into engagement with other panels of the blank, means to position adhesive between the reinforcing panels and the other panels engaged thereby, opposed intermittently rotatable presser members driven in timed relationship with the movements of said conveyor, to synchronize the stationary periods of the presser members and the conveyor and so positioned relatively to the conveyor during a stationary period as to apply pressure to a reinforcing panel and the box panel engaged thereby, means to deposit an article on the back body panel, means to fold the front body and front lid panels against the upper surface of the article, means to fold the side body and lid panels into overlapping relationship against the sides of the article and means to secure engaging overlapping body panels and engaging overlapping lid panels.

4. In a box making machine, opposed intermittently rotatable presser members, and an intermittently movable conveyor to move superimposed workpieces, to be secured together by adhesive between the superimposed portions, in succession at high speed in a path which includes the presser members, said presser members being driven in timed relationship with the conveyor to synchronize the stationary periods of the presser members and the conveyor and so positioned relatively to the conveyor during a stationary period as to apply pressure to a superimposed workpiece.

5. In a box making machine, opposed intermittently rotatable rollers, and an intermittently movable conveyor to move superimposed workpieces, to be secured together by adhesive between the superimposed portions, in succession at high speed in a path which includes the rollers, said rollers being driven in timed relationship with the conveyor to synchronize the stationary periods of the rollers and the conveyor and so positioned relatively to the conveyor during a stationary period as to apply pressure to a superimposed workpiece.

6. In a box making machine, opposed intermittently rotatable presser members, comprising a roller and a segment of a roller, and an intermittently movable conveyor to move superimposed workpieces, to be secured together by adhesive between the superimposed portions, in succession at high speed in a path which includes the presser members, said presser members being driven in timed relationship with the conveyor to synchronize the stationary periods of the presser members and the conveyor and so positioned relatively to the conveyor during a stationary period as to apply pressure to a superimposed workpiece.

7. In a box making machine, opposed intermittently rotatable knurled presser members, and an intermittently movable conveyor to move superimposed workpieces, to be secured together by adhesive between the superimposed portions, in succession at high speed in a path which includes the presser members, said presser members being driven in timed relationship with the conveyor to synchronize the stationary periods of the presser members and the conveyor and so positioned relatively to the conveyor during a stationary period as to apply pressure to a superimposed workpiece.

8. In a box making machine, opposed intermittently rotatable rollers, and an intermittently movable conveyor to move superimposed workpieces, to be secured together by adhesive between the superimposed portions, in succession at high speed in a path which includes the rollers, said rollers being driven in timed relationship with the conveyor to synchronize the stationary periods of the rollers and the conveyor and so positioned relatively to the conveyor during a stationary period as to apply pressure to a superimposed workpiece, said pressure commencing prior to the stationary period and continuing during the initial part of the next succeeding movement of the conveyor.

9. In a box making machine, opposed intermittently rotatable presser members, comprising a roller and a segment of a roller, and an intermittently movable conveyor to move superimposed workpieces, to be secured together by adhesive between the superimposed portions, in succession at high speed in a path which includes the presser members, said presser members being driven in timed relationship with the conveyor to synchronize the stationary periods of the presser members and the conveyor and so positioned relatively to the conveyor during a stationary period as to apply pressure to a superimposed workpiece, said pressure commencing prior to the stationary period and continuing during the initial part of the next succeeding movement of the conveyor.

10. In a box making machine, opposed intermittently rotatable presser members, and an intermittently movable conveyor to move superimposed workpieces, to be secured together by adhesive between the superimposed portions, in succession at high speed in a path which includes the presser members, said presser members being driven in timed relationship with the conveyor to synchronize the stationary periods of the presser members and the conveyor and so positioned relatively to the conveyor during a stationary period as to apply pressure to a superimposed workpiece, those portions of the presser members which engage the superimposed portions being moved at a surface speed which is slightly greater than the linear speed of the conveyor.

11. In a box making machine, a group of opposed intermittently rotatable presser members, and an intermittently movable conveyor to move box blanks having reinforcing elements superimposed thereon and arranged to be secured thereto by adhesive between the superimposed portions, in succession at high speed in a path which includes the presser members, said group comprising two sets of presser members driven in timed relationship with the conveyor to synchronize the stationary periods of the presser members and the conveyor, the two sets being so positioned relatively to the conveyor during a stationary period as to apply pressure to superimposed blanks and reinforcing elements during different stationary periods.

12. In a box making machine, a group of opposed intermittently rotatable presser members, and an intermittently movable conveyor to move box blanks having reinforcing elements superimposed thereon and arranged to be secured thereto by adhesive between the superimposed portions, in succession at high speed in a path which includes the presser members, said group comprising two sets of presser rollers driven in timed relationship with the conveyor to synchronize the stationary periods of the presser rollers and the conveyor, the two sets being so positioned relatively to the conveyor during a stationary period as to apply pressure to superimposed blanks and reinforcing elements during different stationary periods.

13. In a box making machine, a group of opposed intermittently rotatable presser members, and an intermittently movable conveyor to move box blanks having reinforcing elements superimposed thereon and arranged to be secured thereto by adhesive between the superimposed portions, in succession at high speed in a path which includes the presser members, said group comprising two sets of presser members, each of said sets comprising a roller and a segment of a roller, driven in timed relationship with the conveyor to synchronize the stationary periods of the presser members and the conveyor, the two sets being so positioned relatively to the conveyor during a stationary period as to apply pressure to superimposed blanks and reinforcing elements during different stationary periods.

14. In a box making machine, a group of opposed intermittently rotatable presser members, and an intermittently movable conveyor to move box blanks having reinforcing elements superimposed thereon and arranged to be secured thereto by adhesive between the superimposed portions, in succession at high speed in a path which includes the presser members, said group comprising two sets of presser members driven in timed relationship with the conveyor to synchronize the stationary periods of the presser members and the conveyor, the two sets being so positioned relatively to the conveyor during a stationary period as to apply pressure to superimposed blanks and reinforcing elements during different stationary periods, said pressure commencing prior to the stationary period and continuing during the initial part of the next succeeding movement of the conveyor.

15. In a box making machine, a group of opposed intermittently rotatable presser members, and an intermittently movable conveyor to move box blanks having reinforcing elements superimposed thereon at intervals considered in the direction in which the blanks are moved by the conveyor and arranged to be secured to the blanks by adhesive between the superimposed portions, in succession at high speed in a path which includes the presser members, said group comprising two sets of presser members driven in timed relationship with the conveyor to synchronize the stationary periods of the presser members and the conveyor, the two sets being so positioned relatively to the conveyor during a stationary period that one set applies pressure to a blank and a forward reinforcing member thereon, while the other set applies pressure to a further blank and a rearward reinforcing member on such further blank.

16. In a box making machine, a group of opposed intermittently rotatable presser members, and an intermittently movable conveyor to move box blanks having reinforcing elements superimposed thereon at intervals considered in the direction in which the blanks are moved by the conveyor and arranged to be secured to the blanks by adhesive between the superimposed portions, in succession at high speed in a path which includes the presser members, said group comprising two sets of presser rollers driven in timed relationship with the conveyor to synchronize the stationary periods of the presser rollers and the conveyor, the two sets being so positioned relatively to the conveyor during a stationary period that one set applies pressure to a blank and a forward reinforcing member thereon, while the other set applies pressure to a further blank and a rearward reinforcing member on such further blank.

17. In a box making machine, a group of opposed intermittently rotatable presser members, and an intermittently movable conveyor to move box blanks having reinforcing elements superimposed thereon at intervals considered in the direction in which the blanks are moved by the conveyor and arranged to be secured to the blanks by adhesive between the superimposed portions, in succession at high speed in a path which includes the presser members, said group comprising two sets of presser members, each of said sets comprising a roller and a segment of a roller driven in timed relationship with the conveyor to synchronize the stationary periods of the presser members and the conveyor, the two sets being so positioned relatively to the conveyor during a stationary period that one set applies pressure to a blank and a forward reinforcing member thereon, while the other set applies pressure to a further blank and a rearward reinforcing member on such further blank.

18. In a box making machine, a group of opposed intermittently rotatable presser members, and an intermittently movable conveyor to move box blanks having reinforcing elements superimposed thereon at intervals considered in the direction in which the blanks are moved by the conveyor and arranged to be secured to the blanks by adhesive between the superimposed portions in succession at high speed in a path which includes the presser members, said group comprising two sets of presser members driven in timed relationship with the conveyor to synchronize the stationary periods of the presser members and the conveyor, the two sets being so positioned relatively to the conveyor during a stationary period that one set applies pressure to a blank and a forward reinforcing member thereon, while the other set applies pressure to a further blank and a rearward reinforcing member on such further blank, said pressure commencing prior to the stationary period and continuing during the initial part of the next succeeding movement of the conveyor.

19. In a box making machine, opposed intermittently rotatable presser members, an intermittently movable conveyor to move box blanks having reinforcing elements superimposed thereon and arranged to be secured thereto by adhesive, in succession at high speed in a path which includes the presser members, said presser members being driven in timed relationship with the conveyor to synchronize the stationary periods of the presser members and the conveyor and so positioned relatively to the conveyor during a stationary period as to apply pressure to a box blank and its reinforcing element, and means to fold the said blanks to form a box.

20. In a box making and filling machine, opposed intermittently rotatable presser members, an intermittently movable conveyor to move box blanks having reinforcing elements superimposed thereon and arranged to be secured thereto by adhesive in succession at high speed in a path which includes the presser members, said presser members being driven in timed relationship with the conveyor to synchronize the stationary periods of the presser members and the conveyor and so positioned relatively to the conveyor during a stationary period as to apply pressure to a box blank and its reinforcing element, means to deposit an article on a blank and means to fold the said blanks to form a box.

JOHN WALKER CHALMERS.